(12) United States Patent
Masarapu et al.

(10) Patent No.: US 9,780,358 B2
(45) Date of Patent: Oct. 3, 2017

(54) BATTERY DESIGNS WITH HIGH CAPACITY ANODE MATERIALS AND CATHODE MATERIALS

(71) Applicant: Envia Systems, Inc., Newark, CA (US)

(72) Inventors: Charan Masarapu, Fremont, CA (US); Yogesh Kumar Anguchamy, Newark, CA (US); Yongbong Han, San Francisco, CA (US); Haixia Deng, Fremont, CA (US); Sujeet Kumar, Newark, CA (US); Herman A. Lopez, Sunnyvale, CA (US)

(73) Assignee: Zenlabs Energy, Inc., Newark, CA (US)

(*) Notice: Subject to any disclaimer, the term of this patent is extended or adjusted under 35 U.S.C. 154(b) by 348 days.

(21) Appl. No.: 13/777,722

(22) Filed: Feb. 26, 2013

(65) Prior Publication Data

US 2014/0065464 A1 Mar. 6, 2014

Related U.S. Application Data

(63) Continuation-in-part of application No. 13/464,034, filed on May 4, 2012.

(51) Int. Cl.
*H01M 4/131* (2010.01)
*H01B 1/24* (2006.01)
(Continued)

(52) U.S. Cl.
CPC .............. *H01M 4/131* (2013.01); *H01B 1/24* (2013.01); *H01M 4/134* (2013.01); *H01M 4/386* (2013.01);
(Continued)

(58) Field of Classification Search
CPC .... H01M 4/485; H01M 4/505; H01M 2/1646; H01M 4/131; H01M 4/134; H01M 4/38;
(Continued)

(56) References Cited

U.S. PATENT DOCUMENTS 4,086,404 A 4/1978 Vissers et al.
4,945,014 A 7/1990 Miyabayashi et al.
(Continued)

FOREIGN PATENT DOCUMENTS

EP 2079120 A1 7/2009
EP 2141759 A1 1/2010
(Continued)

OTHER PUBLICATIONS

"Nano Si Cluster-SiOx-C Composite Material as High-Capacity Anode Material for Rechargeable Lithium Batteries." Journal of the Electrochemical Society 153 (2) A425-A430 (2006), available Jan. 2006, by Morita et al.*

(Continued)

*Primary Examiner* — Milton I Cano
*Assistant Examiner* — Michael Dignan
(74) *Attorney, Agent, or Firm* — Christensen, Fonder, Dardi & Herbert PLLC; Peter S. Dardi

(57) ABSTRACT

Improved high energy capacity designs for lithium ion batteries are described that take advantage of the properties of high specific capacity anode active compositions and high specific capacity cathode active compositions. In particular, specific electrode designs provide for achieving very high energy densities. Furthermore, the complex behavior of the active materials is used advantageously in a radical electrode balancing design that significantly reduced wasted electrode capacity in either electrode when cycling under realistic conditions of moderate to high discharge rates and/or over a reduced depth of discharge.

13 Claims, 16 Drawing Sheets

(51) Int. Cl.
  *H01M 4/134*     (2010.01)
  *H01M 4/525*     (2010.01)
  *H01M 4/38*      (2006.01)
  *H01M 4/485*     (2010.01)
  *H01M 4/505*     (2010.01)
  *H01M 10/052*    (2010.01)
  *H01M 10/0562*   (2010.01)
  *H01M 10/44*     (2006.01)
  *B82Y 30/00*     (2011.01)
  *H01M 2/02*      (2006.01)

(52) U.S. Cl.
  CPC ........... *H01M 4/485* (2013.01); *H01M 4/505* (2013.01); *H01M 4/525* (2013.01); *H01M 10/052* (2013.01); *H01M 10/0562* (2013.01); *H01M 10/446* (2013.01); *B82Y 30/00* (2013.01); *H01M 2/0217* (2013.01); *H01M 4/387* (2013.01); *Y02T 10/7011* (2013.01)

(58) Field of Classification Search
  CPC ...... H01M 4/386; H01M 4/525; H01M 4/622; H01M 4/625; H01M 10/0525; H01M 10/446; H01M 2/024; H01B 1/24; B82Y 30/00; Y02T 10/7011
  See application file for complete search history.

(56) References Cited

U.S. PATENT DOCUMENTS

| | | | |
|---|---|---|---|
| 5,147,739 A | 9/1992 | Beard | |
| 5,162,176 A | 11/1992 | Herr et al. | |
| 5,395,711 A | 3/1995 | Tahara et al. | |
| 5,436,093 A | 7/1995 | Huang et al. | |
| 5,443,601 A | 8/1995 | Doeff et al. | |
| 5,514,488 A | 5/1996 | Hake et al. | |
| 5,541,022 A | 7/1996 | Mizumoto et al. | |
| 5,595,837 A | 1/1997 | Olsen et al. | |
| 5,721,067 A | 2/1998 | Jacobs et al. | |
| 5,743,921 A | 4/1998 | Nazri et al. | |
| 5,753,388 A | 5/1998 | Koksbang et al. | |
| 5,792,577 A | 8/1998 | Ejiri et al. | |
| 5,948,569 A | 9/1999 | Moses et al. | |
| 6,025,093 A | 2/2000 | Herr | |
| 6,080,507 A | 6/2000 | Yu | |
| 6,083,644 A | 7/2000 | Watanabe et al. | |
| 6,171,723 B1 | 1/2001 | Loch et al. | |
| 6,235,427 B1 | 5/2001 | Idota et al. | |
| 6,251,822 B1 | 6/2001 | Peng et al. | |
| 6,335,115 B1 | 1/2002 | Meissner | |
| 6,337,156 B1 | 1/2002 | Narang et al. | |
| 6,383,687 B1 | 5/2002 | Gibbons et al. | |
| 6,420,071 B1 | 7/2002 | Lee et al. | |
| 6,511,767 B1 | 1/2003 | Calver et al. | |
| 6,528,208 B1 | 3/2003 | Thackeray et al. | |
| 6,616,715 B2 | 9/2003 | Kitoh et al. | |
| 6,638,662 B2 | 10/2003 | Kaneda et al. | |
| 6,645,671 B2 | 11/2003 | Tsutsumi et al. | |
| 6,677,082 B2 | 1/2004 | Thackeray et al. | |
| 6,680,143 B2 | 1/2004 | Thackeray et al. | |
| 6,682,849 B2 | 1/2004 | Narang et al. | |
| 6,699,336 B2 | 3/2004 | Turner et al. | |
| 6,703,163 B2 | 3/2004 | Ogura et al. | |
| 6,706,447 B2 | 3/2004 | Gao et al. | |
| 6,730,429 B2 | 5/2004 | Thackeray et al. | |
| 6,737,191 B2 | 5/2004 | Gan et al. | |
| 6,749,648 B1 | 6/2004 | Kumar et al. | |
| 6,759,160 B2 | 7/2004 | Fukuoka et al. | |
| 6,783,896 B2 | 8/2004 | Tsujioka et al. | |
| 6,787,267 B2 | 9/2004 | Tsujioka et al. | |
| 6,787,268 B2 | 9/2004 | Koike et al. | |
| 6,835,214 B2 | 12/2004 | Kitano et al. | |
| 6,855,460 B2 | 2/2005 | Vaughey et al. | |
| 6,858,349 B1 | 2/2005 | Luo et al. | |
| 6,884,546 B1 | 4/2005 | Fujita et al. | |
| 6,893,621 B2 | 5/2005 | Fukuoka et al. | |
| 6,899,970 B1 | 5/2005 | Rogers et al. | |
| 6,936,382 B2 | 8/2005 | Mikhaylik et al. | |
| 6,951,699 B2 | 10/2005 | Yata et al. | |
| 6,964,828 B2 | 11/2005 | Lu et al. | |
| 6,979,513 B2 | 12/2005 | Kelley et al. | |
| 7,008,722 B2 | 3/2006 | Huang | |
| 7,026,074 B2 | 4/2006 | Chen et al. | |
| 7,033,702 B2 | 4/2006 | Dasgupta et al. | |
| 7,037,581 B2 | 5/2006 | Aramata et al. | |
| 7,078,128 B2 | 7/2006 | Lu et al. | |
| 7,135,252 B2 | 11/2006 | Thackeray et al. | |
| 7,166,385 B2 | 1/2007 | Ishida et al. | |
| 7,186,479 B2 | 3/2007 | Krasnov et al. | |
| 7,195,842 B1 | 3/2007 | Fujimoto et al. | |
| 7,198,869 B2 | 4/2007 | Ghantous et al. | |
| 7,201,994 B2 | 4/2007 | Watanabe et al. | |
| 7,201,997 B2 | 4/2007 | Ishida et al. | |
| 7,205,072 B2 | 4/2007 | Kang et al. | |
| 7,214,446 B2 | 5/2007 | Bi et al. | |
| 7,229,717 B2 | 6/2007 | Yamaguchi et al. | |
| 7,235,330 B1 | 6/2007 | Fujimoto et al. | |
| 7,252,689 B2 | 8/2007 | Fujino et al. | |
| 7,252,907 B2 | 8/2007 | Takeuchi et al. | |
| 7,273,682 B2 | 9/2007 | Park et al. | |
| 7,276,314 B2 | 10/2007 | Gao et al. | |
| 7,297,446 B2 | 11/2007 | Fukui et al. | |
| 7,338,734 B2 | 3/2008 | Chiang et al. | |
| 7,351,494 B2 | 4/2008 | Hennige et al. | |
| 7,416,813 B2 | 8/2008 | Fujihara et al. | |
| 7,432,015 B2 | 10/2008 | Jeong et al. | |
| 7,435,402 B2 | 10/2008 | Kang et al. | |
| 7,452,631 B2 | 11/2008 | Kitao et al. | |
| 7,452,632 B2 | 11/2008 | Lee et al. | |
| 7,465,519 B2 | 12/2008 | Tang et al. | |
| 7,497,285 B1 | 3/2009 | Radev | |
| 7,507,503 B2 | 3/2009 | Amine et al. | |
| 7,510,803 B2 | 3/2009 | Adachi et al. | |
| 7,514,369 B2 | 4/2009 | Li et al. | |
| 7,517,614 B2 | 4/2009 | Jeong et al. | |
| 7,544,443 B2 | 6/2009 | Fujihara et al. | |
| 7,563,541 B2 | 7/2009 | Howard et al. | |
| 7,575,830 B2 | 8/2009 | Kawamura | |
| 7,582,387 B2 | 9/2009 | Howard et al. | |
| 7,588,623 B2 | 9/2009 | Dover et al. | |
| 7,615,314 B2 | 11/2009 | Kawakami et al. | |
| 7,658,863 B2 | 2/2010 | Aramata et al. | |
| 7,718,306 B2 | 5/2010 | Cheon et al. | |
| 7,754,389 B2 | 7/2010 | Yamaguchi et al. | |
| 7,776,473 B2 | 8/2010 | Aramata et al. | |
| 7,790,316 B2 | 9/2010 | Aramata et al. | |
| 7,833,662 B2 | 11/2010 | Kim et al. | |
| 7,851,085 B2 | 12/2010 | Obrovac et al. | |
| 7,871,727 B2 | 1/2011 | Obrovac et al. | |
| 7,923,150 B2 | 4/2011 | Yamamoto et al. | |
| 8,158,282 B2 * | 4/2012 | Zhamu | H01M 4/134 257/E21.001 |
| 8,187,752 B2 | 5/2012 | Buckley et al. | |
| 9,159,990 B2 | 10/2015 | Amiruddin et al. | |
| 2001/0031396 A1 | 10/2001 | Tsutsumi et al. | |
| 2002/0102462 A1 | 8/2002 | Huggins et al. | |
| 2002/0122973 A1 | 9/2002 | Manev et al. | |
| 2002/0164479 A1 | 11/2002 | Matsubara et al. | |
| 2003/0077515 A1 | 4/2003 | Chen et al. | |
| 2003/0087155 A1 | 5/2003 | Cho et al. | |
| 2003/0099883 A1 | 5/2003 | Ochoa et al. | |
| 2003/0135989 A1 | 7/2003 | Huggins et al. | |
| 2003/0157014 A1 | 8/2003 | Wang et al. | |
| 2003/0157407 A1 | 8/2003 | Kosuzu et al. | |
| 2003/0211390 A1 | 11/2003 | Dahn et al. | |
| 2003/0215711 A1 | 11/2003 | Aramata et al. | |
| 2004/0023117 A1 | 2/2004 | Imachi et al. | |
| 2004/0033419 A1 | 2/2004 | Funabiki | |
| 2004/0048152 A1 | 3/2004 | Yata et al. | |
| 2004/0072072 A1 | 4/2004 | Suzuki et al. | |
| 2004/0146734 A1 | 7/2004 | Miller et al. | |
| 2004/0151951 A1 | 8/2004 | Hyung et al. | |
| 2004/0161669 A1 | 8/2004 | Zolotnik et al. | |

(56) References Cited

U.S. PATENT DOCUMENTS

| | | |
|---|---|---|
| 2004/0191630 A1 | 9/2004 | Kawamura et al. |
| 2004/0214085 A1 | 10/2004 | Sheem et al. |
| 2004/0241548 A1 | 12/2004 | Nakamoto et al. |
| 2005/0019670 A1 | 1/2005 | Amine et al. |
| 2005/0026037 A1 | 2/2005 | Riley, Jr. et al. |
| 2005/0026040 A1 | 2/2005 | Thackeray et al. |
| 2005/0031942 A1 | 2/2005 | Hennige et al. |
| 2005/0130043 A1 | 6/2005 | Gao et al. |
| 2005/0175901 A1 | 8/2005 | Kawakami et al. |
| 2005/0202316 A1 | 9/2005 | Hwang et al. |
| 2005/0214644 A1 | 9/2005 | Aramata et al. |
| 2005/0233213 A1 | 10/2005 | Lee et al. |
| 2006/0040182 A1 | 2/2006 | Kawakami et al. |
| 2006/0051671 A1 | 3/2006 | Thackeray et al. |
| 2006/0051673 A1 | 3/2006 | Johnson et al. |
| 2006/0051677 A1 | 3/2006 | Matsushima et al. |
| 2006/0068285 A1 | 3/2006 | Yamaguchi et al. |
| 2006/0078797 A1 | 4/2006 | Munshi |
| 2006/0099472 A1 | 5/2006 | Hsu |
| 2006/0115734 A1 | 6/2006 | Ishihara et al. |
| 2006/0147809 A1 | 7/2006 | Amine et al. |
| 2006/0197496 A1 | 9/2006 | Iijima et al. |
| 2006/0269834 A1 | 11/2006 | West et al. |
| 2006/0286438 A1 | 12/2006 | Fujikawa et al. |
| 2007/0048612 A1 | 3/2007 | Nakajima et al. |
| 2007/0059601 A1 | 3/2007 | Natsume et al. |
| 2007/0099436 A1 | 5/2007 | Kogetsu et al. |
| 2007/0148544 A1 | 6/2007 | Le |
| 2007/0190413 A1 | 8/2007 | Lee et al. |
| 2007/0207381 A1 | 9/2007 | Ohtsuka et al. |
| 2007/0224508 A1* | 9/2007 | Aramata et al. .......... 429/231.95 |
| 2007/0254102 A1 | 11/2007 | Fukuoka et al. |
| 2007/0259113 A1 | 11/2007 | Kizaki et al. |
| 2008/0008933 A1 | 1/2008 | Lampe-Onnerud |
| 2008/0026297 A1 | 1/2008 | Chen et al. |
| 2008/0095930 A1 | 4/2008 | Natsume et al. |
| 2008/0113269 A1 | 5/2008 | Yamamoto et al. |
| 2008/0131772 A1 | 6/2008 | Jambunathan et al. |
| 2008/0135801 A1 | 6/2008 | Kizaki et al. |
| 2008/0160265 A1 | 7/2008 | Hieslmair et al. |
| 2008/0193831 A1 | 8/2008 | Mah et al. |
| 2008/0213671 A1 | 9/2008 | Kogetsu et al. |
| 2008/0226988 A1 | 9/2008 | Minami et al. |
| 2008/0261115 A1 | 10/2008 | Saito et al. |
| 2008/0268347 A1 | 10/2008 | Ohzuku et al. |
| 2008/0274408 A1 | 11/2008 | Jarvis et al. |
| 2008/0318122 A1 | 12/2008 | Sun |
| 2009/0004564 A1 | 1/2009 | Ishida et al. |
| 2009/0023065 A1 | 1/2009 | Hwang et al. |
| 2009/0029256 A1 | 1/2009 | Mah et al. |
| 2009/0047577 A1 | 2/2009 | Iwamoto et al. |
| 2009/0053608 A1 | 2/2009 | Choi et al. |
| 2009/0092899 A1 | 4/2009 | Treger |
| 2009/0092900 A1 | 4/2009 | Obana et al. |
| 2009/0117466 A1 | 5/2009 | Zhamu et al. |
| 2009/0130562 A1 | 5/2009 | Mao et al. |
| 2009/0169994 A1 | 7/2009 | Mah et al. |
| 2009/0186267 A1 | 7/2009 | Tiegs |
| 2009/0214952 A1 | 8/2009 | Wakita et al. |
| 2009/0239151 A1 | 9/2009 | Nakanishi et al. |
| 2009/0253042 A1 | 10/2009 | Sun et al. |
| 2009/0263707 A1* | 10/2009 | Buckley et al. ................. 429/94 |
| 2009/0263721 A1 | 10/2009 | Haruna et al. |
| 2009/0297937 A1 | 12/2009 | Lampe-Onnerud et al. |
| 2009/0305131 A1 | 12/2009 | Kumar et al. |
| 2009/0317721 A1 | 12/2009 | Shirane et al. |
| 2009/0325061 A1 | 12/2009 | Lim |
| 2010/0009261 A1 | 1/2010 | Watanabe |
| 2010/0047671 A1 | 2/2010 | Chiang et al. |
| 2010/0055563 A1 | 3/2010 | Nakanishi et al. |
| 2010/0086853 A1 | 4/2010 | Venkatachalam et al. |
| 2010/0086854 A1 | 4/2010 | Kumar et al. |
| 2010/0119939 A1 | 5/2010 | Misumi et al. |
| 2010/0119942 A1 | 5/2010 | Kumar |
| 2010/0120179 A1 | 5/2010 | Zhamu et al. |
| 2010/0151332 A1 | 6/2010 | Lopez et al. |
| 2010/0159366 A1 | 6/2010 | Shao-Horn et al. |
| 2010/0173198 A1 | 7/2010 | Zhamu et al. |
| 2010/0178566 A1 | 7/2010 | Kogetsu et al. |
| 2010/0233543 A1 | 9/2010 | Numata et al. |
| 2010/0243951 A1 | 9/2010 | Watanabe et al. |
| 2010/0288970 A1 | 11/2010 | Watanabe et al. |
| 2010/0330430 A1 | 12/2010 | Chung et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0085960 A1 | 4/2011 | Mukasyan et al. |
| 2011/0111294 A1* | 5/2011 | Lopez et al. .................. 429/217 |
| 2011/0111298 A1 | 5/2011 | Lopez et al. |
| 2011/0111304 A1 | 5/2011 | Cui et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0045670 A1 | 2/2012 | Stefan et al. |
| 2012/0056590 A1 | 3/2012 | Amiruddin et al. |
| 2012/0070725 A1 | 3/2012 | Venkatachalam et al. |
| 2012/0070741 A1 | 3/2012 | Liu et al. |
| 2012/0082877 A1 | 4/2012 | Song et al. |
| 2012/0105007 A1 | 5/2012 | Amiruddin et al. |
| 2012/0107680 A1 | 5/2012 | Amiruddin et al. |
| 2012/0121982 A1 | 5/2012 | Harimoto et al. |
| 2012/0264020 A1 | 10/2012 | Burton et al. |
| 2012/0295155 A1 | 11/2012 | Deng et al. |
| 2013/0078508 A1 | 3/2013 | Tolbert et al. |
| 2013/0095357 A1 | 4/2013 | Bhandwaj et al. |
| 2013/0157147 A1 | 6/2013 | Li et al. |
| 2013/0189575 A1 | 7/2013 | Anguchamy et al. |
| 2013/0295439 A1 | 11/2013 | Masarapu et al. |

FOREIGN PATENT DOCUMENTS

| | | |
|---|---|---|
| JP | 07-065825 | 3/1995 |
| JP | 09-045373 | 2/1997 |
| JP | 10-255837 | 9/1998 |
| JP | 2000-012018 | 1/2000 |
| JP | 2001-118568 | 4/2001 |
| JP | 2002-110167 | 4/2002 |
| JP | 2003-223887 | 8/2003 |
| JP | 2003-242978 A | 8/2003 |
| JP | 2005-251684 A | 9/2005 |
| JP | 2007-066667 A | 3/2007 |
| JP | 2009-252705 A | 10/2009 |
| JP | 2010-055775 | 3/2010 |
| KR | 10-2001-0043360 A | 5/2001 |
| KR | 10-2003-0007651 A | 1/2003 |
| KR | 10-2004-0096381 A | 11/2004 |
| KR | 10-2004-0100058 A | 12/2004 |
| KR | 10-0493960 B1 | 6/2005 |
| KR | 10-2005-0111764 | 11/2005 |
| KR | 10-0578877 | 5/2006 |
| KR | 10-2006-0087003 A | 8/2006 |
| KR | 10-2006-0087183 A | 8/2006 |
| KR | 10-0684724 | 2/2007 |
| WO | 01/35473 A1 | 5/2001 |
| WO | 01/91209 A1 | 11/2001 |
| WO | 03/021697 A2 | 3/2003 |
| WO | 2004/025757 A2 | 3/2004 |
| WO | 2004/084330 A2 | 9/2004 |
| WO | 2005/011030 A1 | 2/2005 |
| WO | 2005/031898 A1 | 4/2005 |
| WO | 2005/065082 A2 | 7/2005 |
| WO | 2005/076389 A2 | 8/2005 |
| WO | 2005/083829 A2 | 9/2005 |
| WO | 2006/109930 | 10/2006 |
| WO | 2006/137673 A1 | 12/2006 |
| WO | 2007/126257 A1 | 11/2007 |
| WO | 2008/086041 A1 | 7/2008 |
| WO | 2009/022848 A1 | 2/2009 |
| WO | 2011/053736 A1 | 5/2011 |
| WO | 2013/082330 | 6/2013 |

(56) References Cited

FOREIGN PATENT DOCUMENTS

OTHER PUBLICATIONS

Wang etal. "Nano-sized SiOx/C composite anode for lithium ion batteries." Journal of Power Sources 196 (2011) 4811-4815 available Jan. 2011.*
Yang et al. "SiOx-based anodes for secondary lithium batteries." Solid State Ionics 152-153 (2002) 125-129, available Mar. 2002.*
Veluchamy et al. "A new SiO/C anode composition for lithium-ion battery." Journal of Power Sources 179 (2008) 367-370, puclished Dec. 2007.*
Hu et al. "Superior Storage Performance of a Si@SiOx/C Nanocomposite as Anode Material for Lithium-Ion Batteries." Angew. Chem. Int. Ed. 2008, 47, 1645-1649, available Feb. 2008.*
Taiwan Office Action from corresponding Taiwan Patent Application No. 102115966, dated Jun. 20, 2014 (10 pages).
Achiha et al., "Electrochemical Behavior of Nonflammable Organo-Fluorine Compunds for Lithium Ion Batteries," Journal of the Electrochemical Society 156(6): A483-A488 (2009).
"Battery Test Manual for Plug-In Hybrid Electric Vehicles," prepared for the U.S. Department of Energy, Office of Energy Efficiency and Renewable Energy, Vehicle Technologies Program, 2008.
Chan et al., "High-performance lithium battery anodes using silicon nanowires," Nature Nanotechnology Jan. 2008, vol. 3, pp. 31-35.
Chen et al., "Electrochemical Insertion/extraction of Lithium in Multiwall Carbon Nanotube/Sb and SnSb0.5 Nanocomposites," published by the Massachusetts Institute of Technology, division of Molecular Engineering of Biological and Chemical Systems, Dec. 2003.
Chiang et al., "High Capacity, Temperature-Stable Lithium Aluminum Manganese Oxide Cathodes for Rechargeable Batteries," Electrochemical and Solid State Letters, 2(3) 107-110 (1999).
Choi et al., "Effect of fluoroethylene carbonate additive on interfacial properties of silicon thin-film electrode" Journal of Power Sources 161 (2006) 1254-1259. (Abstract only).
Cui et al., "Carbon-Silicon Core-Shell Nanowires as High Capacity Electrode for Lithium Ion Batteries," Nano Letters 9(9):3370-3374 (2009).
Evonik Industries, "Scientific breakthrough: SEPARION® opens up new markets for lithium ion batteries," http://corporate.evonik.de/en/company/news/lithium_ion_batteries/Pages/separion.aspx (Oct. 7, 2009).
Guerfi et al., "SiOx-graphite as negative for high energy Li-ion batteries," Journal of Power Sources 196:5667-5673 (2011).
Ishikawa et al., "Li-ion Battery Performance with FSI-based Ionic Liquid Electrolyte and Fluorinated Solvent-based Electrolyte" ECS Trans. 33:29-36 (2010) (Abstract).
Ito et al., Cyclic deterioration and its improvement for Li-rich layered cathode material Li [Ni0.17Li0.2Co0.07Mn0.56]O2, Journal of Power Sources, 2010; 195:567-573.
Ito et al., "A new approach to improve the high-voltage cyclic performance of Li-rich layered cathode material by electrochemical pre-treatment," Journal of Power Sources, 2008; 183:344-346.
Jeong et al., "A Nanostructured SiA10.2O Anode Material for Lithium Batteries," Chem. Mater. 22:5570-5579 (2010).
Kang et al., "Enhancing the rate capability of high capacity xLi2Mn03 · (1-x)LiMO2 (M=Mn, Ni, Co) electrodes by Li—Ni—PO4 treatment," Electrochemistry Communications, 11: 748-751 (2009).
Kang et al., "Layered Li(Li0.2Ni0.15+0.5zCo0.10Mn0.55-0.5z)O2-zFz cathode materials for Li-ion secondary batteries," Journal of Power Sources 146: 654-657 (2005).
Kim et al., "Synthesis of spherical Li[Ni(1/3-z)Co(1/3-z)Mn(1/3-z)Mgz]O2 as positive electrode material for lithium ion battery," Electrochimica Acta 51: 2447-2453 (2006).
Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society, 152(9): A1701-A1713 (2005).
Lee et al., "High capacity Li[Li0.2Ni0.2Mn0.6]O2 cathode materials via a carbonate co-precipitation method," J. of Power Sources, 162 (2006), 1346-1350.
Liu et al., "Improvement of cycling stability of Si anode by mechanochemical reduction and carbon coatings." Journal of Power Sources, 189, pp. 480-484 (2009).
Liu et al., "Electrical transport in doped multiwalled carbon nanotubes," Physical Review B, vol. 63,161404(R), pp. 1-4 (2001).
McMillan et al. "Fluoroethylene carbonate electrolyte and its use in lithium ion batteries with graphite anodes," Journal of Power Sources 81-2: 20-26 (1999) (Abstract).
Miyachi et al., "Electrochemical Properties and Chemical Structures of Metal-Doped SiO Anodes for Li-Ion Rechargeable Batteries," J. Electrochem. Soc. 154(4):A376-A380 (2007).
Naoi et al., "Nonflammable Hydrofluoroether for Lithium-Ion Batteries: Enhanced Rate Capability, Cyclability, and Low-Temperature Performance," J. Electrochem. Soc. 156(4):A272-A276 (2009) (Abstract only).
Park et al., "Physical and electrochemical properties of spherical Li1+x(Ni1/3Co1/3Mn1/3)1-xO2 cathode materials," Journal of Power Sources, 177:177-183 (2008).
Profatilova et al., "Enhanced thermal properties of the solid electrolyte interphase formed on graphite in an electrolyte with fluoroethylene carbonate," Electrochimica Acta 54: 4445-4450 (2009).
Ruffo et al., "Impedance Analysis of Silicon Nanowire Lithium Ion Battery Anodes," J. Phys. Chem. C 113:11390-11398 (2009).
Schoenenberger et al., "Multiwall carbon nanotubes," http://physicsworld.com/cws/article/print/606 (printed Oct. 7, 2009).
Shi et al., "Nano-SnSb alloy deposited on MCMB as an anode material for lithium ion batteries," J. Materials Chemistry, 11(5):1502-1505 (2001).
Song et al., Two-and three-electrode impedance spectroscopy of lithium-ion batteries, Journal of Power Sources, 111: 255-267 (2002).
Sun et al, "AlF3-Coating to Improve High Voltage Cycling Performance of Li[Ni1/3Co1/3Mn1/3]O2 Cathode Materials for Lithium Secondary Batteries," Journal of the Electrochemical Society, 154(3): A168-A172 (2007).
Sun et al., "Significant improvement of high voltage cycling behavior AlF3-coated LiCoO2 cathode," Electrochemistry Communications, 8: 821-826 (2006).
Sun et al., "The preparation and electrochemical performance of solid solutions LiCoO2-Li2MnO3 as cathode materials for lithium ion batteries," Journal of Power Sources, 159: 1353-1359 (2006).
Tabuchi et al., "Li-doping process for LixSiO-negative active material synthesized by chemical method for lithium ion cells," Journal of Power Sources 146:507-509 (2005).
Thackeray et al., "Li2MnO3-stabilized LiMO2 (M=Mn, Ni, Co) electrodes for lithium-ion batteries," J. Mater. Chem., 17: 3112-3125 (2007).
Thackeray et al., "Comments on the structural complexity of lithium-rich Li1+xM1-xO2 electrodes (M=Mn,Ni,Co) for lithium batteries," Electrochemistry Communications, 8: 1531-1538 (2006).
Timcal Graphite & Carbon, A Synopsis of Analytical Procedures 2008 www.timcal.com.
Veluchamy et al., "Improvement of cycle behaviour of SiO/C anode compositie by thermochemically generated Li4SiO4 inert phase for lithium ion batteries," Journal of Power Sources 188:574-577 (2009).
Wang et al., "Lithium Insertion in Carbon-Silicon Composite Materials Produced by Mechanical Milling," J. Electrochem. Soc., 145(8): 2751-2758 (1998).
Woo et al., "Significant Improvement of Electrochemical Performance of AlF3-Coated Li[Ni0.8Co0.1Mn0.1]O2 Cathode Materials," Journal of the Electrochemical Society, 154(11): A1005-A1009 (2007).

(56) References Cited

OTHER PUBLICATIONS

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9(5): A221-A224 (2006).

Yakovleva et al., "Stabilized Lithium Metal Powder, Enabling Material and Revolutionary Technology for High Energy Li-ion Batteries"—2010 DOE Vehicle Technologies Program Review (Presentation).

Yamaki et al., "Characterization and Thermal Stability of SEI between a Graphite Electrode and Methyl Difluoroacetate-based Electrolyte," Abstract #236 from the 210th Meeting of the Electrochemical Society (2006).

Yang et al., "Nanosized silicon-based composite derived by in situ mechanochemical reduction for lithium ion batteries," Journal of Power Sources, 164, pp. 880-884 (2007).

Yoshio et al., "Electrochemical behaviors of silicon based anode material," Journal of Power Sources 146:10-14 (2005).

"For More Charge Use Li, for Maximum Charge, Use FMC's SLMP™ Technology," Product Brochure, FMC Corporation 2008 (1 page).

International Search Report and Written Opinion from corresponding PCT Application No. PCT/US2013/037900, dated Aug. 19, 2013 (16 pages).

\* cited by examiner

Fig. 2
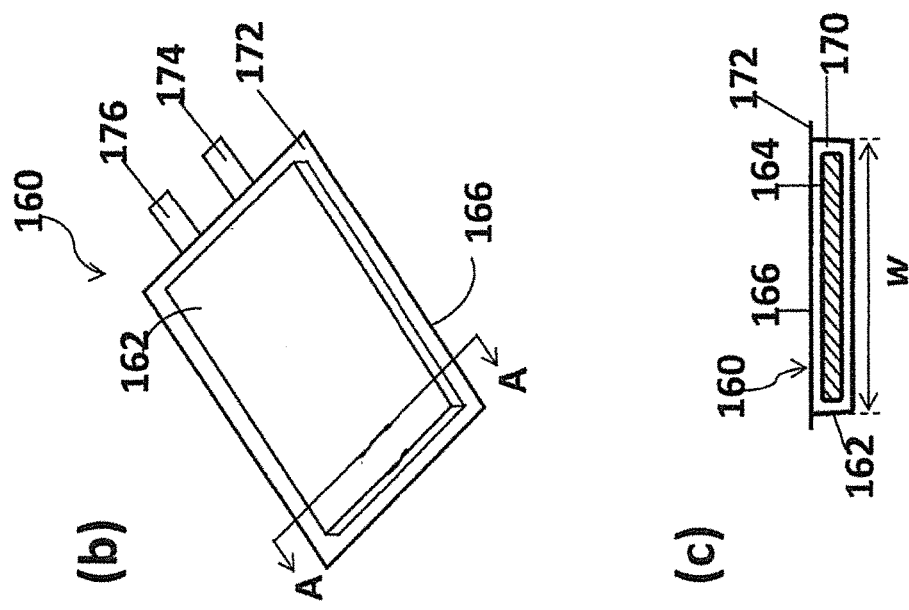
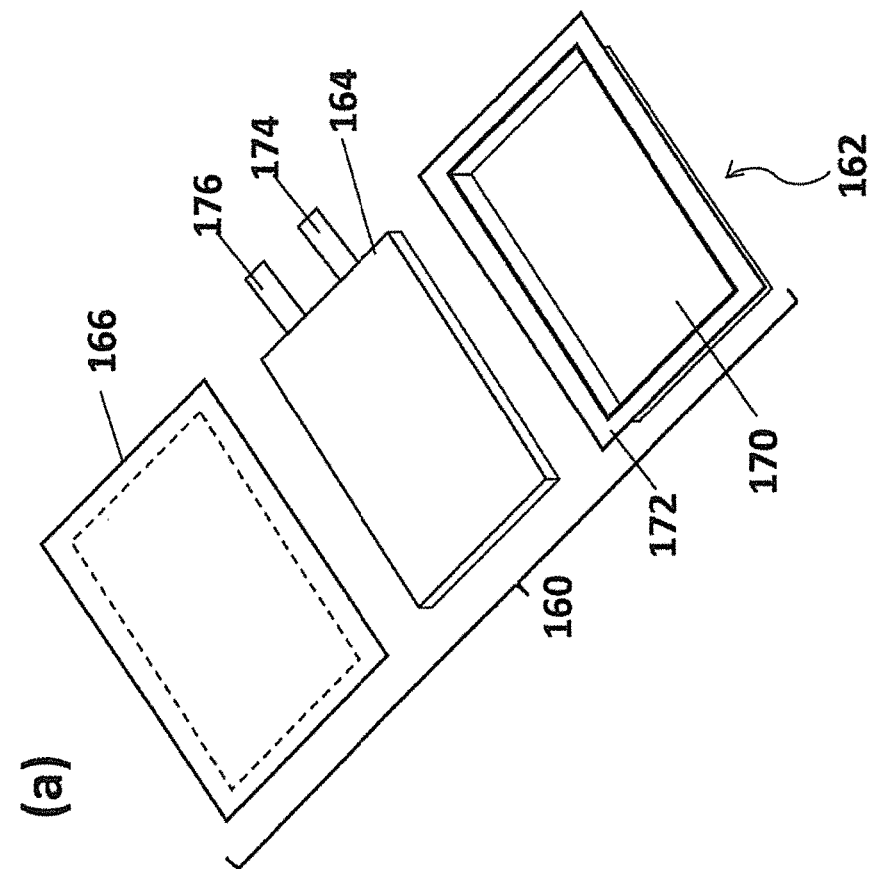

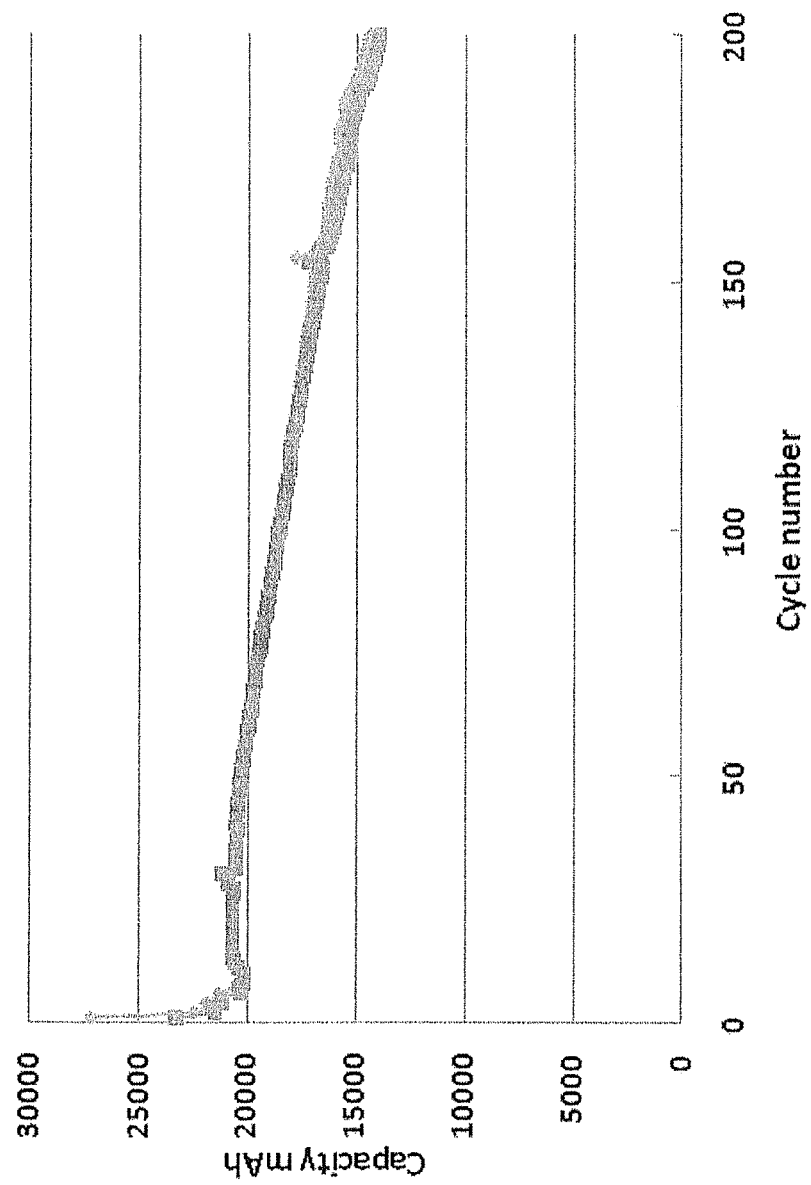

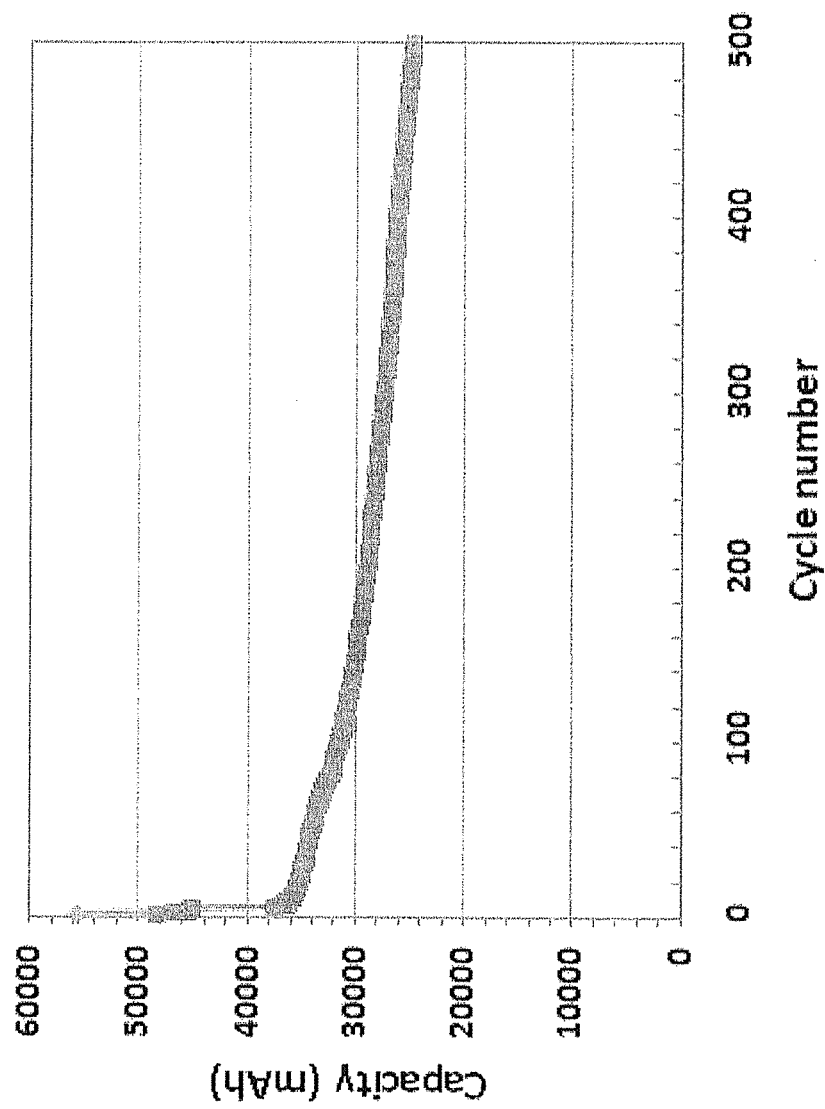

BATTERY DESIGNS WITH HIGH CAPACITY ANODE MATERIALS AND CATHODE MATERIALS

CROSS REFERENCE TO RELATED APPLICATIONS

This application is a continuation-in-part of copending U.S. patent application Ser. No. 13/464,034 filed May 4, 2012 to Masarapu et al., entitled "Battery Cell Engineering and Design to Reach High Energy," incorporated herein by reference.

GOVERNMENT RIGHTS

Development of the inventions described herein was at least partially funded with government support through U.S. Department of Energy grant ARPA-E-DE-AR0000034 and California Energy Commission grant ARV-09-004, and the U.S. government has certain rights in the inventions.

FIELD OF THE INVENTION

The inventions, in general, relate to high energy lithium batteries having silicon based high capacity negative electrode and high capacity positive electrodes that can be designed to provide high energy output and long cycle life. The invention further relates to electrodes with conductive additives such as carbon nanotubes, in which the electrode have high percentage of active material, high loading levels and high densities to achieve high energy densities when incorporated into cells.

BACKGROUND

Lithium batteries are widely used in consumer electronics due to their relatively high energy density. Rechargeable batteries are also referred to as secondary batteries, and lithium ion secondary batteries generally have a negative electrode material that incorporates lithium when the battery is charged. For some current commercial batteries, the negative electrode material can be graphite, and the positive electrode material can comprise lithium cobalt oxide ($LiCoO_2$). In practice, only a modest fraction of the theoretical capacity of the positive electrode active material generally can be used. At least two other lithium-based positive electrode active materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to a lithium ion secondary battery comprising a positive electrode, a negative electrode, a separator between the positive electrode comprising a lithium metal oxide and the negative electrode comprising a lithium intercalation/alloying composition, supplemental lithium in an amount with an oxidation capacity corresponding to 0% to 110% of the irreversible capacity loss of the negative electrode and an electrolyte comprising lithium ions. In some embodiments, during the first initial activation charge, the battery has a negative electrode charge capacity of about 75% to about 99.5% at a rate of C/20 from the open circuit voltage to 4.6V relative to the sum of the positive electrode charge capacity at a rate of C/20 from the open circuit voltage to 4.6V plus the oxidation capacity of any supplemental lithium. Following activation of the battery in a first charge cycle the positive electrode can have a specific discharge capacity of at least 180 mAh/g with respect to the weight of the positive electrode active material, the negative electrode can has a specific discharge capacity of at least 700 mAh/g with respect to the weight of the negative electrode active material at a rate of C/3 discharged from 4.5V to 1.5V, and the battery can have a discharge energy density of at least about 250 Wh/kg at C/3 when discharged from 4.5V to 1.5V. In some embodiments, the lithium intercalation/alloying composition of the negative electrode comprises a carbon composite comprising nanostructured elemental silicon, silicon alloy and/or silicon oxide.

In another aspect, the invention pertains to lithium ion secondary battery comprising a positive electrode, a negative electrode, and a separator between the positive electrode and the negative electrode, in which the positive electrode has a density in the range of about 2.2 g/cc to about 3.3 g/cc and a loading level of positive electrode active material on a current collector that is from about 10 $mg/cm^2$ to about 30 $mg/cm^2$, and in which the negative electrode comprises a high capacity negative electrode active material with a discharge specific capacity of at least about 700 mAh/g at a rate of C/3, has a density in the range of about 0.2 g/cc to about 1.3 g/cc, and has a loading level of negative electrode active material that is at least 1.5 $mg/cm^2$. The battery can have a discharge energy density at the 50th charge-discharge cycle of at least about 250 Wh/kg at C/3 when discharged from 4.5V to 1.5V.

In a further aspect, the invention pertains to a positive electrode for a lithium ion secondary battery comprising from about 90 wt % to about 96 wt % positive electrode active material, from about 2 wt % to about 6 wt % polymeric binder, and from about 0.5 wt % to about 8 wt % carbon nanotube as conductive additive. In some embodiments, the positive electrode can have a specific discharge capacity of at least 180 mAh/g at C/3 from 4.6V to 2V against lithium.

In an additional aspects, the invention pertains to a negative electrode for a lithium ion secondary battery comprising from about 60 wt % to about 90 wt % of a high capacity negative electrode active material, from about 8 wt % to 30 wt % of a polymeric binder, and from about 1 wt % to 15 wt % conductive additive. In some embodiments, the electrode can have a specific discharge capacity from about 1.5V to 5 mV against lithium of at least 700 mAh/g at C/3.

In other aspects, the invention pertains to a lithium ion battery comprising an electrode stack comprising a plurality of positive electrode elements, a plurality of negative electrode elements, a separator material separating an adjacent positive electrode element and negative electrode element and a current collector associated with each electrode element, at least one positive electrode element and one negative electrode element comprising an electrode structure coated onto both sides of the respective current collector. an enclosure; and electrolyte comprising lithium ions. In some embodiments, each positive electrode has an active material comprising a lithium rich metal oxide, the active material having a specific discharge capacity of at least about 195 mAh/g at C/3 discharged from 4.6 V to 2V against lithium and having a loading from about 13 mg/cm$^2$ to about 35 mg/cm$^2$ on one side of the current collector and a density from about 2.5 g/cc to about 3 g/cc. Similarly, in some embodiments, each negative electrode has an active material comprising a silicon based material, the active material having a specific discharge capacity of at least about 700 mAh/g at C/3 discharged from 1.5V to 5 mV against lithium and having a loading from about 2 mg/cm$^2$ to about 6 mg/cm$^2$ on one side of the current collector and a density from about 0.2 g/cc to about 1.5 g/cc.

Moreover, the invention pertains to a lithium ion battery comprising an electrode stack comprising 3-50 positive electrode elements each comprising a current collector and a positive electrode structure on a surface of the current collector with at least one electrode element having an electrode structure on both sides of the current collector, 3-50 negative electrode elements each comprising a current collector and a positive electrode structure on a surface of the current collector with at least one electrode element having an electrode structure on both sides of the current collector, and a separator material separating an adjacent positive electrode element and negative electrode element, an enclosure that encloses the electrode stack, and electrolyte comprising lithium ions. Each positive electrode can have an active material comprising a lithium rich metal oxide, an area along one side from about 100 cm$^2$ to about 400 cm$^2$, a loading from about 13 mg/cm$^2$ to about 35 mg/cm$^2$ one side of the respective current collector and a density from about 2.5 g/cc to about 3 g/cc, and each negative electrode can comprise a silicon based active material, a loading from about 3 mg/cm$^2$ to about 6 mg/cm$^2$ on one side of the respective current collector and a density from about 0.8 g/cc to about 1.2 g/cc. In some embodiments, the battery has an energy density from about 250 Wh/kg to about 550 Wh/kg.

BRIEF DESCRIPTION OF THE DRAWINGS

FIG. 2(a) is an exploded view of a pouch battery with a battery core separated from two portions of the pouch case.

FIG. 2(b) is a perspective lower face view of the assembled pouch battery of FIG. 2(a).

FIG. 2(c) is a bottom plan view of the pouch battery of FIG. 2(b).

FIG. 11(a) is a plot of discharge capacity versus cycle number of a 20 Ah at C/3 capacity pouch cell battery with supplemental lithium cycled up to 200 cycles.

FIG. 12(a) is a plot of discharge capacity versus cycle number of a pouch cell battery with supplemental lithium having approximately 48 Ah design capacity cycled up to 500 cycles.

DETAILED DESCRIPTION OF PREFERRED EMBODIMENTS

Figure 1:
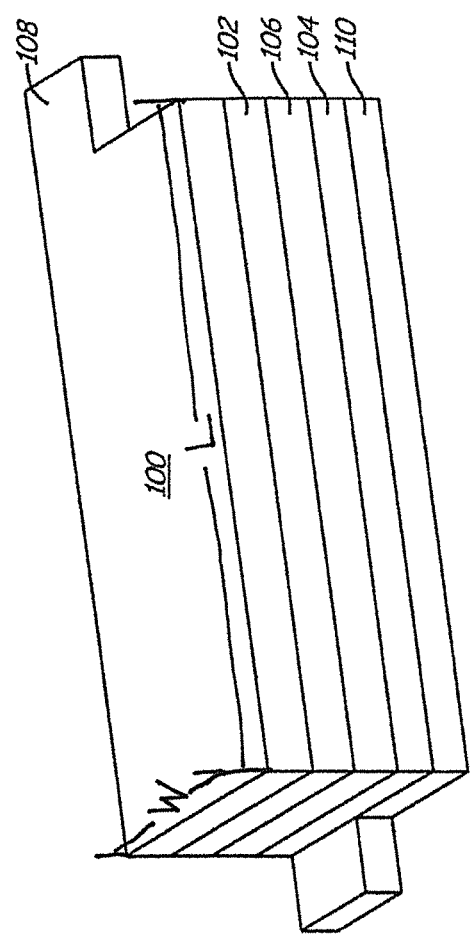
FIG. 1 is a schematic perspective view of an electrode stack useful for the formation of a battery.

Battery designs have been developed to take particular advantage of high specific capacity active materials used in both the positive electrode and the negative electrode. In particular, important design parameters with the appropriate values have been identified to achieve a high performance with respect to capacity, power, rate capability and cycling. Identification of appropriate cell design and electrode parameters has been found to be very significant in obtaining consistent good performance across selected performance parameters. With respect to the positive electrode active materials, lithium rich mixed metal oxides have been developed that can achieve excellent cycling with stable specific capacities significantly exceeding traditional materials. The availability of high capacity positive electrode active materials incites motivation for the incorporation of high capacity negative electrode active materials to take greater advantage of the high capacity materials with respect to the overall battery structure. Negative electrode active materials of particular interest can be silicon based materials with a large specific capacity relative to graphite. Specifically, significant advances have been made with respect to nanostructured elemental silicon as well as silicon suboxides that provide significantly improved cycling properties relative to bulk elemental silicon. It has been discovered that by effectively combining improved capacity materials in both electrodes with a selected balance of the electrodes and with appropriate electrode loading and density preserves cycling and provides for efficient battery architecture and good rate performance of the battery.

In some embodiments, it has been found that supplemental lithium added to the battery can compensate for high first cycle irreversible capacity loss associated with the high capacity negative electrode active material and to significantly improve cycling of the batteries. Furthermore, carbon nanotubes have been found to improve cycling performance when used as an electrically conductive additive in the electrodes. Pouch batteries are described that take advantage of these design improvements to achieve high energy performance of a battery based on both weight and volume of the battery. In particular, pouch batteries can be designed for electric vehicle use based on a design to achieve a desired range of gravimetric energy densities and volumetric energy densities. The batteries are suitable for the formation of automotive battery packs. In other embodiments, the batteries can be designed for use in consumer electronics, which generally have a smaller volume than a corresponding automotive battery.

Lithium has been used in both primary and secondary batteries. An attractive feature of lithium metal for battery use is its light weight and the fact that it is the most electropositive metal, and aspects of these features can be advantageously captured in lithium-based batteries also. Certain forms of metals, metal oxides, and carbon materials are known to incorporate lithium ions into the material through intercalation, alloying or similar mechanisms. Lithium ion batteries generally refer to batteries in which the negative electrode active material is also a lithium intercalation/alloying material.

If elemental lithium metal itself is used as the anode or negative electroactive material, the resulting battery generally is referred to as a lithium battery. Lithium batteries can initially cycle with good performance, but dendrites can form upon lithium metal deposition that eventually can breach the separator and result in failure of the battery. As a result, commercial lithium-based secondary batteries have generally avoided the deposition of lithium metal through the use of a negative electrode active material that operates through intercalation/alloying or the like above the lithium deposition voltage and with a slight excess in negative electrode capacity relative to the cathode or positive electrode. The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, the anode (negative electrode) undergoes the opposite reactions from the cathode to maintain charge neutrality. Unless indicated otherwise, performance values referenced herein are at room temperature, i.e., about 23±2° C.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form, i.e. elemental metal or a corresponding alloy of the metal's elemental form, i.e. metal alloy. In other words, a metal oxide or other metal composition, other than metal alloys, generally is not metallic.

The design of the battery significantly affects the resulting performance of the battery, and a design would necessarily include several parameters. With respect to a pouch battery, significant parameters include, for example, number of electrode layers within an electrode stack, the area of an electrode, the design of the positive electrode, the design of the negative electrode and the capacity balance between the positive electrode and the negative electrode. Pouch batteries generally comprise a foil enclosure comprising a polymer film, metal foil, combinations thereof or the like formed into a roughly prismatic shape. The electrode design parameters include, for example, composition, loading and density, and the balance of the electrodes couples the relative designs of the electrodes. Other general battery parameters include, for example, current collector properties, separator properties and casing. The general battery features are assumed to be the current state of the art, and these features are expected to change just incrementally in the foreseeable future.

The availability of high capacity, relatively high voltage active materials provides for the possibility for forming a high energy density battery based on a gravimetric basis or a volumetric basis. Practical constraints provide significant boundaries on many important parameters of the battery, in particular relating to the electrodes. The electrodes are generally formed in contact with a metal current collector, such as a foil. It is generally desirable to place an electrode structure on both sides of a current collector assembled into an electrode stack with a plurality of electrodes of each polarity, although an electrode assembly at the end of stack may only have an electrode along the inner surface of the current collector. The loading of active material within an electrode can be constrained by the ability to maintain the integrity of the electrode assembly during formation and use. The thickness and density of an electrode can be correlated with the ability of the battery to discharge at a desired rate and to cycle stably. The design parameters described herein are realistic with respect to obtaining performance that is realistic for a commercially suitable battery.

The battery designs are based upon a range of active material capacities. In the selection of an active material, various performance criteria can be used so that maximizing capacity is not the only issue with respect to active material selection. For example, an active material can be selected to have a lower DC electrical resistance in exchange for a lower capacity. The high capacity positive electrode active materials generally can be charged to voltages of 4.6V or greater, although it can be desirable to cycle the battery over a lower voltage window to achieve more stable long cycling properties. The performance properties of a battery then can be referenced to various voltage values, which may or may not be relevant to standard usage of the battery. Thus, performance values are described herein based on several voltage ranges and also at several different discharge rates, whether or not the batteries are designed for operation at the particular voltages. The effect of balance of the electrodes with respect to voltage windows is discussed in some detail below.

Realistic high capacity positive electrode active materials can have a specific capacity of at least about 200 mAh/g discharged from 4.6V to 1.5V at a rate of C/20. Similarly, realistic high capacity negative electrode active materials can have a specific capacity of at least about 900 mAh/g discharged from 4.6V to 1.5V at a rate of C/20 when discharged against a lithium metal oxide positive electrode active material or from 1.5V to 0.005V at a rate of C/20 against lithium metal counter electrode. For the description of battery design two alternative sets of active material are used to provide desired ranges for design parameters. In a first version, a positive electrode active material is assumed to have a C/20 specific capacity of 270 mAh/g, and a negative electrode active material is assumed to have C/20 discharge specific capacity of 2000 mAh/g. In a second version, a positive electrode active material is assumed to have a C/20 specific capacity of 204 mAh/g, and a negative electrode active material is assumed to have a specific capacity of 1000 mAh/g at C/20. The capacities of the active materials are generally tested against lithium metal counter electrode to provide an estimate of capacity, which is generally similar to the capacities observed in lithium ion batteries with intercalation/alloying materials used for both electrodes.

With high capacity negative electrode active materials, the materials have a large irreversible capacity loss during the first charge. To compensate for the loss of reactive lithium due to the large irreversible capacity loss attributable to the negative electrode, supplemental lithium can be provided, as described further below, to obviate the need for supplying the extractable lithium with extra positive electrode active material. Thus, the use of supplemental lithium can be effective to achieve higher energy densities for the batteries since active positive electrode material does not need to be included in that battery that does not cycle, which results in added unused weight and volume. The use of supplemental lithium thus can be significant with respect to obtained desired levels of energy density as described herein. The supplemental lithium also influences the electrode balance since the positive electrode active material along with the supplemental lithium both contribute extractable lithium available during the first battery charge.

Two different electrode balances are described herein, and batteries designed with each balance approach are appropriate for suitable commercial applications. In more traditional balancing of the anode and cathode, excess anode is used to avoid deposition of lithium metal during charging since the deposition of lithium metal generally is associated with the failure of the battery due to breach of the separator. Battery designs are described with traditional amounts of negative electrode balance accounting for the non-traditional active materials, which can be effectively used with high energy densities with appropriate designs. Also described herein, in some embodiments batteries can be balanced with reduced amounts of negative electrode relative to positive electrode at low rate reference capacities due to capacity reduction of the positive electrode at higher rates as well as the use of a reduced voltage window during operation so that lithium metal is not deposited at the negative electrode in higher rate operation. These underbalanced battery designs at low rate discharge can have higher full capacity energy densities, but these batteries may not be suitable for long cycling at lower discharge rates.

The battery designs herein take advantage of electrode designs based on realistic electrode densities and loadings that can be achieved with the high capacity materials that have been developed. In particular, the density of the electrodes is desirably high to achieve a high overall capacity for a weight of the battery while not making the densities so high that cycling performance is lost. Similarly, the electrode loadings are selected to balance rate performance of the batteries with the overall capacity. Based on these improved designs, batteries are described with extremely high energy densities of at least about 250 Wh/kg to energy densities exceeding 400 Wh/kg.

When lithium ion batteries are in use, the uptake and release of lithium from the positive electrode and the negative electrode induces changes in the structure of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss (IRCL) is the difference between the charge capacity of the new battery and the first discharge capacity. The irreversible capacity loss results in a corresponding decrease in the capacity, energy and power for the battery due to changes in the battery materials during the initial cycle.

The decreasing battery capacity with cycling can have contributions from the positive electrode, the negative electrode, the electrolyte, the separator or combinations thereof. The battery described herein combine positive electrode and negative electrode with improved capacities to assemble a high energy battery that has high capacity and cycling stability. It is useful to note that during charge/discharge measurements, the specific capacity of a material depends on the rate of discharge. The highest specific capacity of a particular material is measured at very slow discharge rates. In actual use, the actual specific capacity is less than the maximum value due to discharge at a faster rate. More realistic specific capacities can be measured using reasonable rates of discharge that are more similar to the rates encountered during actual use. For example, in low to moderate rate applications, a reasonable testing rate involves a discharge of the battery over three hours. In conventional notation this is written as C/3 or 0.33 C. Faster or slower discharge rates can be used as desired, and the rates can be described with the same notation.

The positive electrodes can exhibit a significant first cycle irreversible capacity loss. However, high capacity silicon-based anodes can generally exhibit contributions to IRCL significantly greater than the positive electrode active material. The design of the negative electrode active materials can be selected to reduce the IRCL, which can be significant with respect to reducing the excess anode balance in the cell design. Also, the positive electrode active material can similarly be designed to reduce IRCL associated with the positive electrode. Furthermore, supplemental lithium can be used as a substitute for additional capacity of the positive electrode to compensate for the relatively large IRCL of the negative electrode. With appropriate stabilization of the negative electrode and positive electrode, a battery with high capacity materials in both electrodes can exhibit high specific capacities for both electrodes over at least a moderate number of cycles.

The advances described herein are built upon previous development of a high energy battery using high capacity lithium metal oxides as described in published U.S. patent application 2009/0263707 to Buckley et al. ("the '707 application"), entitled "High Energy Lithium Ion Secondary Batteries," incorporated herein by reference. The present developments significantly advance the designs of the '707 application through the identification of designs to take particular advantage of incorporation of high capacity silicon-based active anode materials as well as design improvements that accomplish long term cycling. Significant advance relates to the balance of the high capacity positive electrode properties with the high capacity negative electrode properties. With the high energy batteries described herein are generally based on high capacity positive electrode active materials, such as lithium rich lithium metal oxides described below. When used with high capacity negative electrode active materials, the loading on a current collector is generally increased to obtain the high energy of the battery without excess weight and volume associated with more electrodes in the battery stack. However, loading and electrode densities are limited by performance properties. In particular, cycling performance degrades if the density of the cathode is increased too much, and capacity can decrease if the loading is increased too much. As found herein, the use of improved electrically conductive additives, particularly carbon nanotubes, can increase performance parameters for specific loadings and densities for both the positive electrode and negative electrode.

High capacity negative electrodes can be formed with silicon-based active materials. These materials can supply very high capacity with reasonable cycling properties. With the high capacity negative electrodes, the electrode designs involve appropriate selection of loading, density and electrically conductive additives. To achieve desired cycling properties, the balance of the negative electrode capacity to the positive electrode capacity can be adjusted with a reasonable amount of excess negative electrode capacity, and the balance of the positive electrode and negative electrode very significantly influences performance. To achieve improved cycling, supplemental lithium can be included in the battery.

The high capacity negative electrode active materials generally have a large irreversible capacity loss resulting from the first charge-discharge cycle. It has been found that the addition of supplemental lithium can effectively compensate for this loss of capacity. It has also been found that supplemental lithium can improve the cycling performance of lithium rich high capacity lithium metal oxides in the cathode. In particular, the compensation of the irreversible capacity loss for the high capacity anode materials is described further in published U.S. patent application 2011/0111294 to Lopez et al. (the '294 application), entitled "High Capacity Anode Materials for Lithium Ion Batteries," incorporated herein by reference. The use of supplemental lithium to improve the cycling properties of high capacity lithium rich cathode materials is described further in copending U.S. patent application Ser. No. 12/938,073 to Amiruddin et al. (the '073 application), entitled "Lithium Ion Batteries With Supplemental Lithium," incorporated herein by reference. Supplemental lithium, for example, can be supplied by elemental lithium, lithium alloys, a sacrificial lithium source or through electrochemical lithiation of the negative electrode prior to completion of the ultimate battery. Some high capacity negative electrode active materials have lower irreversible capacity loss, and for batteries with these materials, supplemental lithium may or may not be desirable to compensate for loss of lithium.

In general, reasonable batteries for various uses can be made in various shapes, such as cylindrical and prismatic. For the battery designs described herein, it is assumed that the batteries are approximately prismatic pouch batteries with an electrode stack having a plurality of electrodes of each polarity. Electrode designs that provide good performance have been established, and corresponding ranges of electrode properties are incorporated into the battery designs described herein. To obtain a greater energy density, the battery size can generally be increased through the addition of a larger number of electrodes or by increasing the area of the electrodes, although the energy density plateaus as battery size increase. Of course, there are desired constraints on the battery size, generally both with respect to thickness and area. But there are generally also desired constraints on total capacity of the battery. For example, in a battery pack, there may be a desired total volume and voltage output, so that a number of batteries are connected in series to obtain the desired voltage. The energy output then is divided with lower capacity batteries connected in series to generate a smaller total current at a higher voltage.

In summary, battery designs can take advantage of the relatively high capacities for the positive electrode active materials and negative electrode active materials to achieve high gravimetric energy densities and volumetric energy densities. The battery designs have realistic parameters for moderate to high rate capability and good cycling performance. The battery designs are well suited for important commercial applications.

The high energy batteries described herein can achieve high values of energy density and volumetric energy density. Pouch cell formats are particularly desirable due to their efficient weight and volume packaging. Using high specific capacity materials described herein, the high energy densities can be reasonably maintained during cycling. The batteries are suitable for a range of commercial applications, such as electric vehicles, consumer electronics and the like.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte, such as the desirable electrolytes described herein, in contact with the electrodes provides ionic conductivity through the separator between electrodes of opposite polarity. A battery generally comprises current collectors 108, 110 associated respectively with negative electrode 102 and positive electrode 104. The stack of electrodes with their associated current collectors and separator are generally placed within a container with the electrolyte. In general, the lithium ion battery described herein comprises a positive electrode comprising a lithium intercalation material and a negative electrode comprising a lithium intercalation/alloying material.

The nature of the positive electrode active material and the negative electrode active material influences the resulting voltage of the battery since the voltage is the difference between the half cell potentials at the cathode and anode. Suitable positive electrode active materials and suitable negative electrode lithium intercalation/alloying compositions with high capacity are described in detail below.

The positive electrode active compositions and negative electrode active compositions generally are powder compositions that are held together in the respective electrode with a polymer binder. The binder provides ionic conductivity to the active particles when in contact with the electrolyte. Suitable polymer binders include, for example, polyvinylidene fluoride (PVDF), polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. As described in the '707 application cited above, high molecular weight (e.g., at least about 800,000 AMU) PVDF is a particularly desirable polymer binder for the positive electrodes. Furthermore, thermally curable polyimide polymers have been found desirable for high capacity negative electrodes, which may be due to their high mechanical strength. The following table provides suppliers of polyimide polymers, and names of corresponding polyimide polymers.

| Supplier | Binder |
|---|---|
| New Japan Chemical Co., Ltd. | Rikacoat PN-20; Rikacoat EN-20; Rikacoat SN-20 |
| HD MicroSystems | PI-2525; PI-2555; PI-2556; PI-2574 |
| AZ Electronic Materials | PBI MRS0810H |
| Ube Industries. Ltd. | U-Varnish S; U-Varnish A |
| Maruzen petrochemical Co., Ltd. | Bani-X (Bis-allyl-nadi-imide) |
| Toyobo Co., Ltd. | Vyromax HR16NN |

With respect to polymer properties, some significant properties for high capacity negative electrode application are summarized in the following table.

| Binder | Elongation | Tensile Strength (MPa) | Elastic Modulus | Viscosity (P) |
|---|---|---|---|---|
| PVDF | 5-20% | 31-43 | 160000 psi | 10-40 |
| Polyimide | 70-100% | 150-300 | | 40-60 |
| CMC | 30-40% | 10-15 | | 30 |

PVDF refers to polyvinylidene fluoride, and CMC refers to sodium carboxy methyl cellulose. The elongation refers to the percent elongation prior to tearing of the polymer. In general, to accommodate the silicon based materials, it is desirable to have an elongation of at least about 50% and in further embodiments at least about 70%. Similarly, it is desirable for the polymer binder to have a tensile strength of at least about 50 MPa and in further embodiments at least about 100 MPa. Tensile strengths can be measured according to procedures in ASTM D638-10 Standard Test Method for Tensile Properties of Plastics, incorporated herein by reference. A person of ordinary skill in the art will recognize that additional ranges of polymer properties within the explicit ranges above are contemplated and are within the present disclosure. To form the electrode, the powders can be blended with the polymer in a suitable liquid, such as a solvent for the polymer. The resulting paste can be pressed into the electrode structure.

Electrodes

The active material loading in the binder can be large. In some embodiments, the positive electrode comprises from about 85 to about 98% of positive electrode active material, in other embodiments from about 88 to about 97% of the positive electrode active material, and in further embodiments from about 92 to about 96% of the positive electrode active material. In some embodiments, the negative electrode has from about 60 to about 96% of negative electrode active material, in other embodiments from about 70 to about 90% of the negative electrode active material, and in further embodiments from about 75 to about 85% of the negative electrode active material. A person of ordinary skill in the art will recognize that additional ranges of particles loadings within the explicit ranges about are contemplated and are within the present disclosure.

In some embodiments, the positive electrode has from about 1 to about 10% polymeric binder, in other embodiments from about 1.5 to about 7.5% polymeric binder, and in further embodiments from about 2 to about 5% polymeric binder. In some embodiments, the negative electrode has from about 2 to about 30% polymeric binder, in other embodiments about 5 to 25% polymeric binder, and in further embodiments from about 8 to 20% polymeric binder. A person of ordinary skill in the art will recognize that additional ranges of polymer loadings within the explicit ranges above are contemplated and are within the present disclosure.

The positive electrode composition, and in some embodiments the negative electrode composition, generally can also comprise an electrically conductive additive distinct from the electroactive composition. In some embodiments, to achieve improved performance a conductive additive can have a conductivity of at least about 40 S/cm, in some embodiments at least about 50 S/cm, and in further embodiments at least about 60 S/cm. A person of ordinary skill in the art will recognize that additional ranges of conductivity within the explicit ranges above are contemplated and are within the present disclosure. Electrical conductivity, which is the inverse of resistivity, is reported by distributors, and the conductivity is generally measured using specific techniques developed by the distributors. For example, measurements of carbon black electrical resistance is performed between two copper electrodes with Super P™ carbon blacks, see Timcal Graphite & Carbon, A Synopsis of Analytical Procedures, 2008, www.timcal.com. Suitable supplemental electrically conductive additives include, for example, graphite, graphene, carbon fibers, carbon black, metal powders, such as silver powders, metal fibers, such as stainless steel fibers, and the like, and combinations thereof. Carbon nanotubes have been found to be a desirable conductive additive that can improve cycling performance for either a positive electrode or a negative electrode. In particular, for high loading levels of active materials in the electrodes, e.g., at least about 20 $mg/cm^2$, carbon nanotubes provided surprising improvement in the rate capabilities of the resulting electrodes relative to electrodes formed with other electrically conductive additives even though the electrical conductivities of the materials were similar.

In some embodiments, the positive electrode can have 0.5 weight percent to about 15 weight percent conductive additive, in further embodiments from about 0.75 weight percent to about 12.5 weight percent, and in other embodiments from about 1 weight percent to about 10 weight percent conductive additive. Similarly, the negative electrode can have 1 weight percent to about 20 weight percent conductive additive, in further embodiments from about 1.5 weight percent to about 15 weight percent, and in other embodiments from about 2 weight percent to about 10 weight percent conductive additive. In some embodiments, the conductive additive used in the negative electrode is carbon nanotubes, although a combination of conductive carbon conductive additives can be used. The conductive additive used in the positive electrode can also be a combination of electrically conductive additives listed above. Specifically, in some embodiments, the conductive additive used in the positive electrode is a combination of carbon nanotubes with optionally an additional conductive additive including carbon nanofiber, nanostructured carbon, graphene, KS6, Super-P, or a combination thereof. A person of ordinary skill in the art will recognize that additional ranges of amounts of electrically conductive additive within the explicit ranges above are contemplated and are within the present disclosure.

The positive electrode and negative electrode used in the batteries described herein can have high loading levels along with reasonably high electrode density. For a particular loading level, the density is inversely correlated with thickness so that an electrode with a greater density is thinner than an electrode with a lower density. In some embodiments, the negative electrode of the battery has a loading level of negative electrode active material that is at least about 1.5 $mg/cm^2$, in other embodiments from about 2 $mg/cm^2$ to about 8 $mg/cm^2$, in additional embodiments from about 4 $mg/cm^2$ to about 7 $mg/cm^2$, and in other embodiments from about 3 mg/cm$^2$ to about 6 mg/cm$^2$. In some embodiments, the negative electrode of the battery has a density in some embodiment from about 0.2 g/cc (cc=cubic centimeters) to about 2 g/cc, in other embodiment from about 0.35 g/cc to about 1.7 g/cc, and in additional embodiments from about 0.4 g/cc to about 1.5 g/cc. A person of ordinary skill in the art will recognize that additional ranges of active material loading level and electrode densities within the explicit ranges above are contemplated and are within the present disclosure.

In some embodiments, the positive electrode of the battery has a loading level of positive electrode active material that is from about 10 to about 40 mg/cm$^2$, in other embodiments from about 12 to about 37.5 mg/cm$^2$, in additional embodiments from about 13 to about 35 mg/cm$^2$, and in other embodiments from 20 to about 32.5 mg/cm$^2$ In some embodiments, the positive electrode of the battery has an active material density in some embodiment from about 2.0 g/cc to about 3.3 g/cc, in other embodiment from about 2.2 g/cc to 3.1 g/cc, and in additional embodiment from about 2.3 g/cc to about 2.6 g/cc. A person of ordinary skill in the art will recognize that additional ranges of active material loading level and electrode densities within the explicit ranges above are contemplated and are within the present disclosure.

In some embodiments, when the positive electrode or negative electrode uses a high loading level, the density of the electrode can be reduced to provide good cycling stability of the electrode. The density of the electrodes is a function, within reasonable ranges, of the press pressures. Generally, the density of the electrodes cannot be arbitrarily increased without sacrificing performance with respect to loading levels while achieving desired cycling performance and capacity at higher discharge rates.

Each electrode generally is associated with an electrically conductive current collector to facilitate the flow of electrons between the electrode and an exterior circuit. A current collector can comprise a metal structure, such as a metal foil or a metal grid. In some embodiments, a current collector can be formed from nickel, aluminum, stainless steel, copper or the like. An electrode material can be cast as a thin film onto a current collector. In some embodiments, an electrode can be loaded onto each surface of a current collector to improve battery performance. The electrode material with the current collector can then be dried, for example in an oven, to remove solvent from the electrode. In some embodiments, a dried electrode material in contact with a current collector foil or other structure can be subjected to a pressure from about 2 to about 10 kg/cm$^2$ (kilograms per square centimeter). The current collector used in the positive electrode can have a thickness from about 5 microns to about 30 microns, in other embodiments from about 10 microns to about 25 microns, and in further embodiments from about 14 microns to about 20 microns. In one embodiment, the positive electrode uses an aluminum foil current collector. The current collector used in the negative electrode can have a thickness from about 2 microns to about 20 microns, in other embodiments from about 4 microns to about 14 microns, and in further embodiments from about Gum to about 10 um. In one embodiment, the negative electrode uses copper foil as current collector. A person of ordinary skill in the art will recognize that additional ranges of current collector within the explicit ranges above are contemplated and are within the present disclosure.

General Battery Features

The separator is located between the positive electrode and the negative electrode. The separator is electrically insulating while providing for at least selected ion conduction between the two electrodes. A variety of materials can be used as separators. Some commercial separator materials can be formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. Polymer-ceramic composites for lithium ion battery separators are sold under the trademark Separion® by Evonik Industries, Germany.

The electrolyte provides for ion transport between the anode and cathode of the battery during the charge and discharge processes. We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, and combinations thereof. In some embodiments, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in copending U.S. patent applications 2011/0136019 to Amiruddin et al. entitled: "Lithium ion battery with high voltage electrolytes and additives", incorporated herein by reference.

Electrolyte with fluorinated additives has shown to further improve the battery performance for batteries with silicon based negative electrode active material. The fluorinated additives can include, for example, fluoroethylene carbonate, fluorinated vinyl carbonate, monochloro ethylene carbonate, monobromo ethylene carbonate, 4-(2,2,3,3-tetrafluoropropoxymethyl)-[1,3]dioxolan-2-one, 4-(2,3,3,3-tetrafluoro-2-trifluoro methyl-propyl)-[1,3]dioxolan-2-one, 4-trifluoromethyl-1,3-dioxolan-2-one, bis(2,2,3,3-tetrafluoro-propyl)carbonate, bis(2,2,3,3,3-pentafluoro-propyl)carbonate, or mixtures thereof. In some embodiments, the electrolyte can comprise from about 1 weight percent to about 35 weight percent halogenated carbonate, in further embodiments from about 3 weight percent to about 30 weight percent and in other embodiments from about 5 weight percent to about 20 weight percent halogenated carbonate in the electrolyte as a fraction of the solvent plus electrolyte salt, as a fraction of the total electrolyte weight. A person of ordinary skill in the art will recognize that additional ranges of halogenated carbonate concentrations within the explicit ranges above are contemplated and are within the present disclosure. As described further in the Examples below, the incorporation of halogenated carbonate into the electrolyte has been observed to significantly improve the specific capacity and the cycling properties of batteries. Also, electrolytes with fluoroethylene carbonate have been found to have excellent low temperature performance as described in copending U.S. patent application Ser. No. 13/325,367 to Li et al. (the '367 application), entitled "Low Temperature Electrolyte for High Capacity Lithium Based Batteries," incorporated herein by reference.

The battery described herein can be assembled into various commercial battery designs such as prismatic shaped batteries, wound cylindrical batteries, coin cell batteries, or other reasonable battery shapes. The batteries can comprise a single pair of electrodes or a plurality of pairs of electrodes assembled in parallel and/or series electrical connection(s). While the materials described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used, as well as prismatic cells and foil pouch batteries of selected sizes.

Pouch cell batteries can be particularly desirable for vehicle applications due to stacking convenience and relatively low container weight. A pouch battery design for vehicle batteries incorporating a high capacity cathode active material is described in detail in U.S. Pat. No. 8,187,752 to Buckley et al, entitled "High Energy Lithium Ion Secondary Batteries" and published U.S. patent application 2012/0028105 to Kumar et al. (the '105 application), entitled "Battery Packs for Vehicles and High Capacity Pouch Secondary Batteries for Incorporation into Compact Battery Packs," both incorporated herein by reference. While the pouch battery designs are particularly convenient for use in specific battery pack designs, the pouch batteries can be used effectively in other contexts as well with high capacity in a convenient format. In one embodiment, the pouch cell batteries described herein uses a ceramic type of separator to improve cycling stability and safety of the battery.

A representative embodiment of a pouch battery is shown in FIGS. 2(a) to 2(c). In this embodiment, pouch battery 160 comprises pouch enclosure 162, battery core 164 and pouch cover 166. A battery core is discussed further below. Pouch enclosure 162 comprises a cavity 170 and edge 172 surrounding the cavity. Cavity 170 has dimensions such that battery core 164 can fit within cavity 170. Pouch cover 166 can seal around edge 172 to seal battery core 164 within the sealed battery, as shown in FIGS. 2(b) and 2(c). Referring to FIG. 2(b), the pouch enclosure 162 is sealed with the pouch cover 166 along edge 172 to form the pouch battery 160. Terminal tabs 174, 176 extend outward from the sealed pouch for electrical contact with battery core 164. FIG. 2(c) is a schematic diagram of a cross section of the battery of FIG. 2(b) viewed along the A-A line. Specifically, battery core 164 is shown to be encased inside the cavity 170 of the pouch enclosure 162 sealed along the edge 172 with pouch cover 166 to form the pouch battery 160. Many additional embodiments of pouch batteries are possible with different configurations of the edges and seals. Specific battery designs are described in detail below.

Figure 2D:
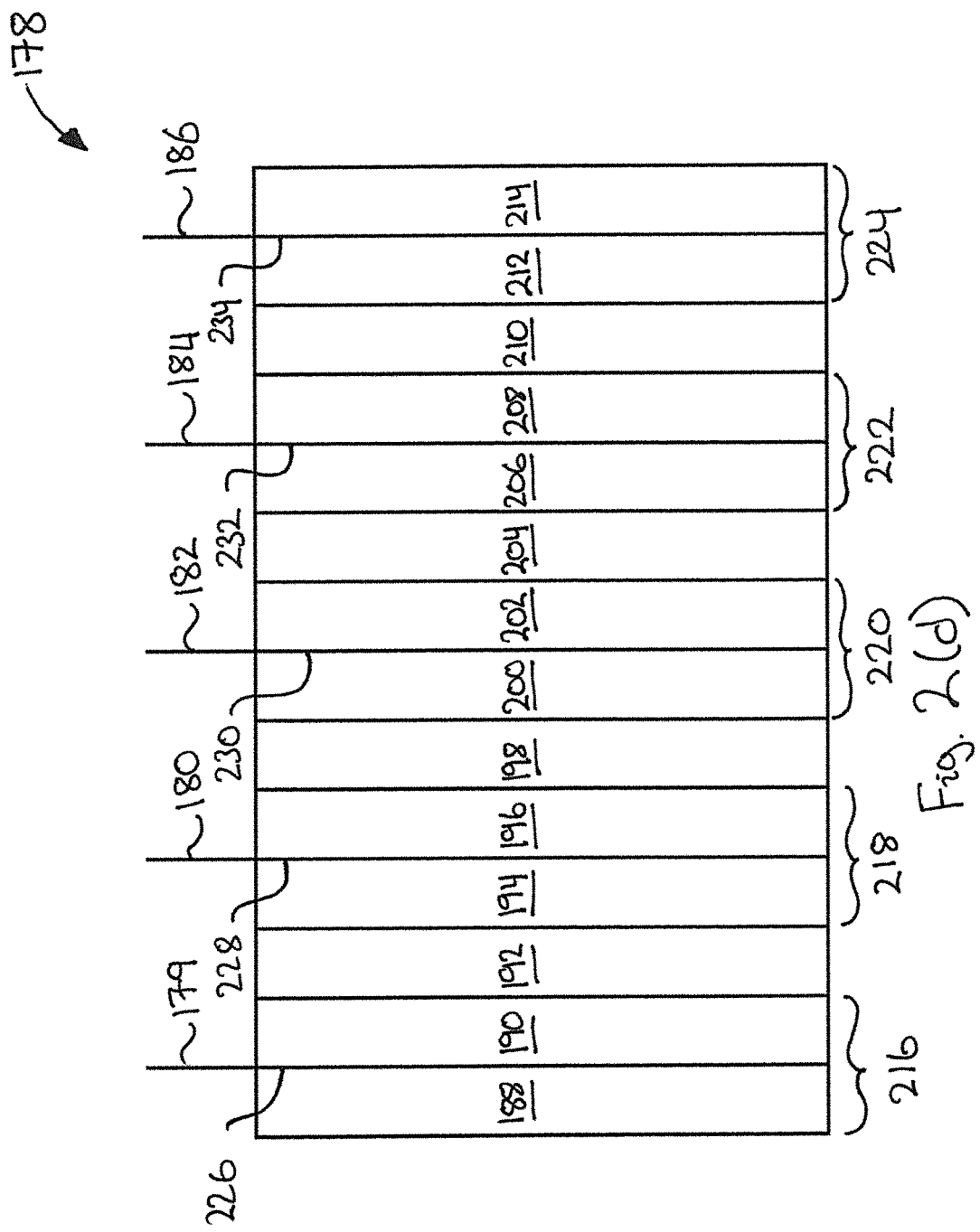
FIG. 2(d) is depiction of an embodiment of a battery core comprising an electrode stack.

FIG. 2(d) shows an embodiment of a battery core 164 that generally comprise an electrode stack. In this embodiment, electrode stack 178 comprises negative electrode structures 216, 220, 224, positive electrode structures 218, 222, and separators 192, 198, 204, 210 disposed between the adjacent positive and negative electrodes. Negative electrode structures 216, 220, 224 comprise negative electrodes 188, 190, negative electrodes 200, 202 and negative electrodes 212, 214, respectively, disposed on either side of current collectors 226, 230, 234. Positive electrode structures 218, 222 comprise positive electrodes 194, 196 and positive electrodes 206, 208, respectively, disposed on opposite sides of current collectors 228, 232, respectively. Tabs 179, 180, 182, 184, 186 are connected to current collectors 226, 228, 230, 232, 234, respectively, to facilitate the connection of the individual electrodes in series or in parallel. For vehicle applications, tabs are generally connected in parallel, so that tabs 179, 182, 186 would be electrically connected to an electrical contact accessible outside the container, and tabs 180, 184 would be electrically connected to an electrical contact as an opposite pole accessible outside the container.

It is traditional and convenient to place negative electrodes at both ends of the stack since this reduces likelihood of shorting if metal container or wrapper is placed on the outside of the battery, but this is not a requirement. In this design, there is an extra layer of negative electrode structure (current collector with double sided loading of negative electrode material) in the stack relative to the positive electrode. The outer negative structure may not have an outer loading of a negative electrode on the current collector, i.e., negative electrode 188 and negative electrode 214 can be omitted from the stack, but keeping these electrode layers can facilitate manufacturing since the same electrode structures or layers of the two polarities can be used to form the entire stack. While FIG. 2(d) depicts three negative electrode layers and two positive electrode layers, the particular numbers of electrode structures or layers within the electrode stack can be designed to meet performance and structural targets as described in detail below.

High Capacity Anode Materials

In general, the battery designs herein are based on a high capacity anode active material. Specifically, the anode active materials generally have a specific capacity of at least about 700 mAh/g, in further embodiments at least about 800 mAh/g and in additional embodiments at least about 900 mAh/g when cycled at a rate of C/10 against lithium metal from 0.005V to 1.5V. As this implies, the specific capacity of negative electrode active material can be evaluated in a cell with a lithium metal counter electrode. However, in the batteries described herein, the negative electrodes can exhibit comparable specific capacities when cycled against high capacity lithium metal oxide positive electrode active materials. In the battery with non-lithium metal electrodes, the specific capacity of the respective electrodes can be evaluated by dividing the battery capacity by the respective weights of the active materials.

New formulations of silicon based negative electrode active materials have been developed with high capacity and reasonable cycling properties. Elemental silicon has attracted significant amount of attention as a potential negative electrode material due to its very high specific capacity with respect to intake and release of lithium. Silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to four times of the original volume or greater has been observed, and the large volume changes have been correlated with a significant decrease in the cycling stability of batteries having silicon-based negative electrodes.

Germanium has a similar chemistry to silicon, and germanium and germanium oxide can be used to alloy/intercalate lithium similarly to silicon and silicon oxide as described below. Thus, germanium based active anode materials can be substituted for silicon based materials described herein, and generally similar composites, alloys and mixtures thereof can be formed with germanium as are described for silicon. Germanium has a theoretical specific capacity of 1623 mAh/g compared to the silicon theoretical specific capacity of 4200 mAh/g. Similarly, tin (Sn), tin alloys and tin compounds can interclate/alloy with lithium with a fairly high capacity and a desirable voltage range. Tin metal has a theoretical specific capacity of 993 mAh/g with respect to lithium alloying. Therefore, tin based active materials, such as tin, tin alloys (e.g., with Zn, Cd or In), tin oxides (SnO, $Sn_2O_3$ or $Sn_3O_4$), tin compounds (e.g., $ZnSnO_4$) or mixtures thereof, can be used as a high specific capacity anode active material. In general, to achieve the desired energy densities for the batteries, any high capacity anode material can be used having a specific capacity of at least approximately 700 mAh/g.

Also, elemental silicon as well as other high capacity materials in a negative electrode of a lithium-based battery can exhibit in some formulations a large irreversible capacity loss (IRCL) in the first charge/discharge cycle of the battery. The high IRCL of a silicon-based anode can consume a significant portion of the capacity available for the battery's energy output. Since the cathode, i.e., positive electrode, supplies all of the lithium in a traditional lithium ion battery, a high IRCL in the anode, i.e., negative electrode, can result in a low energy battery. In order to compensate for the large anode IRCL, supplemental lithium can be added to the negative electrode material to offset the IRCL. The use of supplemental lithium to improve the performance of silicon based electrodes is described also in the '294 application cited above, and Ser. No. 13/108,708 to Deng et al. (the '708 application) entitled: "Silicon oxide based high capacity anode materials for lithium ion batteries", both incorporated herein by reference. The use of supplemental lithium in the improved battery designs is described further below.

High capacity silicon based anode undergoes volume expansion during the charge/discharge process. To adapt to the volume expansion, the anode of the batteries described herein can use nanostructured active silicon based materials to accommodate better for volume expansion and thus maintain the mechanical electrode stability and cycle life of the battery. Nanostructured silicon based negative electrode compositions are disclosed in the '294 application, the '708 application, as well as copending U.S. patent application Ser. No. 13/354,096 to Anguchamy et al. (the '096 application), entitled: "Porous silicon based anode material formed using metal reduction," all incorporated herein by reference.

Suitable nanostructured silicon can include, for example, nanoporous silicon and nanoparticulate silicon. Also, nanostructured silicon can be formed into composites with carbon and/or alloys with other metal elements. The objective for the design of improved silicon-based materials is to further stabilize the negative electrode materials over cycling while maintaining a high specific capacity and in some embodiments reducing the irreversible capacity loss in the first charge and discharge cycle. Furthermore, pyrolytic carbon coatings are also observed to stabilize silicon-based materials with respect to battery performance.

Silicon nanoparticles can provide a high surface area material that can desirably adapt to volume changes in the material during silicon-lithium alloying. In general, nanoparticle silicon can comprise amorphous and/or crystalline silicon nanoparticles. Crystalline silicon nanoparticles can be desirable in some embodiments because of their larger electrical conductivity, relative to amorphous silicon nanoparticles. As used herein, nanoparticle silicon can comprise submicron particles with an average primary particle diameter of no more than about 500 nm, in further embodiments no more than about 250 nm, and in additional embodiments no more than about 200 nm. A particle diameter refers to the average diameters along principle axes of a particle. Primary particle dimensions refer to the dimensions of the particulates visible in a transmission electron micrograph, and the primary particles may or may not exhibit some degree of agglomeration and/or fusing. The primary particle size generally reflects the surface area of the particle collection, which is a significant parameter for performance as a battery active material. In some embodiments, the BET surface area can range from about 1 $m^2/g$ to about 100 $m^2/g$, and in further embodiments form about 5 $m^2/g$ to about 80 $m^2/g$. BET surface areas can be evaluated, for example, using commercially available instruments. A person of ordinary skill in the art will recognize that additional ranges of particle size and surface areas within the explicit ranges above are contemplated and are within the present disclosure.

Another suitable form of nanostructured silicon comprises porous silicon particles with nanostructured pores, and negative electrode active material can desirably comprise porous silicon and/or composites thereof. Porous silicon can have improved cycling behavior due to its high surface area and/or void volume, which can facilitate accommodation of volume changes with lithium alloying and de-alloying. In some embodiments, doped and non-doped porous silicon can be formed on bulk silicon by electro-chemical etching of silicon wafers. Recent work has developed porous silicon with significantly improved battery performance through the reduction of silicon oxide, as described further below.

In some embodiments, the negative electrode active composition can comprise a silicon-metal alloy and/or intermetallic material. Suitable silicon-metal intermetallic alloys are described in published U.S. patent application 2009/0305131A to Kumar et al., entitled "High Energy Lithium Ion Batteries With Particular Negative electrode Compositions," incorporated herein by reference. The alloy/intermetallic materials can be represented by the formula $Si_xSn_qM_yC_z$ where $(q+x)>2y+Z$, $q\geq0$, $z\geq0$, and M is metal selected from manganese, molybdenum, niobium, tungsten, tantalum, iron, copper, titanium, vanadium, chromium, nickel, cobalt, zirconium, yttrium, and combinations thereof. See also, published U.S. patent application 2007/0148544A to Le, entitled "Silicon-Containing Alloys Useful as Electrodes for Lithium-Ion Batteries," incorporated herein by reference. In the materials described herein, generally the carbon materials and processing conditions are selected such that the carbon does not form a SiC compound with the silicon. Results have been presented with alloys or composites having z=0 and q=0, so that the formula simplifies to $Si_xM_y$, where x>2y and M=Fe or Cu. See the '294 application cited above. The alloys were formed by appropriate milling.

With respect to the composite materials, nanostructured silicon components can be combined with, for example, carbon nanoparticles and/or carbon nanofibers. The components can be, for example, milled to form the composite, in which the materials are intimately associated. Generally, it is believed that the association has a mechanical characteristic, such as the softer silicon coated over or mechanically affixed with the harder carbon materials. In additional or alternative embodiments, the silicon can be milled with metal powders to form alloys, which may have a corresponding nanostructure. The carbon components can be combined with the silicon-metal alloys to form multi-component composites.

Also, carbon coatings can be applied over the silicon-based materials to improve electrical conductivity, and the carbon coatings seem to also stabilize the silicon based material with respect to improving cycling and decreasing irreversible capacity loss. Desirable carbon coatings can be formed by pyrolyzing organic compositions. The organic compositions can be pyrolyzed at relatively high temperatures, e.g., about 800° C. to about 900° C., to form a hard amorphous coating. In some embodiments, the desired organic compositions can be dissolved in a suitable solvent, such as water and/or volatile organic solvents for combining with the silicon based component. The dispersion can be well mixed with silicon-based composition. After drying the mixture to remove the solvent, the dried mixture with the silicon based material coated with the carbon precursor can be heated in an oxygen free atmosphere to pyrolyze the organic composition, such as organic polymers, some lower molecular solid organic compositions and the like, and to form a carbon coating, such as a hard carbon coating. The carbon coating can lead to surprisingly significant improvement in the capacity of the resulting material. Also, environmentally friendly organic compositions, such as sugars and citric acid, have been found to be desirable precursors for the formation of pyrolytic carbon coatings. Elemental metal coatings, such as silver or copper, can be applied as an alternative to a pyrolytic carbon coating to provide electrical conductivity and to stabilize silicon-based active material. The elemental metal coatings can be applied through solution based reduction of a metal salt.

In some embodiments, the negative electrode active material comprises a composite of a carbon material and a silicon-based material. The silicon material, the carbon material or both can be nanostructured, and the nanostructured components can then be combined to form a composite of the silicon component and the carbon component. For example, the components of the composite can be milled together to form the composite, in which the constituent materials are intimately associated, but generally not alloyed. The nanostructures characteristics are generally expected to manifest themselves in the composite, although characterization of the composites may be less established relative to the characterization of the component materials. Specifically, the composite material may have dimensions, porosity or other high surface area characteristics that are manifestations of the nano-scale of the initial materials. In some embodiments, the negative electrode active material can comprise a silicon-based material coated onto a carbon nanofibers and/or carbon nanoparticles.

Porous Silicon (pSi) Based Material

Desirable high capacity negative electrode active materials can comprise porous silicon (pSi) based materials and/or composites of the porous silicon based materials. In general, the pSi based material comprises highly porous crystalline silicon that can provide high surface areas and/or high void volume relative to bulk silicon. While nanostructured porous silicon can be formed through a variety of approaches such as electrochemical etching of a silicon wafer, particularly good battery performance has been obtained from nanostructured porous silicon obtained by metal reduction of silicon oxide powders. In particular, the material has particularly good cycling properties while maintaining a high specific capacity. The formation of composites of pSi based material with carbon based material or metal can additionally mechanically stabilize the negative electrode for improved cycling. Additional description of the pSi based material from the reduction of silicon oxide can be found in copending '096 application referenced above.

The porous silicon based material can be formed using metal reduction, which in some embodiments comprises gradual heating followed by acid etching to produce the pSi based material. The etching can be used to remove by-product metal oxide material, the removal of which can contribute to the desired porosity. In some embodiments, the pSi based material generally is substantially free of elemental carbon within the nanostructured material. The nanostructured pSi can have surface area from about 10 m$^2$/g to about 200 m$^2$/g and in additional embodiments from about 10 m$^2$/g to about 150 m$^2$/g. A person of ordinary skill in the art will recognize that additional ranges of values within the explicit BET surface area ranges above are contemplated and are within the present disclosure. For a given particle size, the surface area of a porous material can also relate to the pore sizes and void volumes.

While the pSi nanostructured material is substantially free of carbon, an electrode formed from the pSi based material can comprise a carbon component, such as a nano-scale carbon (e.g., nanotubes, fibers or particles), graphitic carbon and/or a pyrolytic carbon coating to provide an electrically conductive additive that is not intimately milled with the porous silicon. Desirable pyrolytic carbon coatings can be formed from organic compositions that can be applied with a solvent to obtain a relatively uniform coating prior to and after pyrolyzing the organic composition to form the carbon coating. An elemental metal coating can be applied as an alternative to a carbon coating. When the negative electrode is made from a porous silicon based material, the electrode can have a first cycle C/20 charge capacity in the range of about 3000 mAh/g to about 3900 mAh/g and discharge capacity in the range of about 2400 mAh/g to about 2800 mAh/g, a C/3 discharge capacity in the range of about 1800 to about 2600 mAh/g, and an irreversible capacity loss of less than about 35%. The pSi based material can have specific capacity of at least about 2000 mAh/g when cycled at C/3 rate. The pSi based materials can be effectively cycled with a high capacity lithium rich positive electrode active material. The resulting lithium ion batteries can have high specific capacities for both the negative electrode active material and the positive electrode active material.

Silicon Oxide Carbon (SiO—C) Based Composites

Silicon oxide based compositions have been formed into composite materials with high capacities and very good cycling properties as described in the '708 application referenced above. In particular, oxygen deficient silicon oxides can be formed into composites with electrically conductive materials, such as conductive carbons or metal powders, which surprisingly significantly improve cycling while providing for high values of specific capacity. Furthermore, the milling of the silicon oxides into smaller particles, such as submicron structured materials, can further improve the performance of the materials. The silicon oxide based materials maintain their high capacities and good cycling as negative electrode active materials when placed into lithium ion batteries with high capacity lithium metal oxide positive electrode active materials. The cycling can be further improved with the addition of supplemental lithium into the battery and/or with an adjustment of the balance of the active materials in the respective electrodes. Supplemental lithium can replace at least some of the lithium lost to the irreversible capacity loss due to the negative electrode and can stabilize the positive electrode with respect to cycling. When configured with high capacity lithium rich manganese oxides based positive electrodes, the silicon oxide based electrode can exhibit excellent cycling at reasonable rates. Based on appropriate designs of the batteries, high energy density batteries can be produced, and the batteries are suitable for a range of commercial applications.

As with silicon, oxygen deficient silicon oxide, e.g., silicon oxide, $SiO_x$, $0.1 \leq x \leq 1.9$, can intercalate/alloy with lithium such that the oxygen deficient silicon oxide can perform as an active material in a lithium ion battery. These oxygen deficient silicon oxide materials are generally referred to as silicon oxide based materials and in some embodiments can contain various amounts of silicon, silicon oxide, and silicon dioxide. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon. The silicon oxides can be made into composite materials to address the cycling fade of the silicon oxide based materials. For example, composites can be formed with electrically conductive components that contribute to the conductivity of the electrode as well as the stabilization of the silicon oxide during cycling.

Silicon oxide based materials with greater capacity upon cycling can be produced through the milling of the silicon oxide to form smaller particles. Additionally, the silicon oxide based materials can be formed into composites with electrically conductive powders in combination with high energy mechanical milling (HEMM) or the like. Alternatively or additionally, the silicon oxide based materials can be subjected to high temperature heat treatment. Smaller silicon oxide particles obtained from HEMM treatment has shown greater capacity in either silicon oxide electrode or electrodes with composites of silicon oxide-conductive carbon particle, e.g., graphitic carbon, than commercial silicon oxides with larger particle sizes. Pyrolytic carbon coated silicon oxide composites showed improved conductivity and specific capacity. Silicon oxide composites with inert metal particles with or without a pyrolytic carbon coating have shown very good cycling performance at high specific capacity. Suitable inert metal particles are described further below. The milling of the silicon oxide based materials with metal powders seems to reduce the introduction of inert material from the grinding medium, e.g., zirconium oxide, into the product composite. Composites of silicon oxide, graphite, and pyrolytic carbon in particular have shown significantly improved specific capacity and cycling performance.

HEMM and/or heat treatment under appropriate conditions can result in some disproportionation of oxygen deficient silicon oxides into $SiO_2$ and elemental Si. Small crystalline silicon peaks are observed under some processing conditions. It is possible that the processed materials have some components of amorphous elemental silicon and/or small crystallites within the structure. However, it is believed that most of the silicon oxide based materials used herein have significant components of oxygen deficient silicon oxide and amounts of elemental silicon have not been quantified. In some embodiments, elemental silicon powders, such as submicron silicon particles, can be included in the formation of composites with silicon oxide based materials.

In general, a range of composites are used and can comprise silicon oxide, carbon components, such as graphitic particles (Gr), inert metal powders (M), elemental silicon (Si), especially nanoparticles, pyrolytic carbon coatings (HC), carbon nano fibers (CNF), or combinations thereof. Thus, the general compositions of the composites can be represented as $\alpha$SiO-$\beta$Gr-$\chi$HC-$\delta$M-$\epsilon$CNF-$\phi$Si, where $\alpha$, $\beta$, $\chi$, $\delta$, $\epsilon$, and $\phi$ are relative weights that can be selected such that $\alpha+\beta+\chi+\delta+\epsilon+\phi=1$. Generally $0.35<\alpha<1$, $0\leq\beta<0.6$, $0\leq\chi<0.65$, $0\leq\delta<0.65$, $0\leq\epsilon<0.65$, and $0\leq\phi<0.65$. Certain subsets of these composite ranges are of particular interest. In some embodiments, composites with SiO and one or more carbon based components are desirable, which can be represented by a formula $\alpha$SiO-$\beta$Gr-$\chi$HC-$\epsilon$CNF, where $0.35<\alpha<0.9$, $0\leq\beta<0.6$, $0\leq\chi<0.65$ and $0\leq\epsilon<0.65$ ($\delta=0$ and $\phi=0$), in further embodiments $0.35<\alpha<0.8$, $0.1\leq\beta<0.6$, $0.0\leq\chi<0.55$ and $0\leq\epsilon<0.55$, in some embodiments $0.35<\alpha<0.8$, $0\leq\beta<0.45$, $0.0\leq\chi<0.55$ and $0.1\leq\epsilon<0.65$, and in additional embodiments $0.35<\alpha<0.8$, $0\leq\beta<0.55$, $0.1\leq\chi<0.65$ and $0\leq\epsilon<0.55$. In additional or alternative embodiments, composites with SiO, inert metal powders and optionally one or more conductive carbon components can be formed that can be represented by the formula $\alpha$SiO-$\beta$Gr-$\chi$HC-$\delta$M-$\epsilon$CNF, where $0.35<\alpha<1$, $0\leq\beta<0.55$, $0\leq\chi<0.55$, $0.1\leq\delta<0.65$, and $0\leq\epsilon<0.55$. In further additional or alternative embodiments, composites of SiO with elemental silicon and optionally one or more conductive carbon components can be formed that can be represented by the formula $\alpha$SiO-$\beta$Gr-$\chi$HC-$\epsilon$CNF-$\phi$Si, where $0.35<\alpha<1$, $0\leq\beta<0.55$, $0\leq\chi<0.55$, $0\leq\epsilon<0.55$, and $0.1\leq\phi<0.65$ and in further embodiments $0.35<\alpha<1$, $0\leq\beta<0.45$, $0.1\leq\chi<0.55$, $0\leq\epsilon<0.45$, and $0.1\leq\phi<0.55$. A person or ordinary skill in the art will recognize that additional ranges within the explicit ranges above are contemplated and are within the present disclosure. As used herein, the reference to composites implies application of significant combining forces, such as from HEMM milling, to intimately associate the materials, in contrast with simple blending, which is not considered to form composites.

The association of conductive carbon with the silicon oxide active material can improve the performance of the silicon oxide material in a lithium ion battery. Composites with electrically conductive materials and silicon oxide active material described herein provide very good cycling performance. A milling process can be used to incorporate electrically conductive diluents to form an intimate composite through the milling process. Graphitic carbon, e.g., nanostructured conductive carbon, carbon nanoparticles and/or carbon nanofibers, can provide a good electrically conductive medium for the formation of composites with silicon oxide. High energy milling can generally be performed with a hard ceramic milling media, such as zirconium oxide particles. Milling can result in the incorporation of some milling media into the product composite material. Since the milling media is electrically insulating and electrochemically inert, it is desirable to keep the amount of milling media in the product composite material, after separation of the bulk quantities of milling beads, to a low or possibly undetectable level.

Pyrolytic carbon coatings are also observed to stabilize silicon oxide based materials with respect to battery performance. In particular, the pyrolytic carbon coatings can be placed over the initially prepared composites to provide an additional electrically conductive component of the product material. The combination of the pyrolytic carbon with a silicon oxide-particulate conductor composite provides surprisingly improved performance in some embodiments. The formation of pyrolytic carbon coatings is described further above. In further embodiments, elemental metal coatings, such as silver or copper, can be applied as an alternative to a pyrolytic carbon coating to provide electrical conductivity and to stabilize silicon oxide based active material. The elemental metal coatings can be applied through solution based reduction of a metal salt.

In additional or alternative embodiments, the silicon oxide can be milled with metal powders, in which the silicon oxide is milled to a smaller particle size and the metal is intimately combined with the silicon oxide material to form a composite material, for example with a nanostructure. The carbon components can be combined with the silicon-metal alloys to form multi-component composites. The composite materials with intimately combined components are distinguishable from simple blends of components held together with a polymer binder, which lacks mechanical and/or chemical interactions to form a single composite material.

The capacity of the anode significantly governs the energy density of the battery. The higher the capacity of the anode material the lower is the weight of the anode in the battery. When the negative electrode is made from a silicon based material, the electrode can have a discharge specific capacity at a rate of C/3 from about 800 mAh/g to 2500 mAh/g, in further embodiments from about 900 mAh/g to about 2300 mAh/g and in other embodiments from about 950 mAh/g to about 2200 mAh/g at C/3 discharge from 1.5V to 5 mV against lithium metal. A person of ordinary skill in the art will recognize that additional ranges of discharge specific capacity within the explicit ranges above are contemplated and are within the present disclosure.

High Capacity Cathode Material

In general, positive electrode (cathode) active materials of interest comprise a lithium intercalation material such as lithium metal oxides or lithium metal phosphates. Positive electrode active materials include, for example, as stoichiometric layered cathode materials with hexagonal lattice settings like $LiCoO_2$, $LiNiO_2$, $LiCo_{1/3}Mn_{1/3}Ni_{1/3}O_2$ or the like; cubic spinel cathode materials such as $LiMn_2O_4$, $Li_4Mn_5O_{12}$, or the like; olivine materials, such as $LiMPO_4$ (M=Fe, Co, Mn, combinations thereof and the like). Lithium rich positive electrode active materials are of interest due to their high capacity, such as layered cathode materials, e.g., $Li_{1+x}(NiCoMn)_{0.33-x}O_2$ ($0 \leq x < 0.3$) systems; layer-layer composites, e.g., $xLi_2MnO_3 \cdot (1-x)LiMO_2$ where M can be Ni, Co, Mn, combinations thereof and the like; and composite structures like layered-spinel structures such as $LiMn_2O_4 \cdot LiMO_2$. In some embodiments, a lithium rich composition can be referenced relative to a composition $LiMO_2$, where M is one or more metals with an average oxidation state of +3.

Generally, the lithium rich compositions can be represented approximately with a formula $Li_{1+x}M_{1-y}O_2$, where M represents one or more non-lithium metals and y is related to x based on the average valance of the metals. In layered-layered composite compositions, x is approximately equal to y. The additional lithium in the initial cathode material can provide to some degree corresponding additional active lithium for cycling that can increase the battery capacity for a given weight of cathode active material. In some embodiments, the additional lithium is accessed at higher voltages such that the initial charge takes place at a higher voltage to access the additional capacity.

Lithium rich positive electrode active materials of particular interest are represented approximately by a formula

$$Li_{1+b}Ni_\alpha Mn_\beta Co_\gamma A_\delta O_{2-z}F_z \qquad \text{Formula I}$$

where b ranges from about 0.05 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both α and γ are not zero, and where A is a metal element different from Ni, Mn, Co, or a combination thereof. Element A and F (fluorine) are optional cation and anion dopants, respectively. Element A can be, for example Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above are contemplated and are within the present disclosure. To simplify the following discussion in this section, the optional dopants are not discussed further.

The formulas presented herein for the positive electrode active materials are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

The stoichiometric selection for the compositions can be based on some presumed relationships of the oxidation states of the metal ions in the composition. As an initial matter, if in Formula I above, $b+\alpha+\beta+\gamma+\delta$ is approximately equal to 1, then the composition can be correspondingly approximately represented by a two component notation as:

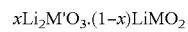
$$xLi_2M'O_3 \cdot (1-x)LiMO_2 \qquad \text{Formula II}$$

where $0 < x < 1$, M is one or more metal cations with an average valance of +3 with at least one cation being a Mn ion or a Ni ion and where M' is one or more metal cations with an average valance of +4. It is believed that the layered-layered composite crystal structure has a structure with the excess lithium supporting the formation of an alternative crystalline phase. For example, in some embodiments of lithium rich materials, a $Li_2MnO_3$ material may be structurally integrated with either a layered $LiMO_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," which is incorporated herein by reference.

Recently, it has been found that the performance properties of the positive electrode active materials can be engineered around the specific design of the composition stoichiometry. The positive electrode active materials of particular interest can be represented approximately in two component notation as:

$$xLi_2MnO_3 \cdot (1-x)LiMO_2 \quad \text{Formula III}$$

where M is one or more metal elements with an average valance of +3 and with one of the metal elements being Mn and with another metal element being Ni and/or Co. In general, in Formula II and III above, the x is in the range of 0<x<1, but in some embodiments 0.03≤x≤0.6, in further embodiments 0.075≤x≤0.50, in additional embodiments 0.1≤x≤0.45, and in other embodiments 0.15≤x≤0.425. A person of ordinary skill in the art will recognize that additional ranges within the explicit ranges of parameter x above are contemplated and are within the present disclosure.

In some embodiments, M in Formula III comprises manganese, nickel, cobalt or a combination thereof along with an optional dopant metal and can be written as $Ni_uMn_vCo_wA_y$, where A is a metal other than Ni, Mn or Co. Consequently Formula III now becomes:

$$x \cdot Li_2MnO_3 \cdot (1-x)LiNi_uMn_vCo_wA_yO_2 \quad \text{Formula IV}$$

where u+v+w+y≈1. While Mn, Co and Ni have multiple accessible oxidation states, which directly relates to their use in the active material, in these composite materials if appropriate amounts of these elements are present, it is thought that the elements can have the oxidation states $Mn^{+4}$, $Co^{+3}$ and $Ni^{+2}$. In the overall formula, the total amount of manganese has contributions from both constituents listed in the two component notation. Additionally, if δ=0 in Formula I, the two component notation of Formula IV can simplify with v≈u to $x \cdot Li_2MnO_3 \cdot (1-x)LiNi_uMn_uCo_wO_2$, with 2u+w=1.

In some embodiments, the stoichiometric selection of the metal elements can be based on the above presumed oxidation states. Based on the oxidation state of dopant element A, corresponding modifications of the formula can be made. Also, compositions can be considered in which the composition varies around the stoichiometry with v≈u. The engineering of the composition to obtain desired battery performance properties is described further in copending U.S. patent application 2011/0052981 (the '981 application) to Lopez et al., entitled "Layer-Layer Lithium Rich Complex Metal Oxides With High Specific Capacity and Excellent Cycling," incorporated herein by reference. Similar compositions have been described in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", and published U.S. patent application 2010/0151332A (the '332 application) to Lopez et al. entitled "Positive Electrode Materials for High Discharge Capacity Lithium Ion Batteries", both incorporated herein by reference.

The positive electrode material can be advantageously synthesized by co-precipitation and sol-gel processes detailed in the '853 application and the '332 application. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to one or more heat treatments to form a crystalline layered lithium metal oxide composition. A carbonate co-precipitation process described in the '332 application gave desired lithium rich metal oxide materials having cobalt in the composition and exhibiting the high specific capacity performance with superior tap density. These copending patent applications also describe the effective use of metal fluoride coatings to improve performance and cycling.

It is found that for many positive electrode active materials a coating on the material can improve the performance of the resulting batteries. Suitable coating materials, which are generally believed to be electrochemically inert during battery cycling, can comprise metal fluorides, metal oxides, metal non-fluoride halides or metal phosphates. The results in the Examples below are obtained with materials coated with metal fluorides.

For example, the general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved metal fluoride coatings with appropriately engineered thicknesses are described in copending U.S. patent application 2011/0111298 to Lopez et al, (the '298 application) entitled "Coated Positive Electrode Materials for Lithium Ion Batteries," incorporated herein by reference. Suitable metal oxide coatings are described further, for example, in copending U.S. patent application 2011/0076556 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in published U.S. patent application serial number 2012/0070725 to Venkatachalam et al., entitled "Metal Halide Coatings on Lithium Ion Battery Positive Electrode Materials and Corresponding Batteries," incorporated herein by reference. The synthesis approaches along with the coating provide for superior performance of the materials with respect to capacity as well as cycling properties. The desirable properties of the active material along with the use of desirable anode material described herein provide for improved battery performance.

In some embodiments, the positive electrode active material has a specific capacity during the tenth cycle at a discharge rate of C/3 of at least about 180 milliamp hours per gram (mAh/g), in additional embodiments from about 200 mAh/g to about 310 mAh/g, in further embodiments from about 215 mAh/g to about 300 mAh/g and in other embodiment from about 225 mAh/g to about 290 mAh/g. Additionally, the $20^{th}$ cycle discharge capacity of the material is at least about 98%, and in further embodiments 98.5% of the $5^{th}$ cycle discharge capacity, cycled at a discharge rate of C/3. Also, in some embodiments, the positive electrode active material can have a first cycle charge capacity from the open circuit voltage to 4.6 of about 250 mAh/g to about 320 mAh/g at a rate of C/10 and a discharge capacity from 4.6V to 2V from about 230 mAh/g to about 290 mAh/g at a rate of C/10. It has been found that the first cycle irreversible capacity loss for inert coated electroactive materials, e.g., coated with a metal halide or a metal oxide, can be decreased at least about 25%, and in further embodiments from about 30% to about 100% relative to the equivalent performance of the uncoated materials. The tap density of a positive electrode active material described herein can be measured by using graduated measuring cylinders on a commercially available tap machine with pre-determined tapping parameters. The tap density of the material can be at least about 1.8 g/cc, in further embodiments at least about 1.9 g/cc and in additional embodiments from about 1.95 to about 2.75 g/cc. High tap density translates into high overall capacity of a battery given a fixed volume. A person of ordinary skill in the art will recognize that additional ranges of specific capacity and tap density and of decreases in irreversible capacity loss are contemplated and are within the present disclosure. For fixed volume applications such as batteries for electronic devices, high tap density therefore high overall capacity of the battery is of particular significance.

Generally, tap density is the apparent powder density obtained under stated conditions of tapping. The apparent density of a powder depends on how closely individual particles of the powder are pack together. The apparent density is affected not only by the true density of the solids, but by the particle size distribution, particle shape and cohesiveness. Handling or vibration of powdered material can overcome some of the cohesive forces and allow particles to move relative to one another so smaller particles can work their way into the spaces between the larger particles. Consequently, the total volume occupied by the powder decreases and its density increases. Ultimately no further natural particle packing can be measured without the addition of pressure and an upper limit of particle packing has been achieved. While electrodes are formed with the addition of pressure, a reasonably amount of pressure is only effective to form a certain packing density of the electroactive materials in the battery electrode. The actual density in the electrode generally relates to the tap density measured for a powder so that the tap density measurements are predictive of the packing density in a battery electrode with a higher tap density corresponding to a higher packing density in the battery electrode.

The synthesis approaches for the high capacity positive electrode active materials summarized above have been shown to be suitable to form materials with a high tap density. This is described further in the '332 application cited above. As a result of a relatively high tap density and excellent cycling performance, a battery can exhibit a high total capacity when the active material is incorporated into the cathode. Generally, a higher tap density can be advantageously used to obtain a high electrode density without sacrificing the performance of the material if the high tap density material has desirable performance.

Supplemental Lithium

The improved high energy battery designs described herein may or may not include supplemental lithium, and this section is directed to approaches for the incorporation of supplemental lithium for appropriate embodiments. In general, the inclusion of supplemental lithium is desirable for batteries with silicon-based negative electrode active materials since the material exhibit relatively high irreversible capacity loss during the initial charge of the battery. Various approaches can be used for the introduction of supplemental lithium into the battery, although following corresponding initial reactions and/or charging, the negative electrode becomes associated with excess lithium for cycling from the supplemental lithium. With respect to the negative electrode in batteries having supplemental lithium, the structure and/or composition of the negative electrode can change relative to its initial structure and composition following the first cycle as well as following additional cycling. Depending on the approach for the introduction of the supplemental lithium, the positive electrode may initially comprise a source of supplemental lithium and/or a sacrificial electrode can be introduced comprising supplemental lithium. Additionally or alternatively, supplemental lithium can be associated with the negative electrode. In some embodiments, the supplemental lithium can be introduced into the negative electrode using electrochemical methods in contrast with purely chemical or mechanical methods. Electrochemical methods, chemical methods or mechanical methods, such as milling, may lead to effectively irreversible formation of lithium silicate, which could work as a buffer layer when the anode expands in lithiation. With respect to initial structure of the negative electrode, in some embodiments, the negative electrode has no changes due to the supplemental lithium. In particular, if the supplemental lithium is initially located in the positive electrode or a separate electrode, the negative electrode can be an unaltered form with no lithium present until the battery is charged or at least until the circuit is closed between the negative electrode and the electrode with the supplemental lithium in the presence of electrolyte and a separator. For example, the positive electrode or supplemental electrode can comprise elemental lithium, lithium alloy and/or other sacrificial lithium source.

If sacrificial lithium is included in the positive electrode, the lithium from the sacrificial lithium source is loaded into the negative electrode during the charge reaction. The voltage during the charging based on the sacrificial lithium source may be significantly different than the voltage when the charging is performed based on the positive electrode active material. For example, elemental lithium in the positive electrode can charge the negative electrode active material without application of an external voltage since oxidation of the elemental lithium drives the reaction. For some sacrificial lithium source materials, an external voltage is applied to oxidize the sacrificial lithium source in the positive electrode and drive lithium into the negative electrode active material. The charging generally can be performed using a constant current, a stepwise constant voltage charge or other convenient charging scheme. However, at the end of the charging process, the battery should be charged to a desired voltage, such as 4.5V.

In further embodiments, at least a portion of the supplemental lithium is initially associated with the negative electrode. For example, the supplemental lithium can be in the form of elemental lithium, a lithium alloy or other lithium source that is more electronegative than the negative electrode active material. After the negative electrode is in contact with electrolyte, a reaction can take place, and the supplemental lithium is transferred to the negative electrode active material. During this process, the solid electrolyte interface (SEI) layer is also formed. Thus, the supplemental lithium is loaded into the negative electrode active material with at least a portion consumed in formation of the SEI layer. The excess lithium released from the lithium rich positive electrode active material is also deposited into the negative electrode active material during eventual charging of the battery. The supplemental lithium placed into the negative electrode should be more electronegative than the active material in the negative electrode since there is no way of reacting the supplemental lithium source with the active material in the same electrode through the application of a voltage.

In some embodiments, supplemental lithium associated with the negative electrode can be incorporated as a powder within the negative electrode. Specifically, the negative electrode can comprise an active negative electrode composition and a supplemental lithium source within a polymer binder matrix, and any electrically conductive powder if present. In additional or alternative embodiments, the supplemental lithium is placed along the surface of the electrode. For example, the negative electrode can comprise an active layer with an active negative electrode composition and a supplemental lithium source layer on the surface of active layer. The supplemental lithium source layer can comprise a foil sheet of lithium or lithium alloy, supplemental lithium powder within a polymer binder and/or particles of supplemental lithium source material embedded on the surface of the active layer. In an alternative configuration, a supplemental lithium source layer is between the active layer and current collector. Also, in some embodiments, the negative electrode can comprise supplemental lithium source layers on both surfaces of the active layer.

In additional embodiments, at least a portion of the supplemental lithium can be supplied to the negative electrode active material prior to assembly of the battery. In other words, the negative electrode can comprise partially lithium-loaded silicon based active material, in which the partially loaded active material has a selected degree of loading of lithium through intercalation/alloying or the like. For example, for the preloading of the negative electrode active material, the negative electrode active material can be contacted with electrolyte and a lithium source, such as elemental lithium, lithium alloy or other sacrificial lithium source that is more electronegative than the negative electrode active material.

An arrangement to perform such a preloading of lithium can comprise an electrode with silicon-based active material formed on a current collector, which are placed in vessel containing electrolyte and a sheet of lithium source material contacting the electrode. The sheet of lithium source material can comprise lithium foil, lithium alloy foil or a lithium source material in a polymer binder optionally along with an electrically conductive powder, which is in direct contact with the negative electrode to be preloaded with lithium such that electrons can flow between the materials to maintain electrical neutrality while the respective reactions take place. In the ensuing reaction, lithium is loaded into the silicon based active material through intercalation, alloying or the like. In alternative or additional embodiments, the negative electrode active material can be mixed in the electrolyte and the lithium source material for incorporation of the supplemental lithium prior to formation into an electrode with a polymer binder so that the respective materials can react in the electrolyte spontaneously.

In some embodiments, the lithium source within an electrode can be assembled into a cell with the electrode to be preloaded with lithium. A separator can be placed between the respective electrodes. Current can be allowed to flow between the electrodes. Depending on the composition of the lithium source it may or may not be necessary to apply a voltage to drive the lithium deposition within the silicon-based active material. An apparatus to perform this lithiation process can comprise a container holding electrolyte and a cell, which comprises an electrode, to be used as a negative electrode in an ultimate battery, a current collector, a separator and a sacrificial electrode that comprises the lithium source, where the separator is between the sacrificial electrode and the electrode with the silicon-based active material. A convenient sacrificial electrode can comprise lithium foil, lithium powder embedded in a polymer or lithium alloys, although any electrode with extractable lithium can be used. The container for the lithiation cell can comprise a conventional battery housing, a beaker, or any other convenient structure. This configuration provides the advantage of being able to measure the current flow to meter the degree of lithiation of the negative electrode. Furthermore, the negative electrode can be cycled once or more than once in which the negative electrode active material is loaded close to full loading with lithium. In this way, an SEI layer can be formed with a desired degree of control during the preloading with lithium of the negative electrode active material. Then, the negative electrode is fully formed during the preparation of the negative electrode with a selected preloading with lithium.

In general, the lithium source can comprise, for example, elemental lithium, a lithium alloy or a lithium composition, such as a lithium metal oxide, that can release lithium from the composition. Elemental lithium can be in the form of a thin film, such as formed by evaporation, sputtering or ablation, a lithium or lithium alloy foil and/or a powder. Elemental lithium, especially in powder form, can be coated to stabilize the lithium for handling purposes, and commercial lithium powders, such as powders from FMC Corporation, are sold with proprietary coatings for stability. The coatings generally do not alter the performance of the lithium powders for electrochemical applications. Lithium alloys include, for example, lithium silicon alloys and the like. Lithium composition with intercalated lithium can be used in some embodiments, and suitable compositions include, for example, lithium titanium oxide, lithium tin oxide, lithium cobalt oxide, lithium manganese oxide, and the like.

In general, for embodiments in which supplemental lithium is used, the amount of supplemental lithium preloaded or available to load into the active composition can be in an amount of at least about 2.5% of capacity, in further embodiments from about 3 percent to about 40 percent of capacity, in additional embodiments from about 5 percent to about 35 percent of capacity, and in some embodiments from about 5 percent to about 30 percent of the negative electrode active material capacity. The supplemental lithium can be selected to approximately balance the IRCL of the negative electrode, although other amounts of supplemental lithium can be used as desired. In some embodiment, the supplemental lithium added is in an amount with an oxidation capacity corresponding to from 0% to 120% of the IRCL of the negative electrode, in further embodiments, it is from 10% to 110%, and in other embodiments from 20% to 100%. A person of ordinary skill in the art will recognize that additional ranges of percentage within the explicit ranges above are contemplated and are within the present disclosure. Thus, the contribution to the IRCL of the negative electrode can be effectively reduced or removed due to the addition of the supplemental lithium such that the measured IRCL of the battery represents partially or mostly contributions from the IRCL of the positive electrode, which is not diminished due to the presence of supplemental lithium. In some embodiments, the IRCL can be reduced to no more than about 20% of the initial negative electrode capacity, in further embodiments no more than about 15%, in additional embodiments no more than about 10%. A person of ordinary skill in the art will recognize that additional ranges of IRCL within the explicit ranges above are contemplated and are within the present disclosure.

Balance of Cathode and Anode

The overall performance of the battery has been found to depend on the capacities of both the negative electrode and positive electrode and their relative balance. Balance of the electrodes has been found to be significant with respect to achieving a particularly high energy density for the battery as well as to achieve good cycling properties. However, in some embodiments, it is desirable to balance the battery to achieve a relatively lower energy density, but with a battery suitable for stable long term use under a broader range of operating parameters. Thus, two electrode balance regimes are described with a first underbalanced design to achieve particularly high energy densities and a second that achieves relatively high energy densities with a broader range of suitable operating conditions. Based on these two electrode balances, intermediate electrode balances can be similarly incorporated into desirable battery designs.

The positive electrode active material capacity can be estimated from the capacity of the material which can be measured by cycling the material against lithium metal foil. For example, for a given positive electrode, the capacity can be evaluated by determining the insertion and extraction capacities during the first charge/discharge cycle, where the lithium is de-intercalated or extracted from the positive electrode to 4.6V and intercalated or inserted back into the positive electrode to 2V at a rate of C/20. Similarly, for a given silicon based electrode, the insertion and extraction capacities can be evaluated with a battery having a positive electrode comprising the silicon based active material and a lithium foil negative electrode. The capacity is evaluated by determining the insertion and extraction capacities of the battery during the first charge/discharge cycle where lithium is intercalated/alloyed to the silicon based electrode to 5 mV and de-intercalated/de-alloyed to 1.5V at a rate of C/20.

In most commercially available carbon based batteries, approximately 7-10% excess anode is taken over the cathode to prevent lithium plating. One important concern of too much excess anode is that the weight of the cell will increase reducing the energy density of the cell. Compared to graphite which has a first cycle IRCL of ~7%, high capacity silicon based anodes can have IRCL ranging from about 10% to about 40%. A major portion of the capacity may become inactive in the cell after the first charge-discharge cycle and add to significant dead weight to the battery.

For high capacity anode materials, the negative electrode irreversible capacity loss generally is greater than the positive electrode irreversible capacity loss. If the negative electrode has a significantly higher irreversible capacity loss than the positive electrode, the initial charge of the negative electrode irreversibly consumes lithium so that upon subsequent discharge, the negative electrode cannot supply enough lithium to supply the positive electrode with sufficient lithium to satisfy the full lithium accepting capacity of the positive electrode. This results in a waste of positive electrode capacity, which correspondingly adds weight that does not contribute to cycling. Also, it has been found that lithium deficiencies can be disadvantageous for cycling of mixed phase high capacity cathode active materials as noted in the '703 application cited above. Supplemental lithium can be used to compensate for lithium removed from cycling availability due to the irreversible capacity loss, as described further above.

If the negative electrode has a comparable or smaller irreversible capacity loss relative to the positive electrode irreversible capacity loss, supplemental lithium may not be as desirable to replace lithium available for cycling which has been lost by the irreversible capacity loss of the negative electrode. High capacity silicon based negative electrode active materials with an irreversible capacity loss of about 7-15%, which is comparable to the high capacity positive electrode materials, are described in an example below. Other high capacity silicon based active materials with relatively low irreversible capacity loss are described in Cui et al., "Carbon-Silicon Core-Shell Nanowires as High Capacity Electrode for Lithium Ion Batteries," Nano Letters Vol. 9 (9), pp 3370-3374 (2009), incorporated herein by reference.

Under Balanced Negative Electrode Design

When assembling a battery, the anode and cathode capacities can be appropriately balanced to achieve good cycling performance during the charge-discharge process due to the properties of the high capacity positive electrode active materials, specifically the rate dependence of the capacity. In some embodiments, high battery energy densities can be achieved through an effective under balancing of the negative electrode at low rates so that lithium metal plates onto the negative electrode. In general, the plating of lithium metal on the negative electrode is considered detrimental to cycling. But it has been found that the positive electrode capacity decreases a significantly greater amount at high rates than the negative electrode for the high capacity materials described herein. The different rate behavior of the electrodes can be used advantageously in combination with cycling over a fraction of the total depth of discharge. Specifically, an amount of lithium metal plating on the negative electrode at low rate can be effectively stored on the positive electrode at high rate and/or a reduced depth of discharge so that lithium metal no longer plates and less negative electrode capacity is wasted during cycling so that a lower battery weight and volume can be achieved without sacrificing battery capacity or cycling performance. Thus, it has been found that properties of the electrodes can be advantageously used to balance the electrodes for realistic cycling conditions using a balance that is generally inappropriate for low rate cycling.

Whether or not supplemental lithium is included in the battery, the energy density of the battery can be relatively higher if the cycling capacities of the two electrodes at a low rate over the full activation depth of discharge are balanced with a small to moderate excess of negative electrode capacity. In general, an excess of positive electrode capacity with available cycling lithium may be undesirable since lithium metal can plate on the negative electrode during charging, and the plated metal can compromise the electrical separation of the electrodes to short circuit the cell. However, it has been discovered that a higher energy density for the battery can be achieved by balancing the electrodes at a moderate discharge rate over a reduced depth of discharge rather than at a low discharge rate can result in a reduced waste of electrode capacity.

The initial activation cycle and the first few cycles generally are performed at relatively low rates of charge and discharge, such as C/10 or slower. Due to the irreversible changes to the materials during the first activation cycle, low rates can reduce further changes to the materials that may be undesirable. However, for practical applications such as electric vehicle applications, the batteries generally are discharged during use at moderate rates. A C/3 rate has been selected in some contexts as a moderate rate for testing battery cycling. The capacity of the electrodes is rate dependent, and for the high capacity materials described herein, the positive electrode active material has a capacity that decreases more at higher rates relative to the decrease in capacity of the negative electrodes at higher rates. Also, to achieve desired long term cycling at an acceptable drop in capacity, batteries are generally cycled over a reduced depth of discharge. Very long term cycling with the lithium rich positive electrode materials described herein has been achieved with an appropriately selected voltage window, as described in published U.S. patent application 2012/0056590 to Amiruddin et al., entitled "Very Long Cycling of Lithium Ion Batteries with Lithium Rich Cathode Materials," incorporated herein by reference. Thus, it is useful to consider two electrode balances, an initial balance for the first cycle, and an activated balance at moderate rates at a reduced depth of discharge.

In particular, the battery can be activated at a low rate of charge and discharge during the first cycle or first few cycles. Then, the activated balance of the battery can be considered at a reference rate of C/3, which can be adopted as a standard moderate rate. And for convenience, the fifth cycle can be selected as a reference cycle in which initial changes to the materials have been completed and negligible cycling fade has taken place for most materials of interest. Capacities of individual electrodes are evaluated with the equivalent electrode cycled against lithium foil as a suitable reference value as described above. Then, the battery can be balanced to have lithium plating at low rates during the early cycles, and with no lithium plating as the battery is cycled at an increased rate and/or over a reduced depth of discharge, such as an 80% depth of discharge used as a reference. A reduction of the depth of discharge, effectively stores some cyclable lithium on the positive electrode active material during the charge of the battery so that this amount of lithium is not plated on the negative electrode during charging. To provide some specific reference values, a voltage window from 4.3V to 1.5V is used as a reference for evaluating cycling over a reduced depth of discharge, and results are presented in the examples for this voltage range. An increase of charge and discharge rate similarly result in the effective storage of lithium on the positive electrode that is not removed during discharge, which the capacity of the negative electrode is changed by a significantly reduced amount relative to the positive electrode.

The balance can be selected based on the irreversible capacity loss of the negative electrode. If the negative electrode has a significantly greater irreversible capacity loss than the positive electrode, the negative electrode capacity can generally be balance from about 90% to about 165% and in further embodiments from about 100% to about 120% of positive electrode capacity. Supplemental lithium can be added as described above, although this can result in plating of lithium on the negative electrode with cycling over the full voltage window of the battery. If the negative electrode has a similar irreversible capacity loss as the positive electrode active material, the negative electrode can be balanced from about 75% to about 99.5% and in further embodiments from about 85% to about 98% of the positive electrode irreversible capacity loss to achieve a higher energy density, although lithium plating can take place with cycling over the full voltage window of the battery. As described in the following, subsequent cycling over a reduced voltage window can eliminate lithium plating over the longer term cycling of the battery. A person of ordinary skill in the art will recognize that additional ranges of balance within the explicit ranges above are contemplated and are within the present disclosure. First cycle properties can be effectively evaluated for battery design using electrodes electrochemically evaluated against lithium in which the negative electrode against lithium is charged to 1.5V and the positive electrode is charged to 4.6V, for example, at a rate of C/20.

For other relative values of irreversible capacity loss, appropriate values can be extrapolated from these values. For example, during activation of the battery in the first charge, the balance can be selected to have plating of lithium metal, that is eliminated during subsequent cycling at a greater rate with a reduced depth of discharge, such as a C/3 rate between 4.3V and 1.5V. With respect to the lithium metal plating regardless of the irreversible capacity loss, the battery can have a first activation cycle negative electrode charge capacity from about 72.5% to about 99.5%, in some embodiments from about 75% to about 97.5% and in additional embodiments from about 77% to about 95% at a rate of C/20 from the open circuit voltage of the initially assembled battery to 4.6V relative to the sum of the initial first cycle positive electrode charge capacity at a rate of C/20 from the open circuit voltage to 4.6V plus the oxidative capacity of any supplemental lithium. A person of ordinary skill in the art will recognize that additional ranges of balance within the explicit ranges above are contemplated and are within the present disclosure. Such under-balancing of the negative electrode during formation makes more effective use of the battery components during operational cycling over a reduced voltage window so that a smaller and lighter battery can be used to achieve the same performance as a battery with greater negative electrode capacity. As noted above, supplemental lithium can be included to provide appropriate amounts of lithium available for cycling.

Electrode Balance for a Broader Range of Operating Parameters

In general, it may be desirable to provide for stable long term cycling performance. From this perspective, it can be desirable to balance the electrodes to provide for effective use of both electrode capacities as well as avoiding the plating of lithium metal during cycling. In general, the balance of the electrodes is considered at the time of assembly of the electrodes referencing the initial capacities of the electrodes relative to lithium metal. However, during cycling, the capacities of the electrodes changes, particularly after the initial charge of the battery. The changes in electrode capacity can be accounted for in evaluating the balance.

Considering the initial cycle of the battery, it would generally be desirable to have a slight excess of negative electrode capacity with the view of avoiding lithium metal deposition. With conventional graphitic carbon negative electrode active material, a 7-10 percent excess negative electrode capacity accounts for the irreversible capacity loss of the negative electrode so that lithium metal does not plate with cycling. With the batteries described herein, both the positive electrode and negative electrode changes influence the balance equation. In particular, the positive electrode active material can have a significant irreversible capacity loss, but the negative electrode active material generally has a greater irreversible capacity loss. Also, it has been found that excess supplemental lithium can positively influence the cycling stability of the lithium rich high capacity positive electrode active materials. Thus, while the irreversible capacity loss of the positive electrode in part makes up for the irreversible capacity loss of the negative electrode, it is generally desirable to add supplemental lithium to compensate for some or all of the excess irreversible capacity loss of the negative electrode over the irreversible capacity loss of the positive electrode.

In general, battery life is selected to end when the energy output drops by roughly 20% from the initial capacity at a constant discharge rate. For the materials described herein, the drop in capacity with cycling of the negative electrode is generally greater than for the positive electrode, so that the avoidance of lithium metal deposition with cycling suggests a greater excess capacity of the negative electrode to further stabilize cycling. Roughly, if the negative electrode capacity fades about twice as fast as the positive electrode capacity, it would be desirable to include at least 10% additional negative electrode capacity to account for cycling. In the robust battery design, at least about 10% additional negative electrode can be desired at various discharge conditions. In general, the balance can be selected such that the initial negative electrode charge capacity at a rate of C/20 from an open circuit voltage to 1.5V against lithium is about 110% to about 165%, in further embodiment from about 112.5% to about 155% and in additional embodiments from about 115% to about 150% relative to the sum of the initial positive electrode charge capacity at a rate of C/20 from an open circuit voltage to 4.6V plus the oxidation capacity of any supplemental lithium. A person of ordinary skill in the art will recognize that additional ranges of balance within the explicit ranges above are contemplated and are within the present disclosure. Such a balance is described in the battery designs described below.

Battery Designs

The high capacity positive and negative electrodes described herein can be incorporated into batteries having relatively large gravimetric energy density and/or volumetric energy density ("gravimetric/volumetric energy density"), as well as a large total capacity. A particular target design can be achieved by selecting target design parameters. High gravimetric/volumetric energy density battery designs can be desirable in application settings requiring a specific battery performance level but having reasonable constraints on battery weight and/or volume. In general, for particular electrode parameters, a larger battery design may be useful to increase the gravimetric energy density and/or volumetric energy density up to a limiting value. In some embodiments, the number of electrode structures or layers in a battery, the area of each electrode, and the battery cell capacity can all be selected to achieve batteries with relatively high gravimetric and/or volumetric energy densities over a range of discharge rates, using the battery components described herein.

High gravimetric/volumetric energy density batteries of interest herein comprise one or more positive electrode layers, one or more negative electrode layers, and appropriately placed separators. Generally, the positive electrodes comprise lithium rich positive electrode active materials described herein, and the negative electrode comprises the silicon based active materials described herein. The design of electrodes using these materials is described in detail above along with ranges of appropriate parameters for these electrodes. The battery designs herein are based on a selected set of electrode parameters that are away from the extremes of the electrode designs, and the ranges of battery designs summarized in this section are achievable based on the ranges of electrode parameters.

With the selection of electrode parameters, the design of high gravimetric/volumetric batteries can incorporate a balance of factors including electrode area, the number of electrode structures, and battery capacity. The electrode area refers to the spatial extent of one of the electrodes along one side of a current collector. FIG. 1 depicts the length "L" and width "W" of an electrode. Relative to FIG. 1, the area of an electrode can be defined as L×W. In some embodiments, the area of each electrode can be similar such that the dimensions of a battery comprising an electrode stack can have a length and width that are similar to the length and width of each electrode in the stack. In some embodiments, the separator can be in sheets with an area slightly larger than the area of the electrode, and in some embodiments, the separator can be folded, pleated or formed with pockets in which the electrodes are placed in folds or the pocket of the separator. For high gravimetric/volumetric energy density batteries incorporating the positive electrode layers with the current collector and negative electrode layers with the current collector, in some embodiments a positive electrode and/or negative electrode can have an area from about 100 $cm^2$ to about 400 $cm^2$ and in further embodiments from about 150 $cm^2$ to about 275 $cm^2$. A person of ordinary skill in the art will recognize that additional ranges of electrode area within the explicit ranges above are contemplated and are within the present disclosure.

For a given electrode area, a larger number of electrode layers can translate into higher battery capacities at the expense of battery weight and dimensions when the individual cells are connected in parallel. In general, however, calculations show that for the battery components described herein, for a given electrode area, increasing the number of electrode layers can increase the gravimetric energy density and volumetric energy density of a battery formed therefrom. In some embodiments, a high gravimetric/volumetric energy density battery can be assembled from about 3 to about 50 positive electrode layers and in further embodiments, from about 5 to about 45 positive electrode layers. In some embodiments, a high gravimetric/volumetric energy density battery can have from about 3 to about 50 negative electrode layers and in further embodiments, from about 5 to about 45 negative electrode layers. With respect to battery capacity, for a given loading, the electrode area and number of electrode layers in a battery can determine the overall battery capacity for cells connected in parallel. In some embodiments, a high gravimetric/volumetric battery can have a total capacity of about 0.5 Ah to about 105 Ah, in other embodiments from about 2 Ah to about 80 Ah and in other embodiments from about 5 Ah to about 60 Ah. A person of ordinary skill in the art will recognize that additional ranges of positive electrode numbers, negative electrode numbers and battery capacities within the explicit ranges above are contemplated and are within the present disclosure.

A specific battery design builds on the electrode designs that are then combined with specific battery structure parameters, such as electrode area, the number of electrodes, and battery casing. Electrode level design elements include, for example, for each electrode independent specific capacity of the active material, active material loading, electrode density, additional electrode components and current collector parameters. The electrode designs of the positive electrode and negative electrode interconnect through the selection of the balance and the optional inclusion of supplemental lithium addition. Once the electrode parameters and balance are selected, the battery design can be selected based on area of electrodes and number of electrode structures to achieve a specific gravimetric energy density and volumetric energy density of a battery as well as the total capacity of the battery.

To assist with battery design, calculations can be performed to estimate overall battery performance from the battery design parameters to guide manufacturing. Calculation examples are provided for three electrode and balance selections with variables in the calculations based on area of the electrodes and number of electrode layers in the stack. Based on these selected calculations, some indication is provided regarding the overall ranges of battery performance that can be achieved for the high capacity active materials, electrode designs and battery structures described herein. A person of ordinary skill in the art can extrapolate the particular calculation examples to evaluate the broader range of performance, based upon the teachings herein.

Calculations are provided based upon 3 specific electrode designs, each set of calculations modeled with different numbers of electrode structures, differing electrode surface areas and differing cell capacities. The batteries are modeled as an electrode stack with a plurality of positive electrode layers and negative electrode layers with all of the negative electrode layers connected in parallel and all of the positive electrode layers connected in parallel. A negative electrode layer having a negative electrode on both sides of the corresponding current collector is placed on both ends of the stack so that there is one greater number of negative electrode layers relative to positive electrode layers. Parameters for the positive and negative electrodes are selected based on values consistent with the lithium rich positive electrode active materials and silicon-based negative electrode active materials, both described above. Capacities of the individual positive electrodes and negative electrodes were obtained by measuring the capacities of the positive electrodes and negative electrodes individually by assembling coin cells with a positive electrode or negative (Si-based material) electrode and with a lithium metal counter electrode at different rates such as C/20, C/10, C/3, 1C etc. Of course, the "negative electrode" functions as a positive electrode or cathode in a battery formed with a lithium metal counter electrode.

The capacity of the designed battery is calculated by multiplying the total number of positive electrode layers in the battery by the capacity of each positive electrode layer. The number of positive electrode layers can be fixed depending on the capacity requirements of the battery. The gravimetric energy density of the battery in Wh/Kg is calculated as the total capacity of the battery divided by the total weight of the battery including the weights of the positive and negative electrodes with the current collectors, separator, electrolyte, pouch material, tape and welded tabs. The volumetric energy density in Wh/L is calculated as the total capacity of the battery divided by the total volume of the battery including the length, width and thickness of the battery. The calculations are based on an 8 micron thick copper foil positive electrode structure current collector and a 16 micron thick aluminum foil negative electrode current collector. Each battery is taken to be balanced such that there is anode excess balance at any rate from C/20 to 2 C rate and contain supplemental lithium in an amount equal to 100% of the first cycle irreversible capacity loss of the anode. The electrolyte amount is calculated based on the porosity of the cathode electrode, anode electrode and separator with some extra volume of electrolyte for filling the container. Table 1 lists the parameters of the 3 battery types used in the calculations.

TABLE 1

| Positive Electrode | | | | | | |
|---|---|---|---|---|---|---|
| Battery Type | Charge capacity C/20 | Discharge capacity C/20 | Discharge capacity C/3 | Discharge capacity 2 C | Loading mg/cm$^2$ | Density g/cc |
| 1 | 300 | 280 | 263 | 225 | 30 | 2.67 |
| 2 | 300 | 270 | 250 | 210 | 20 | 2.66 |
| 3 | 240 | 204 | 193 | 170 | 20 | 2.66 |

| Negative Electrode | | | | | |
|---|---|---|---|---|---|
| Battery Type | Capacity C/20 Li intercalation | Capacity C/20 Li deintercalation | Capacity C/3 Li intercalation | Capacity C/3 Li deintercalation | Loading mg/cm$^2$ |
| 1 | 3200 | 2500 | 2200 | 2200 | 3.5 |
| 2 | 2600 | 2000 | 1800 | 1600 | 3.16 |
| 3 | 1300 | 1000 | 900 | 800 | 5.18 |

| Battery Type | Anode excess balance first cycle | Anode excess balance 2nd cycle | Density g/cc | Anode C/20 IRCL | supplemental lithium addition |
|---|---|---|---|---|---|
| 1 | 20% | 10% | 1 | 10% | 100% of anode IRCL |
| 2 | 30% | 11% | 0.8 | 23% | 100% of (anode cathode) capacity |
| 3 | 30% | 18% | 1 | 23% | 100% of (anode cathode) capacity |

Calculation results for the selection of electrode area, number of electrode layers and cell capacity for high gravimetric energy density batteries are shown in Tables 2-4 for battery types 1-3, respectively. In particular, the tables show the selection of the aforementioned parameters to obtain batteries having calculated gravimetric energy densities of at least 200 Wh/kg to greater than 450 Wh/kg for discharge rates ranging from C/20 to 2 C. Referring to Tables 2-4, for the calculated battery types and for a given electrode area, increasing the number of electrode cell layers (and therefore the battery capacity) increases the calculated gravimetric energy density of the modeled battery over discharge rates ranging from C/20 to 2 C. As used in the Tables 2-7, "cell layers" refers to the number of positive electrode structures in the battery such that a battery having N cell layers has N positive electrode structures and N+1 negative electrode structures.

TABLE 2

Battery Type 1

| Rate | Electrode area (cm²) | ≥200 Wh/Kg Cell layers | ≥200 Wh/Kg Cell Capacity (Ah) | ≥250 Wh/Kg Cell layers | ≥250 Wh/Kg Cell Capacity (Ah) | ≥300 Wh/Kg Cell layers | ≥300 Wh/Kg Cell Capacity (Ah) | ≥350 Wh/Kg Cell layers | ≥350 Wh/Kg Cell Capacity (Ah) | ≥400 Wh/Kg Cell layers | ≥400 Wh/Kg Cell Capacity (Ah) | >450 Wh/Kg Cell layers | >450 Wh/Kg Cell Capacity (Ah) |
|---|---|---|---|---|---|---|---|---|---|---|---|---|---|
| C/20 | 150 | 1 | 2.3 | 2 | 4.7 | 2 | 4.7 | 3 | 7 | 5 | 12 | 12 | 28 |
| C/20 | 273 | 1 | 4.24 | 1 | 4.24 | 2 | 8.5 | 3 | 12.7 | 5 | 21.2 | 10 | 42.5 |
| C/3 | 150 | 1 | 2.4 | 2 | 4.7 | 3 | 7 | 5 | 12 | 10 | 24 | | |
| C/3 | 273 | 1 | 4.24 | 2 | 8.5 | 3 | 12.7 | 4 | 17 | 9 | 38.2 | | |
| 2 C | 150 | 2 | 4.7 | 3 | 7 | 8 | 19 | | | | | | |
| 2 C | 273 | 2 | 8.5 | 3 | 12.7 | 7 | 29.7 | | | | | | |

TABLE 3

Battery Type 2

| Rate | Electrode area (cm²) | ≥300 Wh/Kg Cell layers | ≥300 Wh/Kg Cell Capacity (Ah) | ≥350 Wh/Kg Cell layers | ≥350 Wh/Kg Cell Capacity (Ah) | ≥400 Wh/Kg Cell layers | ≥400 Wh/Kg Cell Capacity (Ah) |
|---|---|---|---|---|---|---|---|
| C/20 | 150 | 4 | 6.1 | 7 | 10.68 | 31 | 47.3 |
| C/20 | 273 | 4 | 10.84 | 9 | 24.29 | | |

| Rate | Electrode area (cm²) | ≥250 Wh/Kg Cell layers | ≥250 Wh/Kg Cell Capacity (Ah) | ≥300 Wh/Kg Cell layers | ≥300 Wh/Kg Cell Capacity (Ah) | ≥350Wh/Kg Cell layers | ≥350Wh/Kg Cell Capacity (Ah) |
|---|---|---|---|---|---|---|---|
| C/3 | 150 | 3 | 4.56 | 7 | 10.68 | 36 | 54.9 |
| C/3 | 273 | 4 | 10.8 | 8 | 21.68 | | |

| Rate | Electrode area (cm²) | ≥200 Wh/Kg Cell layers | ≥200 Wh/Kg Cell Capacity (Ah) | ≥250 Wh/Kg Cell layers | ≥250 Wh/Kg Cell Capacity (Ah) |
|---|---|---|---|---|---|
| 2 C | 13.5 | 5 | 0.65 | 20 | 2.59 |
| 2 C | 150 | 4 | 6.1 | 13 | 19.84 |
| 2 C | 273 | 4 | 10.84 | 20 | 54.2 |

TABLE 4

Battery Type 3

| Rate | Electrode area (cm²) | ≥250 Wh/Kg Cell layers | ≥250 Wh/Kg Cell Capacity (Ah) | ≥300 Wh/Kg Cell layers | ≥300 Wh/Kg Cell Capacity (Ah) |
|---|---|---|---|---|---|
| C/20 | 150 | 5 | 5.76 | 22 | 25.36 |
| C/20 | 273 | 5 | 10.24 | 21 | 43 |

| Rate | Electrode area (cm²) | ≥200 Wh/Kg Cell layers | ≥200 Wh/Kg Cell Capacity (Ah) | ≥250 Wh/Kg Cell layers | ≥250 Wh/Kg Cell Capacity (Ah) | ≤288Wh/Kg Cell layers | ≤288Wh/Kg Cell Capacity (Ah) |
|---|---|---|---|---|---|---|---|
| C/3 | 150 | 3 | 3.45 | 8 | 9.22 | 87 | 100.3 |
| C/3 | 273 | 3 | 6.1 | 8 | 16.38 | 49 | 100.3 |

| Rate | Electrode area (cm²) | ≥200 Wh/Kg Cell layers | ≥200 Wh/Kg Cell Capacity (Ah) | ≤230 Wh/Kg Cell layers | ≤230 Wh/Kg Cell Capacity (Ah) |
|---|---|---|---|---|---|
| 2 C | 150 | 8 | 9.22 | 87 | 100.3 |
| 2 C | 273 | 6 | 12.28 | 49 | 100.3 |

Calculation results for the selection of electrode area, number of electrode structures and cell capacity for high volumetric energy density batteries are shown in Tables 5-7 for battery types 1-3, respectively. In particular, the tables show the selection of the aforementioned parameters to obtain batteries having calculated volumetric energy densities of about 300 Wh/L to about 800 Wh/L or greater for discharge rates ranging from C/20 to 2 C. Referring to Tables 2-4, as with the calculations of gravimetric energy density, increased numbers of electrode structures (as well as battery capacity), result in increased volumetric energy density for a given electrode area, for the modeled battery types. It is noted that for a battery with given Wh/Kg, the volumetric energy density can be increased by increasing the press density of the cathode and anode electrode, assuming that the performance is not negatively influenced.

TABLE 5

Battery Type 1

| Rate | Electrode area (cm²) | ≥300 Wh/Lit Cell layers | ≥300 Wh/Lit Cell Capacity (Ah) | ≥400 Wh/Lit Cell layers | ≥400 Wh/Lit Cell Capacity (Ah) | ≥500 Wh/Lit Cell layers | ≥500 Wh/Lit Cell Capacity (Ah) | ≥600 Wh/Lit Cell layers | ≥600 Wh/Lit Cell Capacity (Ah) | ≥700 Wh/Lit Cell layers | ≥700 Wh/Lit Cell Capacity (Ah) | ≥800 Wh/Lit Cell layers | ≥800 Wh/Lit Cell Capacity (Ah) |
|---|---|---|---|---|---|---|---|---|---|---|---|---|---|
| C/20 | 150 | 1 | 2.3 | 2 | 4.7 | 2 | 4.7 | 3 | 7 | 4 | 9.5 | 5 | 11.9 |
| C/20 | 273 | 2 | 8.5 | 2 | 8.5 | 3 | 12.7 | 5 | 21.2 | 10 | 42.4 | 28 | 119 |

TABLE 5-continued

Battery Type 1

| | | ≥300 Wh/Lit | | ≥400 Wh/Lit | | ≥500 Wh/Lit | | ≥600 Wh/Lit | | ≥700 Wh/Lit | | ≥800 Wh/Lit | |
|---|---|---|---|---|---|---|---|---|---|---|---|---|---|
| Rate | Electrode area (cm$^2$) | Cell layers | Cell Capacity (Ah) | Cell layers | Cell Capacity (Ah) | Cell layers | Cell Capacity (Ah) | Cell layers | Cell Capacity (Ah) | Cell layers | Cell Capacity (Ah) | Cell layers | Cell Capacity (Ah) |
| C/3 | 150 | 1 | 2.3 | 2 | 4.7 | 3 | 7 | 3 | 7 | 5 | 11.9 | | |
| C/3 | 273 | 2 | 8.5 | 3 | 12.7 | 4 | 17 | 8 | 33.9 | 20 | 84.9 | | |
| 2 C | 150 | 2 | 4.7 | 3 | 7 | 4 | 9.5 | | | | | | |
| 2 C | 273 | 3 | 12.7 | 5 | 21.2 | 12 | 60 | | | | | | |

TABLE 6

Battery Type 2

| | | ≥400 Wh/Lit | | ≥500 Wh/Lit | | ≥600 Wh/Lit | | ≥700 Wh/Lit | |
|---|---|---|---|---|---|---|---|---|---|
| Rate | Electrode area (cm$^2$) | Cell layers | Cell Capacity (Ah) | Cell layers | Cell Capacity (Ah) | Cell layers | Cell Capacity (Ah) | Cell layers | Cell Capacity (Ah) |
| C/20 | 150 | 3 | 4.58 | 5 | 7.63 | 9 | 13.73 | 23 | 35 |
| C/20 | 273 | 3 | 8.1 | 5 | 13.55 | 10 | 27 | 28 | 75.88 |

| | | ≥400 Wh/Lit | | ≥500 Wh/Lit | | ≥600 Wh/Lit | |
|---|---|---|---|---|---|---|---|
| Rate | Electrode area (cm$^2$) | Cell layers | Cell Capacity (Ah) | Cell layers | Cell Capacity (Ah) | Cell layers | Cell Capacity (Ah) |
| C/3 | 150 | | | 4 | 6.1 | 6 | 9.2 |
| C/3 | 273 | 4 | 10.8 | 8 | 21.68 | 24 | 65 |

| | | ≥300 Wh/Lit | | ≥400 Wh/Lit | | ≥500 Wh/Lit | |
|---|---|---|---|---|---|---|---|
| Rate | Electrode surface area(cm2) | Cell layers | Cell Capacity (Ah) | Cell layers | Cell Capacity (Ah) | Cell layers | Cell Capacity (Ah) |
| 2 C | 150 | 4 | 6.1 | 10 | 15.3 | 66 | 100.7 |
| 2 C | 273 | 4 | 10.8 | 10 | 27.1 | | |

TABLE 7

Battery Type 3

| | | ≥300 Wh/Lit | | ≥400 Wh/Lit | | ≥500 Wh/Lit | | ≥600 Wh/Lit | |
|---|---|---|---|---|---|---|---|---|---|
| Rate | Electrode area (cm$^2$) | Cell layers | Cell Capacity (Ah) | Cell layers | Cell Capacity (Ah) | Cell layers | Cell Capacity (Ah) | Cell layers | Cell Capacity (Ah) |
| C/20 | 150 | 3 | 3.45 | 6 | 6.92 | 14 | 16.1 | 87 | 100.3 |
| C/20 | 273 | 3 | 6.1 | 6 | 12.3 | 16 | 32.7 | | |
| C/3 | 150 | 4 | 4.6 | 7 | 8 | 26 | 30 | 87 | 100.3 |
| C/3 | 273 | 3 | 6.1 | 6 | 12.3 | 18 | 36.8 | | |
| 2 C | 150 | 6 | 6.9 | 25 | 28.8 | 87 | 103 | | |
| 2 C | 273 | 5 | 10.23 | 18 | 36.85 | | | | |

Battery Performance

Batteries have been formed with high energy formats suitable for commercial applications, such as electric vehicle applications based on high capacity positive electrodes and high capacity negative electrodes. Very good cycling performance has been obtained, especially for embodiments with supplemental lithium. Electrode designs have been developed to take advantage of the high capacity materials, as described above.

The lithium ion secondary battery disclosed herein can have a discharge energy density of at least about 250 Wh/kg at C/20 when discharged from 4.6V to 1.5V. In some embodiment, the battery has a discharge energy density of at least about 300 Wh/kg, and in other embodiments from about 325 Wh/kg to about 550 Wh/kg at a C/20 rate from 4.6V to 1.5V. Similarly, the battery can exhibit a discharge energy density of at least about 230 Wh/kg, in other embodiments at least about 250 Wh/kg and in further embodiments from about 280 Wh/kg to about 450 Wh/kg at a C/3 rate from 4.6V to 1.5V. With respect to battery volume, the lithium ion batteries can have a volumetric energy density of at least about 600 Wh/l (watt hours/liter), in further embodiments from about 650 Wh/l to about 925 Wh/l and in additional embodiments from about 700 Wh/l to about 900 Wh/l at a rate of C/20 from 4.6V to 1.5V. Similarly, the battery can exhibit a volumetric energy density of at least about 450 Wh/l, in other embodiments at least about 500 Wh/l and in further embodiments from about 600 Wh/l to about 800 Wh/l at a C/3 rate from 4.5V to 1.5V. The batteries also exhibit very good cycling performance. In some embodiments, the batteries exhibit a discharge capacity at cycle 100 of at least about 90% of the 6th cycle capacity discharged at C/3 from 4.5V to 1.5V, in other embodiments at least about 92% and in additional embodiments at least about 94% at the 100th cycle relative to the 6th cycle. Also, capacity fade with cycling can be reduced by cycling over a reduced voltage window. Thus, in some embodiments, the batteries exhibit a discharge capacity at cycle 100 of at least about 90% of the 6th cycle capacity discharged at C/3 from 4.35V to 1.5V, in other embodiments at least about 92% and in additional embodiments at least about 94% at the 100th cycle relative to the 6th cycle. In some embodiments, the battery exhibits a 500th cycle energy density of at least about 200 Wh/kg, in further embodiments at least about 225 Wh/kg when discharged at a rate of C/3 from 4.3V to 1.5V. A person of ordinary skill in the art will recognize that additional ranges of energy densities within the explicit ranges above are contemplated and are within the present disclosure.

EXAMPLES

To test positive electrodes and negative electrodes with different compositions, batteries were constructed and tested against lithium foil as the counter electrode. Other batteries were then formed with high capacity positive electrodes with the high capacity negative electrodes at different excess anode capacity with or without supplemental lithium to construct coin cell batteries. The general procedure for formation of the coin batteries is described in the following discussion. Additionally, the positive electrodes and the negative electrodes at different excess anode capacity with or without supplemental lithium were assembled to pouch cell batteries. The batteries were cycled over a relevant voltage range for a commercial battery. The individual examples below describe formulation of the electrodes and the batteries and the performance results from the batteries. The batteries with silicon based negative electrode described herein in general were cycled by charging from the open circuit voltage to 4.6V and discharging from 4.6V to 1.5V in the first formation cycle and from 4.5V to 1.5V in the cycle testing for batteries with high capacity manganese rich (HCMR™) positive counter electrode or between 0.005V-1.5V for batteries with lithium foil counter electrode. The batteries were discharged at a rate of C/10, C/5, and C/3 for the 1st and 2nd cycles, for the 3rd and 4th cycles, and for subsequent cycles, respectively. All percentages reported in the examples are weight percents.

Negative electrodes were formed from silicon based active materials, which are described further below. In general, a powder of the silicon based active material was mixed thoroughly with an electrically conductive carbon additive, such as a blend of acetylene black (Super P® from Timcal, Ltd., Switzerland) with either graphite or carbon nanotubes, to form a homogeneous powder mixture. Separately, polyimide binder was mixed with N-methyl-pyrrolidone ("NMP") (Sigma-Aldrich) and stirred overnight to form a polyimide-NMP solution. The homogenous powder mixture was then added to the polyimide-NMP solution and mixed for about 2 hours to form homogeneous slurry. The slurry was applied onto a copper foil current collector to form a thin, wet film and the laminated current collector was dried in a vacuum oven to remove NMP and to cure the polymer. The laminated current collector was then pressed between rollers of a sheet mill to obtain a desired lamination thickness. The dried laminate contained at least 75 wt % porous silicon based active material and at least 2 wt % polyimide binder. The resulting electrodes were assembled with either a lithium foil counter electrode or with a counter electrode comprising a lithium metal oxide (LMO), such as high capacity manganese rich (HCMR™) lithium metal oxide material as synthesized in the '853 application, the '332 application, and the '981 application referenced above.

The examples below in general use HCMR™ positive material approximately described by the formula $xLi_2MnO_3 \cdot (1-x)LiNi_uMn_vCo_wO_2$ where x=0.3 or 0.5. Positive electrodes were formed from the synthesized HCMR™ powder by initially mixing it thoroughly with conducting carbon black (Super P™ from Timcal, Ltd, Switzerland) and either graphite (KS 6™ from Timcal, Ltd) or carbon nanotubes to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried positive electrode comprised at least about 75 weight percent active metal oxide, at least about 1 weight percent graphite, and at least about 2 weight percent polymer binder. Positive electrodes using HCMR™ positive electrode active material are generally referred to as HCMR™ electrodes.

For batteries with the lithium foil counter electrodes, the electrodes were placed inside an argon filled glove box for the fabrication of the coin cell batteries. Lithium foil (FMC Lithium) having thickness of roughly 125 micron was used as a negative electrode. A conventional electrolyte comprising carbonate solvents, such as ethylene carbonate, diethyl carbonate and/or dimethyl carbonate, was used. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

For batteries with the HCMR™ counter electrodes, the silicon oxide based electrode and the HCMR™ electrode were placed inside an argon filled glove box. An electrolyte was selected to be stable at high voltages, and appropriate electrolytes with halogenated carbonates, e.g., fluoroethylene carbonate are described in the '367 application. Based on these electrodes and the high voltage electrolyte, the coin cell batteries were completed with separator and hardware as described above for the batteries with the lithium foil electrode. During the first cycle, the batteries were charged to 4.6V, and in subsequent cycles, the batteries were charged to 4.5V.

Some of the batteries fabricated from a silicon based negative electrode and a HCMR™ positive electrode can further comprise supplemental lithium. In particular, a desired amount of SLMP® powder (FMC Corp., stabilized lithium metal powder) was loaded into a vial and the vial was then capped with a mesh comprising nylon or stainless steel with a mesh size between about 40 μm to about 80 μm. SLMP® (FMC corp.) was then deposited by shaking and/or tapping the loaded vial over a formed silicon based negative electrode. The coated silicon based negative electrode was then compressed to ensure mechanical stability.

Batteries fabricated from a silicon based negative electrode and a HCMR™ positive electrode can be balanced to have excess negative electrode material. The balancing was based on the ratio of the first cycle lithium insertion capacity of the silicon based negative electrode to the total available lithium in the battery which is the sum of the oxidation capacity of the supplemental lithium and the theoretical capacity of the HCMR™ positive electrode. In particular, for a given silicon based active composition, the insertion and extraction capacities of the silicon based composition can be evaluated in a battery setting. For example, a battery that has a positive electrode comprising the silicon based active material with a counter lithium foil negative electrode can be constructed. The insertion and extraction capacities of the silicon based composition in the electrode equals to the first cycle battery capacity measured when lithium is intercalated/alloyed to the porous silicon based electrode to 5 mV and de-intercalated/de-alloyed to 1.5V at a rate of C/20. Specific values of the excess negative electrode balance are provided in the specific examples below. For batteries containing supplemental lithium, the amount of supplemental lithium was selected to approximately compensate for the irreversible capacity loss of the negative electrode.

Example 1 Construction and Performance Evaluation of High Capacity Negative Electrodes To test the impact of different relative amounts of anode composition, binder and conducting additives on the cycling performance of an electrode, electrodes 1-4 with different composition as outlined in Table 8 below were constructed, using a procedure outlined above. The negative electrode active material used is a SiO—Si—C composite, such as described in the '708 application referenced above. The polymeric binder used was a polyimide from a commercial supplier as described above. The electrically conductive material for these batteries was carbon nanotubes, which were obtained from a commercial supplier. The amount of SiO—Si—C composite in electrodes 1 to 4 is varied in the range of 80% to 90%.

TABLE 8

| Electrode | % Active Material | % Carbon nanotubes |
|---|---|---|
| 1 | 85 | a |
| 2 | 80 | a |
| 3 | 80 | >a |
| 4 | 90 | 0 |

Figure 3:
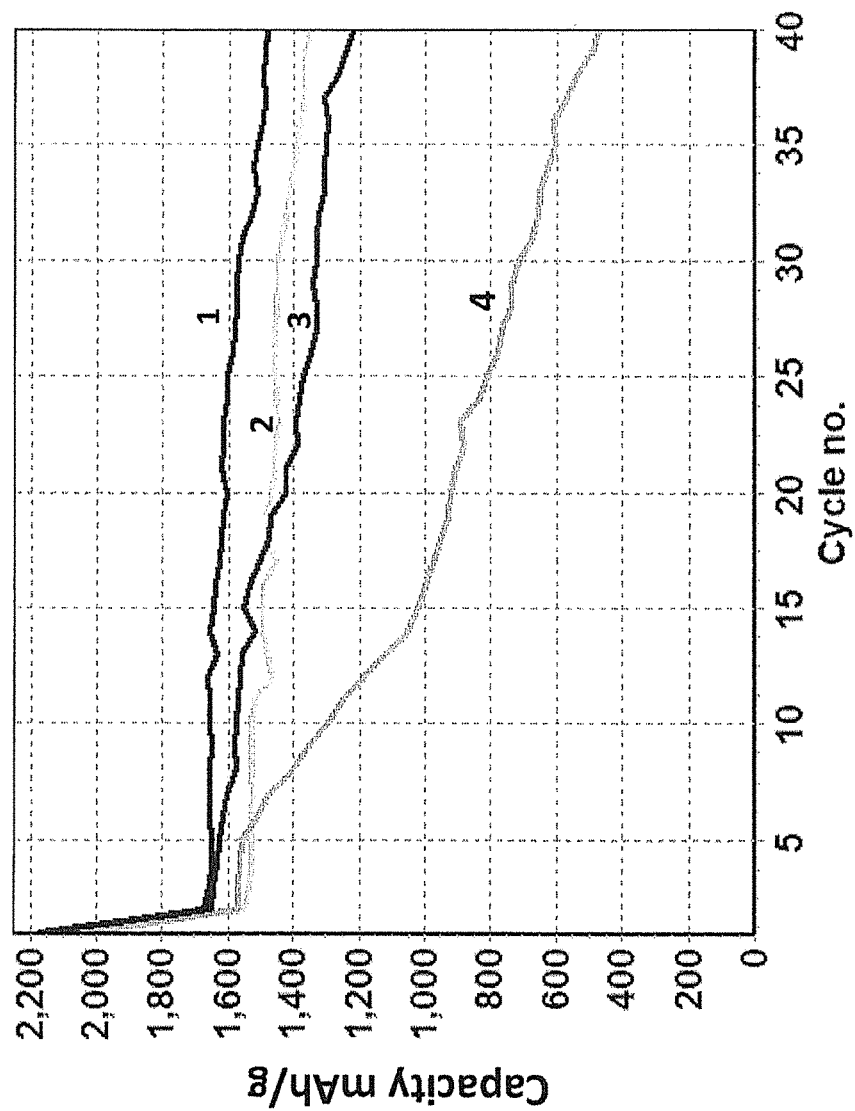
FIG. 3 is a plot of discharge capacities versus cycle number of batteries with a lithium foil electrode and silicon based counter electrodes with four different compositions.

The electrodes were cycled against a lithium foil counter electrode over 40 cycles at a rate of C/20 for 1st cycle, C/10 for 2nd cycle, C/5 for 3rd cycle, and C/3 for subsequent cycles, and the discharge capacity of the electrodes versus cycle number is plotted in FIG. 3. As shown in FIG. 3, electrode 1 with 85% SiO—Si—C composite gave the best cycling performance and higher capacity compared to electrodes with other compositions. Electrode 4 with 90% SiO—Si—C composite and 10% binder and no conductive additive did not show good cycling performance and faded rapidly.

Figure 4:
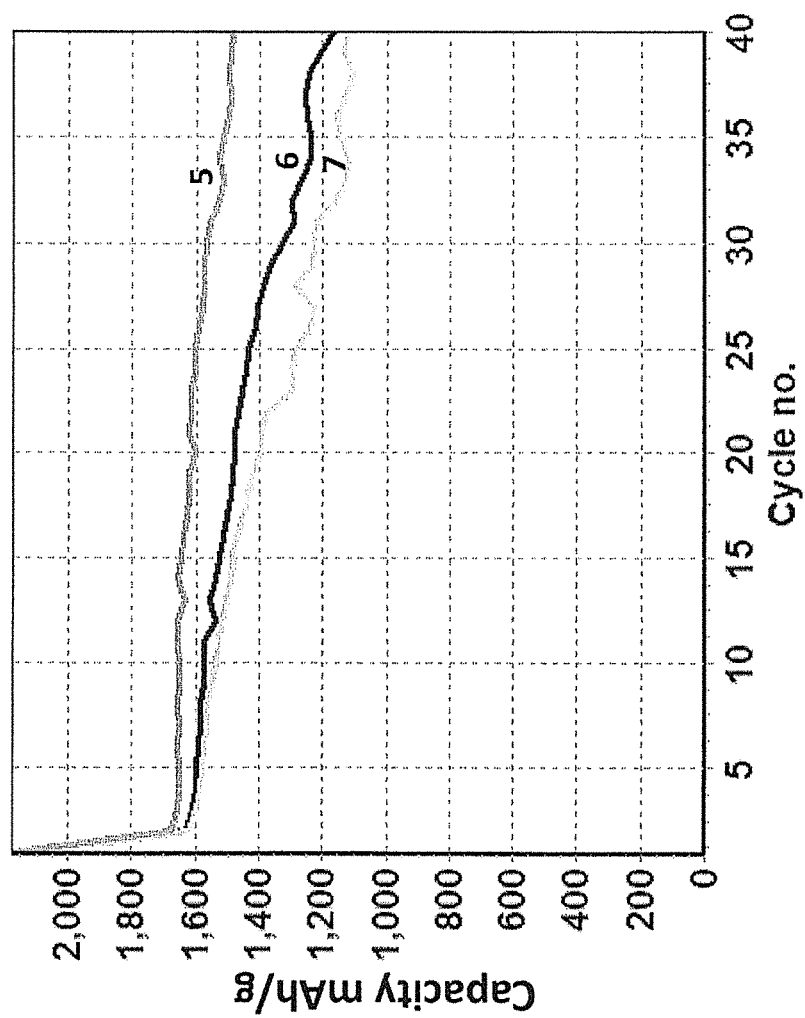
FIG. 4 is a plot of discharge capacity versus cycle number of batteries with a lithium foil electrode and silicon based counter electrodes with three different electrode densities.

To test the effect of density on the silicon-based electrode performance, electrodes 5-7 with active material densities of 0.9 g/cc, 1 g/cc, and 1.2 g/cc respectively were constructed using the electrode formulation of electrode 1 above. The electrodes were cycled against a lithium foil counter electrode over 40 cycles at a rate of C/10 1st cycle, C/5 2nd cycle, and C/3 subsequent cycles and the discharge capacity of the electrodes versus cycle number is plotted in FIG. 4. As shown in FIG. 4, electrode 5 with the lowest density of 0.9 g/cc showed the best cycling performance compared to the other two electrodes.

Detailed information with regard to the compositions and formation of silicon based anode materials are disclosed in the '096 application, the '294 application, and the '708 application referenced above. To compare the electrode performance of different silicon based negative electrode active materials, electrodes 8-10 made with porous silicon based material, SiO—Si—C composite, and SiO—C composite respectively were constructed and tested. Electrode 8 comprised porous silicon based material, Super-P as conductive additive, and binder. Electrode 9 comprised SiO—Si—C composite anode material in an electrode formulation corresponding to electrode 1 above. Electrode 10 comprised SiO—C composite anode material with Super-P as conductive additive, and binder. Electrodes 8-10 had an electrode density from 0.5 g/cc to 1.2 g/cc and a loading level of 2.0 mg/cm$^2$ to 4.5 mg/cm$^2$.

Figure 5:
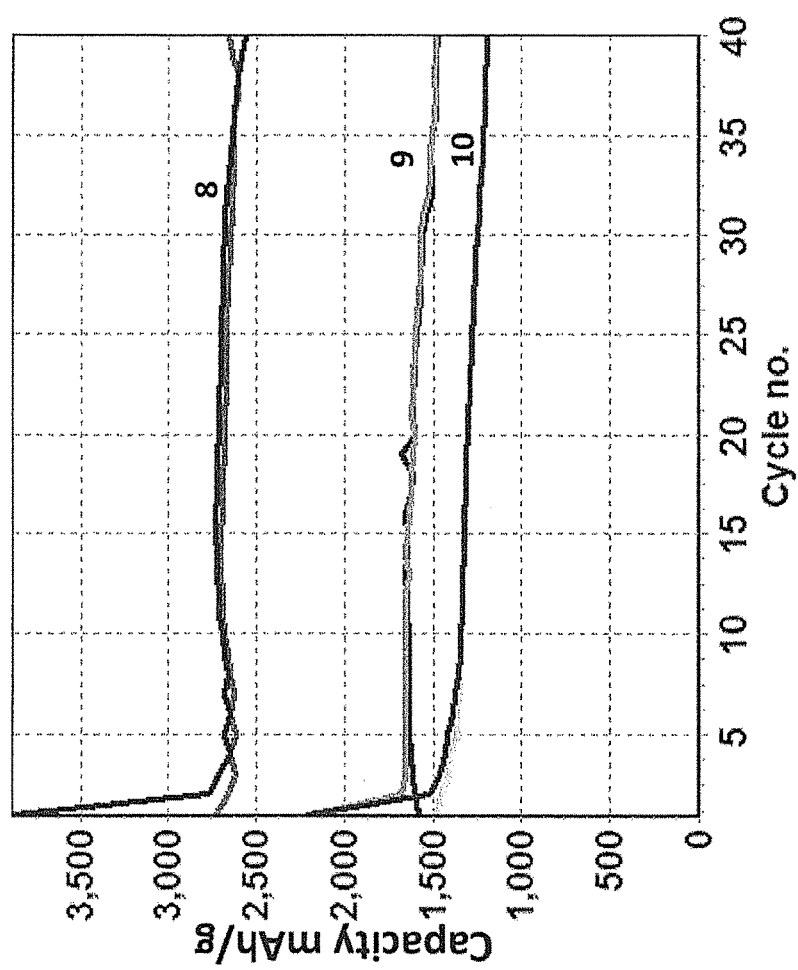
FIG. 5 is a plot of charge and discharge capacities versus cycle number of batteries with a lithium foil electrode and counter electrodes made from different silicon based materials.

The electrodes were cycled against a lithium foil counter electrode over 40 cycles and the capacity of the electrodes versus cycle number is plotted in FIG. 5. The batteries were cycled at a rate of C/20 for the first cycle, at C/10 for the second cycle, at C/5 for the third and the forth cycles, and at C/3 for the remaining cycles. As shown in FIG. 5, electrode 8 made with porous silicon based material showed the highest capacity and the best capacity retention of all three electrodes. Electrode 9 made with SiO—Si—C composite showed stable cycling life and good capacity retention when the rate is changed from C/20 to C/3.

Example 2 Construction and Performance Evaluation of High Capacity Positive Electrodes Positive electrodes that have high capacity, high electrode conductivity, high electrode loading balanced with high electrode density have been constructed and tested for cycling performance against a lithium foil counter electrode. The effects of carbon nanotubes as an electrically conductive component were also tested. The lithium metal oxide used for the positive electrode can be approximately represented by the formula $Li_2MnO_3 \cdot (1-x)LiNi_uMn_vCo_wO_2$. A first composition had x=0.5 and a second composition had x=0.3. The compositions had a metal halide coating. A discussion of the synthesis and testing of a range of cathode active materials with similar stoichiometries with or without additional oxide or halide coatings can be found in published U.S. patent application 2011/0052981A to Lopez et al., entitled "Layer-Layer Lithium Rich Complex Metal Oxides With High Specific Capacity And Excellent Cycling," incorporated herein by reference.

Figure 6:
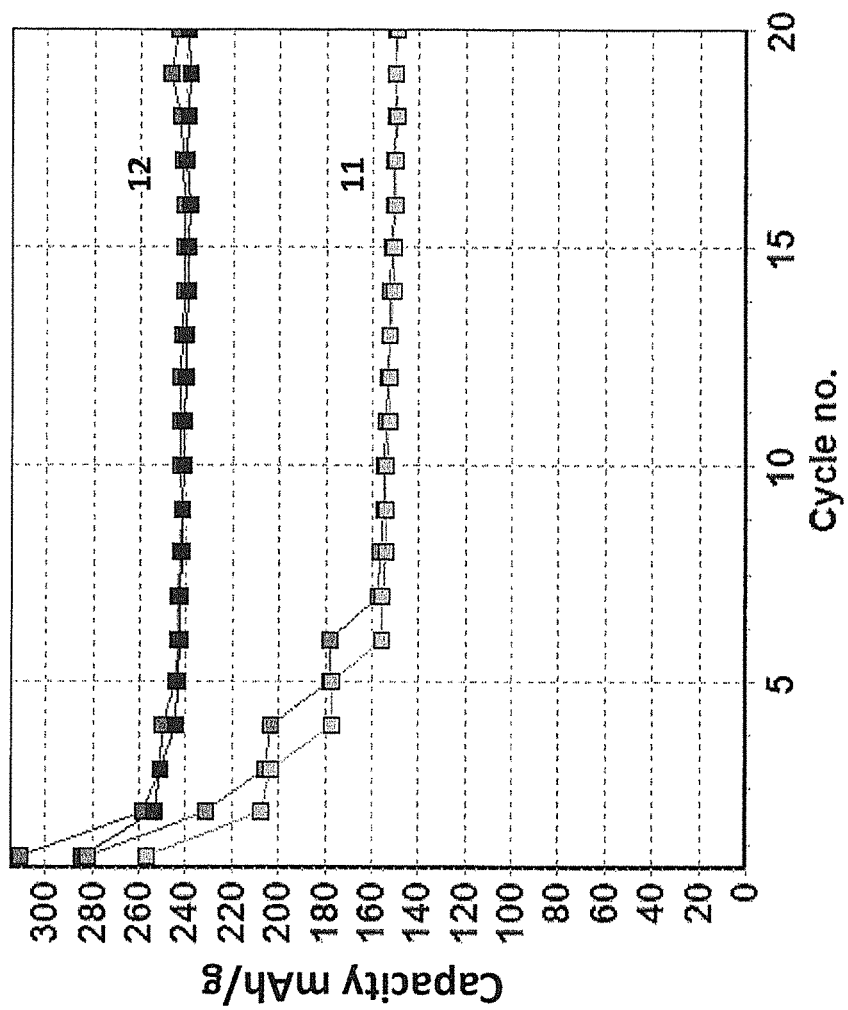
FIG. 6 is a plot of charge and discharge capacities versus cycle number of batteries with a lithium foil electrode and positive electrodes made with two different conductive additives.

To test the effect of different conductive additive on the positive electrode performance, electrodes 11 and 12 with an active material loading level of about 22 mg/cm$^2$ were constructed. Electrode 11 used Super-P and KS-6 as conductive additive while electrode 12 used Super-P and carbon nanotubes. Both electrodes had approximately equivalent formulations with >90% positive electrode active material, <5% PVDF binder and <5% total conductive additives. The electrodes were cycled against a lithium foil counter electrode from 2V to 4.6V over 20 cycles at a rate of C/20 for 1st cycle, C/10 for 2nd and 3rd cycles, C/5 for 4th and 5th cycles, and C/3 for subsequent cycles, and the capacity of the electrodes versus cycle number is plotted in FIG. 6. As shown in FIG. 6, electrode 12 with the Super-P and carbon nanotubes showed the better cycling performance compared to the electrode 11 with KS-6 graphite in place of carbon nanotubes.

Figure 7:
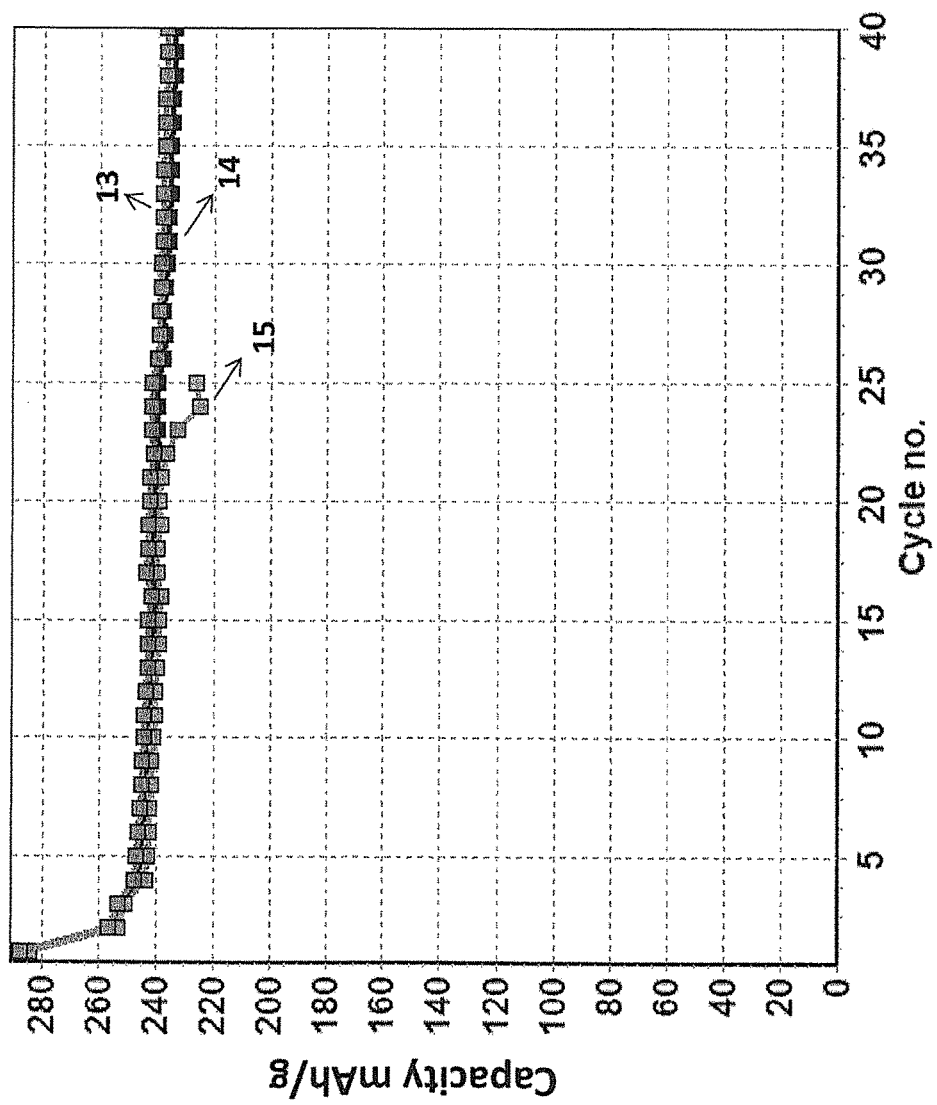
FIG. 7 is a plot of discharge capacity versus cycle number of batteries with a lithium foil electrode and positive electrodes with various electrode loading levels having an electrode density of ≤3 g/cc, in which varying electrode loading is obtained by selecting an appropriate thickness of the electrodes.

To test the effect of different electrode loading levels on cycling performance, electrodes 13-15 with a loading level of 13 mg/cm$^2$, 18 mg/cm$^2$, and 26 mg/cm$^2$ were constructed. All the electrodes were calendared to an approximately equivalent active material electrode density of <3 g/cc and had approximately equivalent electrode formulations with >90% positive electrode active material, <5% total conductive additives (carbon nanotube and Super-P), and <5% binder. The electrodes were cycled against a lithium foil counter electrode over 40 cycles at a rate of C/10, C/5, and C/3 for the $1^{st}$, $2^{nd}$ and 3rd, and for subsequent cycles, respectively and the capacity of the electrodes versus cycle number is plotted in FIG. 7. As shown in FIG. 7, electrodes 13 and 14 with loading levels 13 mg/cm$^2$ and 18 mg/cm$^2$ respectively cycled well while electrode 15 with loading level 26 mg/cm$^2$ faded and failed after 25 cycles.

Figure 8:
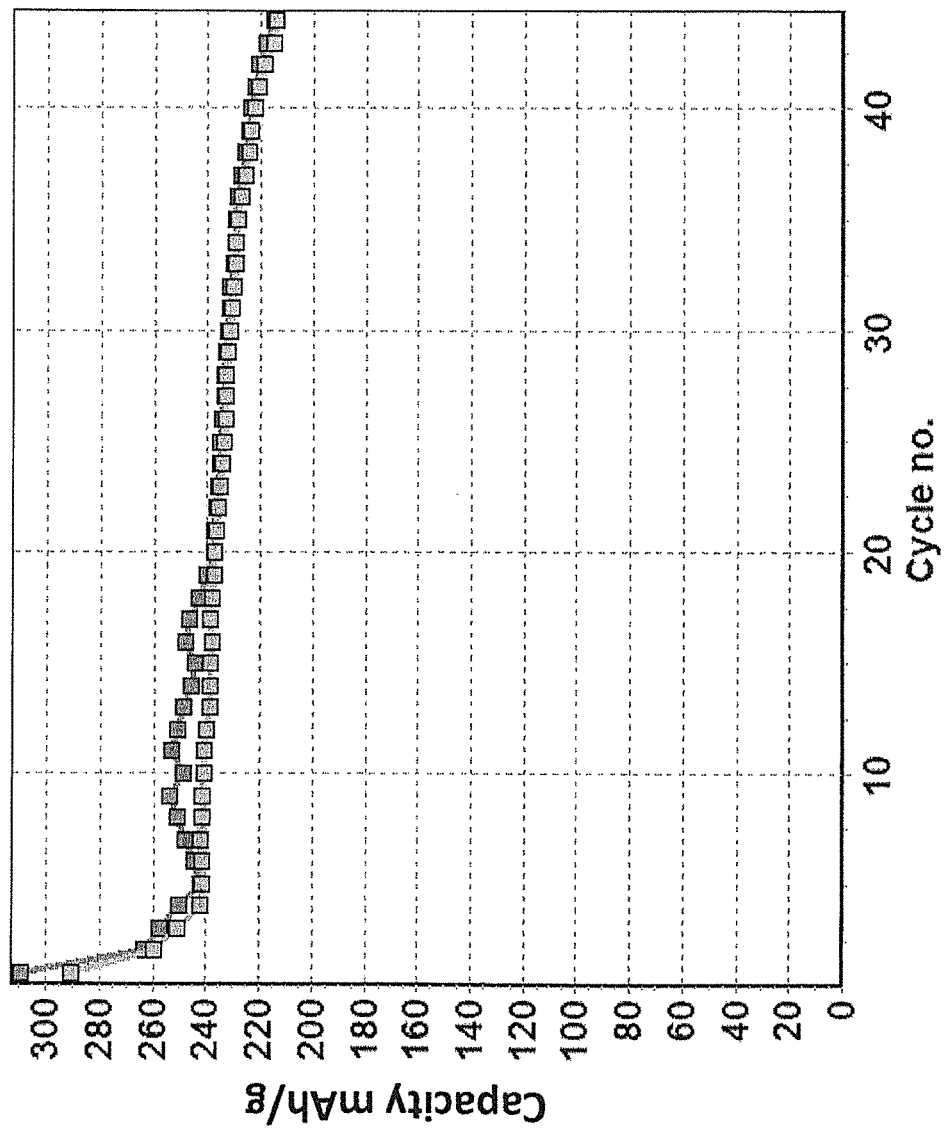
FIG. 8 is a plot of charge and discharge capacities versus cycle number of a battery with a lithium foil electrode and positive electrode with an electrode loading of 26 mg/cm$^2$ and electrode density of 2.4 g/cc.

To test the balance of electrode density with electrode loading level, electrode 16 with a loading level of 26 mg/cm$^2$ and an active material density of about 2.4 g/cc was constructed. The electrode had >90% positive electrode active material, <5% total conductive additives (carbon nanotube and Super-P), and <5% binder. The electrode was cycled against a lithium foil counter electrode over 20 cycles at a rate of C/20 for the 1st cycle, C/10 for the 2nd cycle, C/5 for the 3rd cycle, and C/3 for subsequent cycles, and the charge capacity and discharge capacity of the electrode versus cycle number is plotted in FIG. 8. As shown in FIG. 8, electrode 16 has good cycling performance out to 50 cycles even with a high loading level of 26 mg/cm$^2$ when the density was reduced to 2.4 g/cc, which corresponds to a thicker electrode.

Example 3 Balance of Positive Electrode and Negative Electrode Capacities with or without Supplemental Lithium Batteries 1-6 outlined in Table 9 below were constructed with different capacity balances of HCMR™ positive electrode 12 of example 2 and SiO—Si—C composite negative electrode 1 of example 1 with or without supplemental lithium to test for cycling performance. Batteries 1-4 were constructed with excess negative electrode capacity 10%, 20%, 30% and 40% over the positive electrode capacity, respectively. Supplemental lithium is added to batteries 1-4 with a capacity equivalent to the difference between the capacities of the anode and the cathode. Thus, battery 1 has the least amount of supplemental lithium, and battery 4 has the greatest amount of supplemental lithium. Batteries 5 and 6 were constructed with balances of 5% and 30% excess negative electrode capacity relative to the positive electrode capacity respectively without supplemental lithium. The amount of supplemental lithium added into batteries 1-4 is estimated to compensate for the excess anode capacity of the negative electrode. For example battery 1 with 10% anode excess has supplemental lithium in an amount with an oxidation capacity that is the difference between the anode and cathode capacities, which is about 10% excess over the cathode capacity. While battery 4 with 40% excess anode has supplemental lithium in an amount with an oxidation capacity equivalent to the difference between the anode and cathode capacities which is about 40% excess over the cathode capacity.

TABLE 9

| Battery | % excess negative electrode capacity | Supplemental lithium | IRCL in the first cycle % |
|---|---|---|---|
| 1 | 10 | Yes | 14.0 |
| 2 | 20 | Yes | 13.1 |
| 3 | 30 | Yes | 12.3 |
| 4 | 40 | Yes | 12 |
| 5 | 5 | No | 26.6 |
| 6 | 30 | No | 29.1 |

Figure 9:
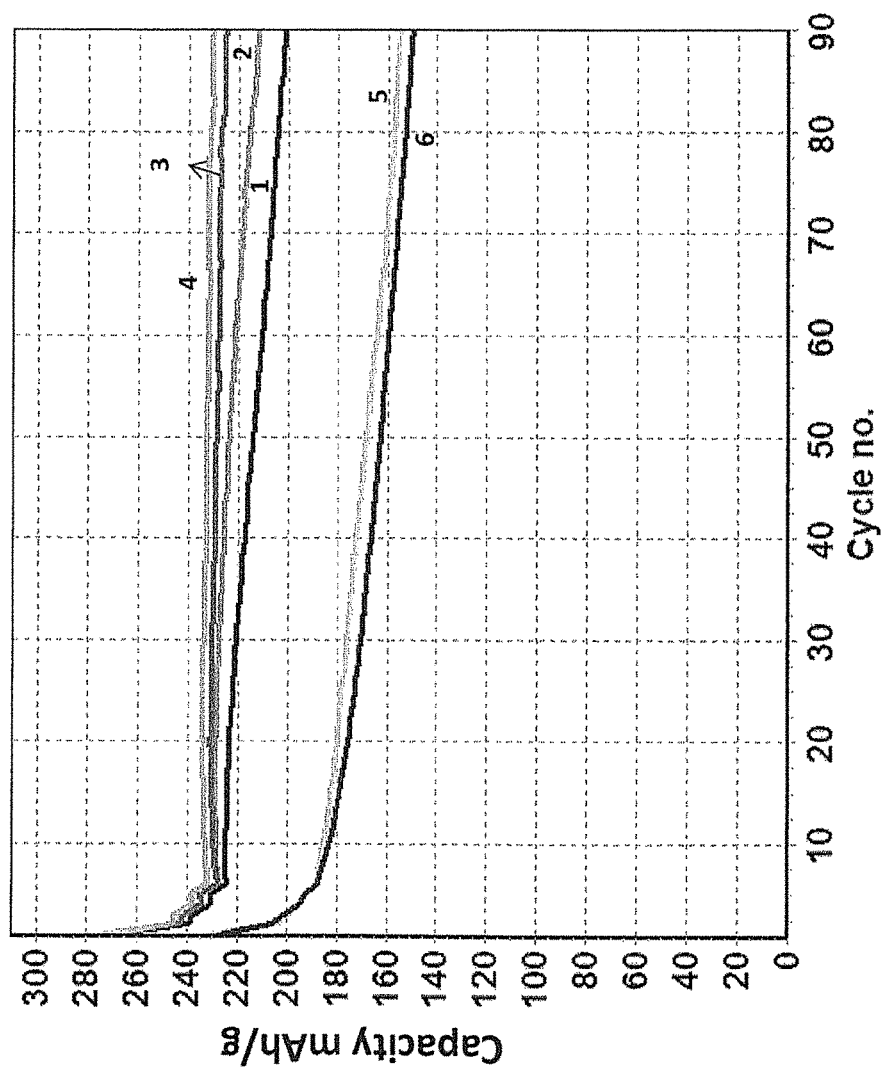
FIG. 9 is a plot of discharge capacity versus cycle number of batteries with different balance of SiO—Si—C anode against HCMR™ cathode with and without supplemental Li added to the negative electrode.

The batteries were cycled at a rate of C/20 for 1st cycle, C/10 for 2nd and 3rd cycles, C/5 for 4th and 5th cycles, and C/3 for subsequent cycles, and the results are shown in FIG. 9. As shown in FIG. 9, for batteries 1-4 with supplemental lithium, batteries with higher anode excess have better cycling performance. Battery 4 with 40% excess anode for example has a capacity fade of <1% during 90 charge/discharge cycles compared to the first C/3 cycle capacity. In comparison, batteries 5 and 6 without any supplemental lithium showed rapid fading in capacity, which may be attributable to a significant capacity loss from the cathode into the anode in the first cycle that is evident from the first cycle IRCL in the batteries 5 and 6 shown in table 9 above.

Figure 10:
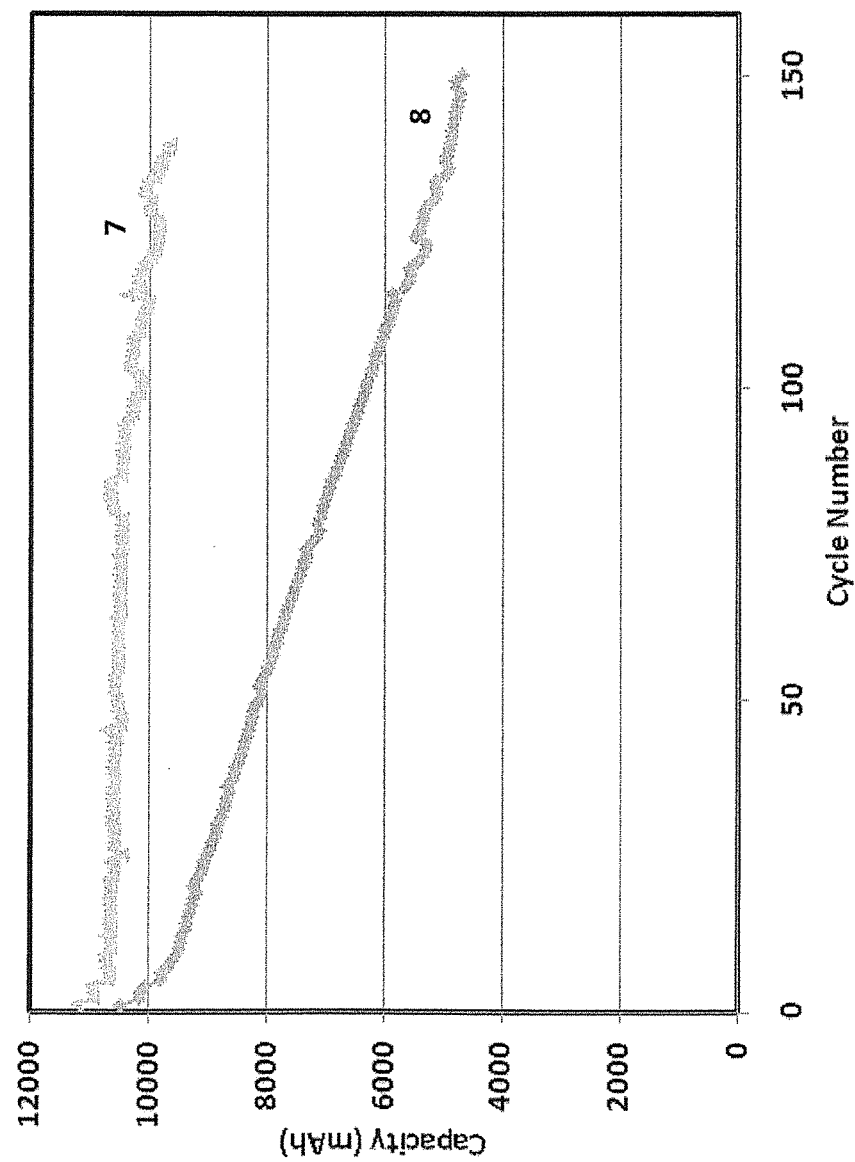
FIG. 10 is a plot of discharge capacity versus cycle number of pouch cell batteries having an approximate 10 Ah design capacity, with and without supplemental lithium.

Example 4 Construction and Cycling Performance Evaluation of Pouch Cell Batteries Batteries with compositions of battery 4 of example 3 above were constructed into pouch cell format. These pouch cell batteries were constructed to have a variety of overall capacities and were then tested for cycling performance. Pouch cell batteries 7 and 8 with a design capacity of roughly 10 Ah were cycled at C/10 for the first cycle, at C/5 for the next three cycles, and at C/3 for the remaining cycles, at a voltage range of 1.5V to 4.6V for the first cycle followed by a voltage range of 1.5V to 4.5V for the subsequent cycles. The cathode electrode used has a loading level of >16 mg/cm$^2$ and the anode used has a loading level of >3.5 mg/cm$^2$. Battery 7 has 38% excess anode and supplemental lithium. Battery 8 has 10% excess anode with no supplemental lithium. Battery 7 with supplemental lithium to compensate for 100% of the anode IRCL showed excellent cycling performance with an energy density of about 270 Wh/Kg at C/10 and 246 Wh/Kg at the first C/3 rate and has a volume energy density of 400 Wh/L. As shown in FIG. 10, battery 7 finished 140 cycles with 90% capacity remaining after 140 cycles while battery 8 without supplemental lithium has a rapid capacity fade and the capacity fell to less than 50% after 140 cycles.

Figure 11B:
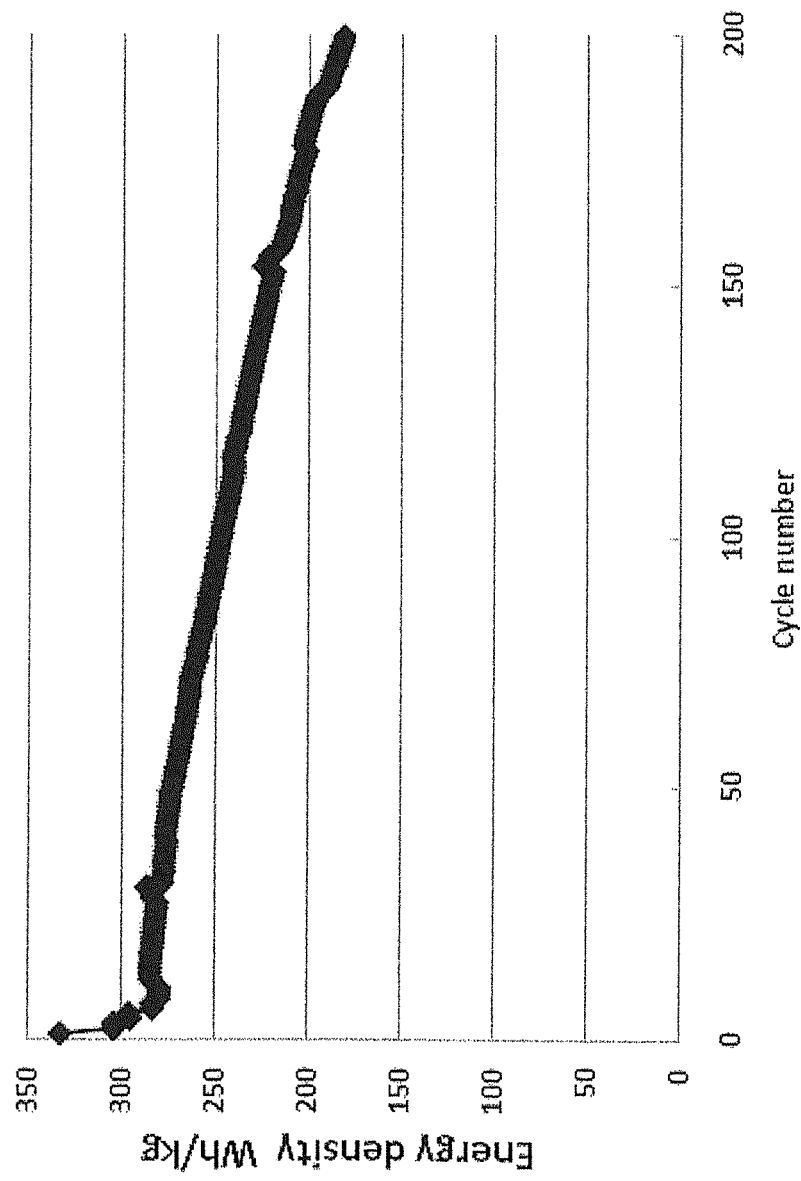
FIG. 11(b) is a plot of energy density per kg versus cycle number of the battery of FIG. 11(a).

Pouch cell battery 9 with a design capacity of roughly 20 Ah at C/3 was cycled at C/20 for the first cycle, at C/10 for the next two cycles, at C/5 for the next two cycles, and at C/3 for the remaining cycles at a voltage range of 1.5V to 4.6V for the first cycle followed by a voltage range of 1.5V to 4.5V for subsequent cycles. The cathode had a loading level of >20 mg/cm$^2$, and the anode had a loading level of >4.5 mg/cm². Battery 9 had 20% excess anode and supplemental lithium to compensate for about 100% of the IRCL of the battery. As shown in FIG. 11(b) battery 9 gave an energy density of 330 Wh/Kg at C/20, 296 Wh/Kg at the first C/3 cycle, and about 65% efficiency at C/3 after 200 cycles. As shown in FIG. 11(a), the capacity of battery 9 maintained above 14000 mAh after 200 charge/discharge cycles.

Figure 12B:
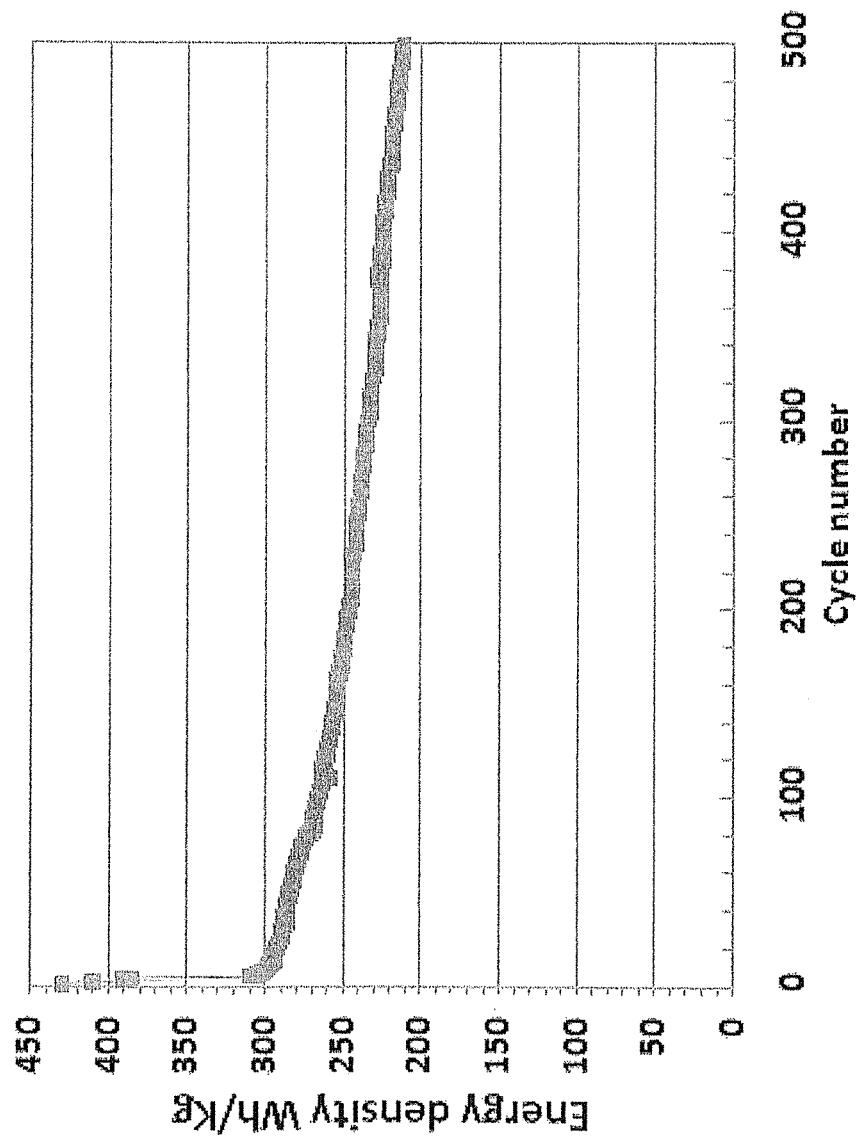
FIG. 12(b) is a plot of energy density per kg versus cycle number of the battery of FIG. 12(a).
Figure 12C:
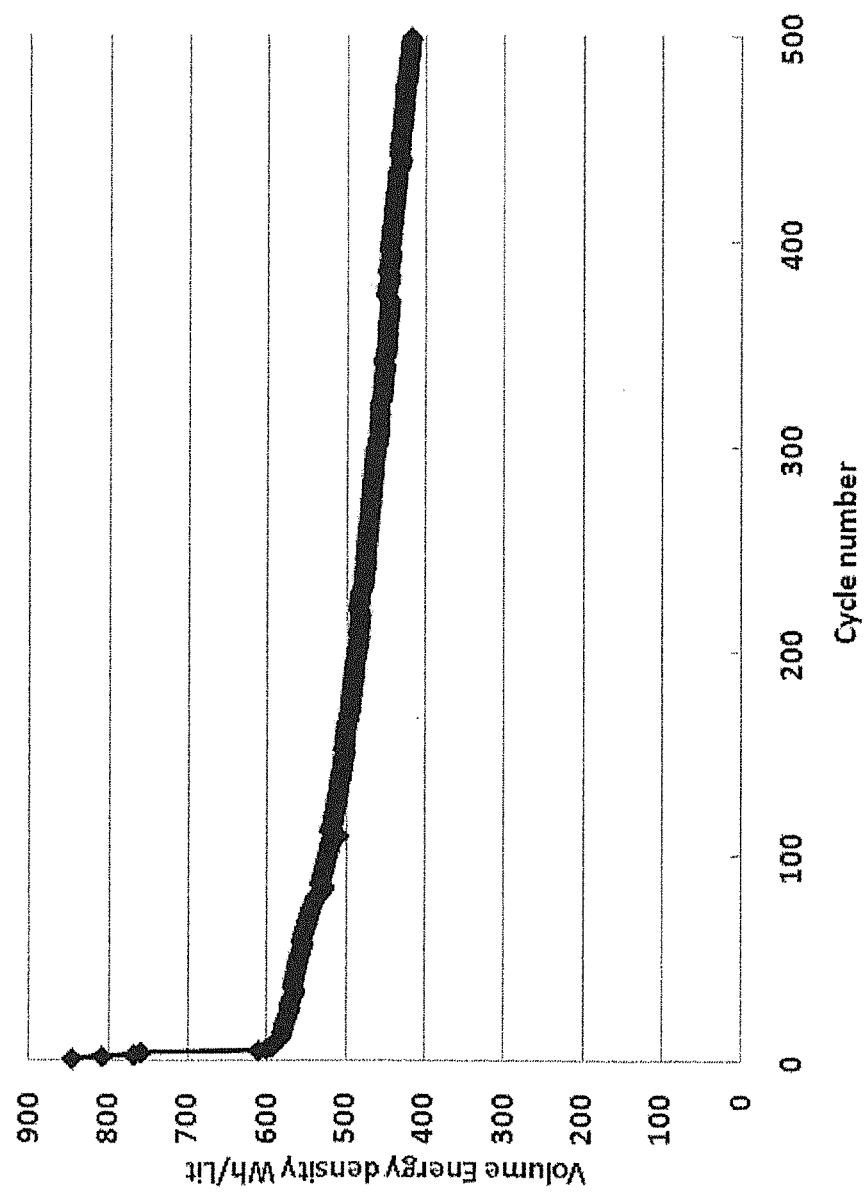
FIG. 12(c) is a plot of volumetric energy density per liter versus cycle number of the battery of FIG. 12(a).

Pouch cell battery 10 with a design capacity of roughly 45 Ah at C/3 was cycled at C/20 for the first cycle, at C/10 for the next cycle, C/3 for the next two cycles with the first four cycles from 4.6V to 1.5V, and at C/3 from 4.3V to 1.5V for the remaining cycles. The cathode had a loading level of >25 mg/cm², and the anode had a loading level of >4.5 mg/cm². Battery 10 has excess anode balance in the very first C/20 charge-discharge cycle and is in the 80% DOD voltage window which is 4.3V-1.5V, and the supplemental lithium is loaded to compensate for about 100% of anode irreversible capacity loss. As shown in FIG. 12(b) battery 10 gave an energy density of 430 Wh/Kg at C/20, 410 Wh/Kg at C/10,392 Wh/Kg at the first C/3 cycle, 310 Wh/Kg at the first C/3 from 4.3V to 1.5V, and about 68% efficiency at C/3 from 4.3V to 1.5V after 500 cycles. As shown in FIG. 12(c) battery 10 gave an energy density of about 850 Wh/L at C/20, about 805 Wh/L at C/10, about 760 Wh/L at the first C/3 cycle, about 605 Wh/L at first C/3 from 4.3V to 1.5V, and about 400 Wh/L at C/3 from 4.3V to 1.5V after 500 cycles. As shown in FIG. 12(a), the capacity of battery 10 maintained above 2400 mAh after 500 cycles at C/3 from 4.3V to 1.5V.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A lithium ion battery comprising:
   an electrode stack comprising:
   3-50 positive electrode elements each comprising a current collector and a positive electrode structure on a surface of the current collector with at least one electrode element having an electrode structure on both sides of the current collector;
   3-50 negative electrode elements each comprising a current collector and a positive electrode structure on a surface of the current collector with at least one electrode element having an electrode structure on both sides of the current collector;
   and a separator material separating an adjacent positive electrode element and negative electrode element;
   an enclosure that encloses the electrode stack; and
   electrolyte comprising lithium ions,
   wherein each positive electrode has an active material comprising a lithium rich metal oxide, an area along one side from about 100 cm² to about 400 cm² and a loading from about 13 mg/cm² to about 35 mg/cm² on one side of the respective current collector and wherein each negative electrode comprises from about 75 wt % to about 96 wt % of a silicon based active material, from about 1 wt % to about 15 wt % carbon nanotubes, carbon nanofibers, nanostructured carbon, graphene or combinations thereof as a distinct conductive additive and a polymer binder supporting the silicon based active material and conductive additive, having a loading from about 3 mg/cm² to about 6 mg/cm² on one side of the respective current collector and a density in the negative electrode from 0.825 g/cc to about 1.2 g/cc, and wherein the battery exhibits a discharge capacity at the 100th cycle that is at least about 90% of the 6th cycle capacity when discharged at a rate of C/3 from 4.5V to 1.5V, the battery having an energy density from about 290 Wh/kg to about 550 Wh/kg discharged at a rate of C/10 from 4.6V to 1.5V.

2. The lithium ion battery of claim 1 wherein during an initial activation charge the battery has a negative electrode charge capacity of about 115% to about 165% at a rate of C/20 from an open circuit voltage to 1.5V against lithium relative to the sum of the first activation cycle positive electrode charge capacity at a rate of C/20 from an open circuit voltage to 4.6V against lithium plus the oxidation capacity of any supplemental lithium.

3. The lithium ion battery of claim 1 wherein the electrode stack has 5-35 positive electrode elements and 5-35 negative electrode elements and wherein the battery has an energy density from about 300 Wh/kg to about 500 Wh/kg.

4. The lithium ion battery of claim 1 wherein the battery has a volumetric energy density from about 500 Wh/l to about 900 Wh/l.

5. The lithium ion battery of claim 1 wherein the battery is a pouch cell comprising a foil enclosure with a roughly prismatic shape and a ceramic separator.

6. The lithium ion battery of claim 1 wherein the lithium rich positive electrode active material is approximately represented by the formula $Li_{1+b}Ni_\alpha Mn_\beta Co_\gamma A_\delta O_{2-z}F_z$, where b ranges from about 0.01 to about 0.3, α ranges from about 0 to about 0.4, β range from about 0.2 to about 0.65, γ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li or combinations thereof.

7. The lithium ion battery of claim 1 wherein the silicon based active material comprises nanostructured elemental silicon, silicon alloy and/or silicon oxide.

8. The lithium ion battery of claim 1 further comprising supplemental lithium in an amount with an oxidation capacity corresponding to about 5% to about 150% of the irreversible capacity loss of the negative electrode.

9. The lithium ion battery of claim 1 wherein the positive electrode active material has a specific discharge capacity of at least about 200 mAh/g at C/3 discharged from 4.6V to 2V against lithium and the negative electrode active material has a specific discharge capacity of at least about 850 mAh/g at C/3 discharged against lithium.

10. The lithium ion battery of claim 1 wherein the positive electrode has a surface area along one side from about 100 cm² to about 300 cm².

11. The lithium ion battery of claim 1 wherein the positive electrode has an active material density from about 2.5 g/cc to about 3.3 g/cc.

12. The lithium ion battery of claim 1 wherein initial negative electrode charge capacity at a rate of C/20 from an open circuit voltage to 1.5V against lithium is about 110% to about 165% relative to the sum of the initial positive electrode charge capacity at a rate of C/20 from an open circuit voltage to 4.6V plus the oxidation capacity of any supplemental lithium.

13. The lithium ion battery of claim 1 wherein the negative electrode further comprises graphite distinct additive from the silicon based active material.

* * * * *